(12) United States Patent
Tabata et al.

(10) Patent No.: US 7,481,737 B2
(45) Date of Patent: Jan. 27, 2009

(54) CONTROL APPARATUS FOR VEHICULAR DRIVE SYSTEM, VEHICLE PROVIDED WITH THE CONTROL APPARATUS, AND METHOD OF CONTROLLING VEHICULAR DRIVE SYSTEM

(75) Inventors: Atsushi Tabata, Okazaki (JP); Yutaka Taga, Aichi-gun (JP); Yuji Inoue, Nisshin (JP); Atsushi Kamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 273 days.

(21) Appl. No.: 11/471,543

(22) Filed: Jun. 21, 2006

(65) Prior Publication Data

US 2007/0087893 A1 Apr. 19, 2007

(30) Foreign Application Priority Data

Jun. 22, 2005 (JP) ............................... 2005-182398

(51) Int. Cl.
*F16H 3/72* (2006.01)
(52) U.S. Cl. .......................................... 477/3; 475/149
(58) Field of Classification Search .............. 477/15.35; 903/911
See application file for complete search history.

(56) References Cited

U.S. PATENT DOCUMENTS 7,179,187 B2 * 2/2007 Raghavan et al. .............. 475/5

2005/0255964 A1 * 11/2005 Heap et al. ...................... 477/3

FOREIGN PATENT DOCUMENTS

| JP | 11-217025 | 8/1999 |
| JP | 2001-286003 | 10/2001 |
| JP | 2003-301731 | 10/2003 |

* cited by examiner

*Primary Examiner*—Sherry L Estremsky
*Assistant Examiner*—Edwin A Young
(74) *Attorney, Agent, or Firm*—Oblon, Spivak, McClelland, Maier & Neustadt, P.C.

(57) ABSTRACT

A control apparatus for a vehicular drive system including a first transmission portion having a differential mechanism operable to distribute an engine output to a first electric motor and a power transmitting member, and a second electric motor disposed in a power transmitting path between the power transmitting member and a drive wheel; and a second transmission portion constituting a part of the power transmitting path. The control apparatus includes a switching device provided in the differential mechanism and operable to selectively place the first transmission portion in a continuously-variable shifting state and in a non-continuously-variable shifting state, rendering the first transmission portion respectively capable or not capable of operating as an electrically controlled continuously variable transmission; and a transmission controller operable to change a speed ratio of the second transmission portion, concurrently with switching of the first transmission portion between the continuously-variable shifting state and the non-continuously-variable shifting state.

28 Claims, 16 Drawing Sheets

|  | C1 | C2 | C3 | C4 | B0 | B1 | B2 | SPEED RATIO | STEPPING RATIO |
|---|---|---|---|---|---|---|---|---|---|
| 1st |  |  |  | ○ | ○ | ○ |  | 4.071 | 1.590 |
| 2nd |  | ○ |  |  | ○ | ○ |  | 2.560 | 1.447 |
| 3rd |  |  | ○ |  | ○ | ○ |  | 1.770 | 1.420 |
| 4th |  | ○ | ○ |  | ○ |  |  | 1.246 | 1.246 |
| 5th |  |  | ○ | ○ | ○ |  |  | 1.000 | 1.257 |
| 6th | ○ |  | ○ |  | ○ |  |  | 0.796 | 1.150 |
| 7th | ○ |  |  | ○ | ○ |  |  | 0.692 | 1.110 |
| 8th | ○ | ○ |  |  | ○ |  |  | 0.629 | SPREAD 6.473 |
| R |  |  |  | ○ | ○ |  | ○ | 2.989 |  |
| N |  |  |  |  | ○ |  |  |  |  |

○ ENGAGED

|      | C1 | C2 | C3 | C4 | B0 | B1 | B2 |
|------|----|----|----|----|----|----|----|
| 2nd  |    | ○  |    |    |    | ○  |    |
| 4th  |    | ○  | ○  |    |    |    |    |
| 6th  | ○  |    | ○  |    |    |    |    |
| 7th  | ○  |    |    | ○  |    |    |    |
| 8th  | ○  | ○  |    |    |    |    |    |
| R1   |    | ○  |    |    |    |    | ○  |
| R2   |    | ○  |    |    |    | ○  |    |
| N    |    |    |    |    |    |    |    |

○ ENGAGED

| | C1 | C2 | C3 | C4 | B0 | B1 | B2 | SPEED RATIO | STEPPING RATIO |
|---|---|---|---|---|---|---|---|---|---|
| 1st | | | | ○ | ○ | ○ | | 4.500 | 1.650 |
| 2nd | | ○ | | | ○ | ○ | | 2.727 | 1.509 |
| 3rd | | | ○ | | ○ | ○ | | 1.808 | 1.455 |
| 4th | | ○ | ○ | | ○ | | | 1.242 | 1.242 |
| 5th | | | ○ | ○ | ○ | | | 1.000 | 1.290 |
| 6th | ○ | | ○ | | ○ | | | 0.775 | 1.167 |
| 7th | ○ | | | ○ | ○ | | | 0.664 | 1.096 |
| 8th | ○ | ○ | | | ○ | | | 0.606 | SPREAD 7.425 |
| R | | | | ○ | ○ | | ○ | 3.333 | |
| N | | | | | ○ | | | | |

○ ENGAGED

|      | C1 | C2 | C3 | C4 | B0 | B1 | B2 |
|------|----|----|----|----|----|----|----|
| 2nd  |    | ○  |    |    |    | ○  |    |
| 4th  |    | ○  | ○  |    |    |    |    |
| 6th  | ○  |    | ○  |    |    |    |    |
| 7th  | ○  |    |    | ○  |    |    |    |
| 8th  | ○  | ○  |    |    |    |    |    |
| R1   |    | ○  |    |    |    |    | ○  |
| R2   |    | ○  |    |    |    | ○  |    |
| N    |    |    |    |    |    |    |    |

○ ENGAGED

CONTROL APPARATUS FOR VEHICULAR DRIVE SYSTEM, VEHICLE PROVIDED WITH THE CONTROL APPARATUS, AND METHOD OF CONTROLLING VEHICULAR DRIVE SYSTEM

The present application is based on Japanese Patent Application No. 2005-182398.

BACKGROUND OF THE INVENTION

1. Field of the Invention

The present invention relates to a vehicular drive system including a differential mechanism having a differential function, and electric motors, and more particularly to techniques for reducing the size of the electric motors.

2. Discussion of Prior Art

There is known a drive system for a vehicle, which includes a differential mechanism operable to distribute an output of an engine to a first electric motor and its output shaft, and a second electric motor disposed between the output shaft of the differential mechanism and a drive wheel of the vehicle. Patent Document 1 discloses an example of such a vehicular drive system, which is a hybrid vehicle drive system. In this hybrid vehicle drive system, the differential mechanism is constituted by a planetary gear set, for example, and a major portion of a drive force of the engine is mechanically transmitted to the drive wheels through the differential function of the differential mechanism, while the rest of the drive force is electrically transmitted from the first electric motor to the second electric motor, through an electric path therebetween, so that the differential mechanism functions as a transmission the speed ratio of which is continuously variable, for example, as an electrically controlled continuously variable transmission, thereby making it possible to drive the vehicle under the control of a control device, with the engine kept in an optimum operating state with an improved fuel economy.

Patent Document 1 JP-2003-301731A

Generally, a continuously variable transmission is known as a transmission which permits an improved fuel economy of the vehicle, while on the other hand a gear type transmission such as a step-variable automatic transmission is known as a transmission having a high power transmitting efficiency. However, there is not available any power transmitting mechanism having the advantages of those two types of transmission. For example, the hybrid vehicle drive system disclosed in the Patent Document 1 includes the electric path for transmitting an electric energy from the first electric motor to the second electric motor, namely, a power transmitting path for transmitting a portion of the vehicle drive force as an electric energy, so that a portion of the output of the engine is once converted into an electric energy which is subsequently converted into a mechanical energy to be transmitted to the drive wheels, whereby the fuel economy of the vehicle may possibly be deteriorated under some running condition of the vehicle, for instance, during a high-speed running of the vehicle. Where the above-described differential mechanism is a transmission the speed ratio of which is electrically variable, for example, a continuously variable transmission so-called an "electric CVT", the vehicular drive system suffers from a similar problem.

The present invention was made in view of the background art described above. It is therefore an object of this invention to provide a control apparatus for a vehicular drive system including a differential mechanism operable to distribute an output of an engine to a first electric motor and its output member, a second electric motor disposed in a power transmitting path between the differential mechanism and a drive wheel of a vehicle, and a transmission constituting a part of the power transmitting path, which control apparatus permits size reduction of the vehicular drive system or improvement of fuel economy of the vehicular drive system.

SUMMARY OF THE INVENTION

The gist of the invention according to claim 1, 7 or 11 is that, in a control apparatus, a vehicle or a control method for (a) a vehicular drive system including: a continuously-variable transmission portion operable as an electrically controlled continuously variable transmission and having a differential mechanism operable to distribute an output of an engine to a first electric motor and a power transmitting member, and a second electric motor disposed in a power transmitting path between the power transmitting member and a drive wheel of a vehicle; an automatic transmission portion constituting a part of the power transmitting path; and (b) a differential-state switching device provided in the differential mechanism and operable to selectively place the continuously-variable transmission portion in a continuously-variable shifting state in which the continuously-variable transmission portion can be operated as the electrically controlled continuously variable transmission, and in a non-continuously-variable shifting state in which the continuously-variable transmission portion is not operated as the electrically controlled continuously variable transmission, there is provided (c) automatic transmission control means or an automatic transmission control step that is operable or implemented, upon switching of the continuously-variable transmission portion between the continuously-variable shifting state and the non-continuously-variable shifting state, to change a speed ratio of the automatic transmission portion, concurrently with the switching of the continuously-variable transmission portion between the continuously-variable shifting state and the non-continuously-variable shifting state.

In the control apparatus, vehicle or control method as described above, the continuously-variable transmission portion of the vehicular drive system is switchable by the differential-state switching device, between the continuously-variable shifting state in which the continuously-variable transmission portion can be operated as the electrically controlled continuously variable transmission, and in the non-continuously-variable shifting state (e.g., step-variable shifting state) in which the continuously-variable transmission portion is not operable as the electrically controlled continuously variable transmission. Accordingly, the present drive system has both an advantage of an improvement of the fuel economy of a transmission the speed ratio of which is electrically variable, and an advantage of a high power transmitting efficiency of a gear type power transmitting device constructed for mechanical transmission of power.

When the continuously-variable transmission portion is placed in the continuously-variable shifting state in a normal output state of the engine during a low-speed or medium-speed running or a low-output or medium-output running of the vehicle, for example, the fuel economy of the vehicle is improved. When the continuously-variable transmission portion is placed in the non-continuously-variable shifting state during a high-speed running of the vehicle, the output of the engine is transmitted to the drive wheel primarily through the mechanical power transmitting path, so that the fuel economy is improved owing to reduction of a loss of conversion of a mechanical energy into an electric energy, which would take place when the continuously-variable transmission portion is operated as the electrically controlled continuously variable transmission. Where the continuously-variable transmission portion is placed in the non-continuously-variable shifting state during a high-output running state of the vehicle, the continuously-variable transmission portion is operated as a transmission the speed ratio of which is electrically variable, only when the vehicle speed or output is relatively low or medium, so that the required amount of electric energy generated by the electric motor, that is, the maximum amount of electric energy that must be transmitted from the electric motor can be reduced, making it possible to minimize the required size of the electric motor, and the required size of the vehicular drive system including the electric motor.

Further, in the above-described vehicular drive system provided with the continuously-variable transmission portion that is switchable between the continuously-variable shifting state and the non-continuously-variable shifting state, when the continuously-variable transmission portion is switched between the continuously-variable shifting state and the non-continuously-variable shifting state, the speed ratio of the automatic transmission portion is changed by the automatic transmission portion, concurrently with the switching of the continuously-variable transmission portion between the continuously-variable shifting state and the non-continuously-variable shifting state. Since a rotational speed of the engine (hereinafter referred to as "engine rotational speed") can be changed by changing the speed ratio of the automatic transmission portion, it is possible to restrain a user of the vehicle from suffering from discomfort caused by a change of the engine rotational speed that is caused by the switching of the continuously-variable transmission portion between the continuously-variable shifting state and the non-continuously-variable shifting state. Described in another point of view, since the engine rotational speed can be changed owing to the change of the speed ratio of the automatic transmission portion, it is possible to improve responsiveness of the change of the engine rotational speed during the switching of the continuously-variable transmission portion between the continuously-variable shifting state and the non-continuously-variable shifting state, without discomfort caused to the vehicle user by the switching of the continuously-variable transmission portion.

In the invention according to claim 2, 8 or 14, the automatic transmission control means or the automatic transmission control step is provided or implemented to cause a shift-down action of the automatic transmission portion when the continuously-variable transmission portion is switched from the continuously-variable shifting state to the non-continuously-variable shifting state, such that the engine rotational speed is made higher after the switching of the continuously-variable transmission portion than before the switching of the continuously-variable transmission portion. In this arrangement, owing to the increase of the engine rotational speed caused by the shift-down action of the automatic transmission portion, it is possible to reduce a possibility that, for example, when the continuously-variable transmission portion is placed in the non-continuously-variable shifting state during a high-output running state of the vehicle with a depressing operation effected on an accelerator pedal, the engine rotational speed would be reduced in spite of the depressing operation of the accelerator pedal, due to a fact that the engine rotational speed is bound by a running speed of the vehicle. That is, when the continuously-variable transmission portion is placed in the non-continuously-variable shifting state as a result of the depressing operation of the accelerator pedal, the shift-down action of the automatic transmission portion is effected concurrently with the switching of the continuously-variable transmission portion from the continuously-variable shifting state to the non-continuously-variable shifting state, thereby making it possible to restrain the change of the engine rotational speed due to the switching of the continuously-variable transmission portion. Consequently, since the engine rotational speed is increased as a result of the shift-down action of the automatic transmission portion during the switching of the continuously-variable transmission portion, the continuously-variable transmission portion can be switched from the continuously-variable shifting state to the non-continuously-variable shifting state, while restraining the vehicle user from suffering from discomfort.

In the invention according to claim 3, 9 or 15, three rotary elements of the differential mechanism are provided by a sun gear, a carrier and a ring gear, and rotational speeds of the three rotary elements are represented by respective straight lines of a collinear chart, the straight line representative of the rotational speed of a second rotary element as one of the three rotary elements, the straight line representative of the rotational speed of a first rotary element as another of the three rotary elements and the straight line representative of the rotational speed of a third rotary element as still another of the three rotary elements are arranged in this order as viewed in a direction from one of opposite ends of the collinear chart toward the other end, the differential mechanism including a first planetary gear set in which the first rotary element is connected to the engine, the second rotary element is connected to the first electric motor, and the third rotary element is connected to the power transmitting member, wherein the continuously-variable transmission portion is placed in the non-continuously-variable shifting state so as to be operable as a speed-increasing transmission whose speed ratio is lower than 1, when the differential-state switching device places the second rotary element in an unrotatable state, and wherein the output of the engine is receivable by the automatic transmission portion through an input path from the power transmitting member via the continuously-variable transmission portion and through another input path without via the continuously-variable transmission portion. In this arrangement, the continuously-variable transmission portion is arranged to be placeable by the differential-state switching device in a selected one of the continuously-variable shifting state and non-continuously-variable shifting state, and is arranged as a transmission having a certain speed ratio. Since the continuously-variable transmission portion serves as the speed-increasing transmission while being placed in the non-continuously-variable shifting state, the engine rotational speed could be reduced upon switching of the continuously-variable transmission portion from the continuously-variable shifting state to the non-continuously-variable shifting state. However, in this instance, since the shift-down action of the automatic transmission portion is caused by the automatic transmission control means, it is possible to restrain the vehicle user from suffering from discomfort. Further, the continuously-variable transmission portion, which is selectively placeable in the continuously-variable shifting state and the non-continuously-variable shifting state, cooperates with the automatic transmission portion to establish a plurality of speed positions. Further, the differential mechanism is simply constituted by the single planetary gear set, and the axial dimension of the differential mechanism can be reduced.

The gist of the invention according to claim 4, 10 or 16 is that, in a control apparatus, a vehicle or a control method for (a) a vehicular drive system including: a differential portion having a differential mechanism operable to distribute an output of an engine to a first electric motor and a power transmitting member, and a second electric motor disposed in a power transmitting path between the power transmitting member and a drive wheel of a vehicle; and an automatic transmission portion constituting a part of the power transmitting path, there are provided (b) a differential-state switching device provided in the differential mechanism and operable to selectively place the differential portion in a differential state in which the differential portion provides a differential function, and in a non-differential state in which the differential portion does not provide the differential function, and (c) automatic transmission control means or an automatic transmission control step that is operable or implemented, upon switching of the differential portion between the differential state and the non-differential state, to change a speed ratio of the automatic transmission portion, concurrently with the switching of the differential portion between the differential state and the non-differential state.

In the control apparatus, vehicle or control method as described above, the differential portion of the vehicular drive system is switchable by the differential-state switching device, between the differential state in which the differential portion provides the differential function, and in the non-differential state (e.g., locked state) in which the differential portion does not provide the differential function. Accordingly, the present drive system has both an advantage of an improvement of the fuel economy of a transmission the speed ratio of which is electrically variable, and an advantage of a high power transmitting efficiency of a gear type power transmitting device constructed for mechanical transmission of power.

When the differential portion is placed in the differential state in a normal output state of the engine during a low-speed or medium-speed running or a low-output or medium-output running of the vehicle, for example, the fuel economy of the vehicle is improved. When the differential portion is placed in the non-differential state during a high-speed running of the vehicle, the output of the engine is transmitted to the drive wheel primarily through the mechanical power transmitting path, so that the fuel economy is improved owing to reduction of a loss of conversion of a mechanical energy into an electric energy, which would take place when the differential portion is operated as the electrically controlled continuously variable transmission. Where the differential portion is placed in the non-differential state during a high-output running state of the vehicle, the differential portion is operated as a transmission the speed ratio of which is electrically variable, only when the vehicle speed or output is relatively low or medium, so that the required amount of electric energy generated by the electric motor, that is, the maximum amount of electric energy that must be transmitted from the electric motor can be reduced, making it possible to minimize the required size of the electric motor, and the required size of the vehicular drive system including the electric motor.

Further, in the above-described vehicular drive system provided with the differential portion that is switchable between the differential state and the non-differential state, when the differential portion is switched between the differential state and the non-differential state, the speed ratio of the automatic transmission portion is changed concurrently with the switching of the differential portion between the differential state and the non-differential state. Since the engine rotational speed can be changed by changing the speed ratio of the automatic transmission portion, it is possible to restrain a user of the vehicle from suffering from discomfort caused by a change of the engine rotational speed that is caused by the switching of the differential portion between the differential state and the non-differential state. Described in another point of view, since the engine rotational speed can be changed owing to the change of the speed ratio of the automatic transmission portion, it is possible to improve responsiveness of the change of the engine rotational speed during the switching of the differential portion between the differential state and the non-differential state, without discomfort caused to the vehicle user by the switching of the differential portion.

In the invention according to claim 5, 11 or 17, the automatic transmission control means or the automatic transmission control step is provided or implemented to cause a shift-down action of the automatic transmission portion when the differential portion is switched from the differential state to the non-differential state, such that the engine rotational speed is made higher after the switching of the differential portion than before the switching of the differential portion. In this arrangement, owing to the increase of the engine rotational speed caused by the shift-down action of the automatic transmission portion, it is possible to reduce a possibility that, for example, when the differential portion is placed in the non-differential state during a high-output running state of the vehicle with a depressing operation effected on an accelerator pedal, the engine rotational speed would be reduced in spite of the depressing operation of the accelerator pedal, due to a fact that the engine rotational speed is bound by a running speed of the vehicle. That is, when the differential portion is placed in the non-differential state as a result of the depressing operation of the accelerator pedal, the shift-down action of the automatic transmission portion is effected concurrently with the switching of the differential portion from the differential state to the non-differential state, thereby making it possible to restrain the change of the engine rotational speed due to the switching of the differential portion. Consequently, since the engine rotational speed is increased as a result of the shift-down action of the automatic transmission portion during the switching of the differential portion, the differential portion can be switched from the differential state to the non-differential state, while restraining the vehicle user from being suffering from discomfort.

In the invention according to claim 6, 12 or 18, three rotary elements of the differential mechanism are provided by a sun gear, a carrier and a ring gear, and rotational speeds of the three rotary elements are represented by respective straight lines of a collinear chart, the straight line representative of the rotational speed of a second rotary element as one of the three rotary elements, the straight line representative of the rotational speed of a first rotary element as another of the three rotary elements and the straight line representative of the rotational speed of a third rotary element as still another of the three rotary elements are arranged in this order as viewed in a direction from one of opposite ends of the collinear chart toward the other end, the differential mechanism including a first planetary gear set in which the first rotary element is connected to the engine, the second rotary element is connected to the first electric motor, and the third rotary element is connected to the power transmitting member, wherein the differential portion is placed in the non-differential state so as to be operable as a speed-increasing transmission whose speed ratio is lower than 1, when the differential-state switching device places the second rotary element in an unrotatable state, and wherein the output of the engine is receivable by the automatic transmission portion through an input path from the power transmitting member via the differential portion and through another input path without via the differential portion. In this arrangement, the differential portion is arranged to be placeable by the differential-state switching device in a selected one of the differential state and non-differential state, and is arranged as a transmission having a certain speed ratio. Since the differential portion serves as the speed-increasing transmission while being placed in the non-differential state, the engine rotational speed could be reduced upon switching of the differential portion from the differential state to the non-differential state. However, in this instance, since the shift-down action of the automatic transmission portion is caused by the automatic transmission control means, it is possible to restrain the vehicle user from suffering from discomfort. Further, the differential portion, which is selectively placeable in the differential state and the non-differential state, cooperates with the automatic transmission portion to establish a plurality of speed positions. Further, the differential mechanism is simply constituted by the single planetary gear set, and the axial dimension of the differential mechanism can be reduced.

Preferably, the differential-state switching device is arranged to place the differential mechanism in a differential state in which the differential mechanism has the differential function, for thereby placing the continuously-variable transmission portion in the continuously-variable shifting state in which the continuously-variable transmission portion is operable as the electrically controlled continuously variable transmission, and to place the differential mechanism in a non-differential state (e.g., a locked state) in which the differential function of the differential mechanism is limited, for thereby placing the continuously-variable transmission portion in the non-continuously-variable shifting state (e.g., a step-variable shifting state) in which the operation of the continuously-variable transmission portion as the electrically controlled continuously variable transmission is limited. In this case, the continuously-variable transmission portion is switchable between the continuously-variable shifting state and the non-continuously-variable shifting state.

Preferably, the differential-state switching device is arranged to place the differential mechanism in a differential state in which the differential mechanism has the differential function, for thereby placing the differential portion in the differential state in which the differential portion is able to provide the differential function, and to place the differential mechanism in a non-differential state (e.g., a locked state) in which the differential function of the differential mechanism is limited, for thereby placing the differential portion in the non-differential state (e.g., a locked state) in which the differential portion does not provide the differential function. In this case, the differential portion is switchable between the differential state and the non-differential state.

Preferably, the differential mechanism has a first element connected to the engine, a second element connected to the first electric motor and a third element connected to the power transmitting member, and the differential-state switching device is operable to enable the first through third elements to be rotatable relative to each other for placing the differential mechanism in the differential state, for example, to enable at least the second and third elements to be rotatable at respective different rotational speeds for placing the differential mechanism in the differential state. Further, the differential-state switching device is operable to place the second element in an unrotatable state for the placing the differential mechanism in the non-differential state (e.g., a locked state). In this case, the differential mechanism is switchable between the differential state and the non-differential state.

Preferably, the differential-state switching device includes a brake operable to fix the second element to a non-rotary member for holding the second element in the unrotatable state. This arrangement permits the differential mechanism to be easily switched between the differential and non-differential states.

Preferably, the brake is released to place the differential mechanism in the differential state in which at least the second and third elements are rotatable at respective different speeds and in which the differential mechanism is operable as an electrically controlled differential device. The brake is engaged to place the differential mechanism in the non-differential state in which the second element is held in the unrotatable state and in which the differential mechanism is operable as the speed-increasing transmission having a speed ratio lower than 1. In this arrangement, the differential mechanism is switchable between the differential state and the non-differential state, and is operable as a transmission having a fixed speed ratio or ratios.

Preferably, the differential mechanism is a planetary gear set of single-pinion type, and the first rotary element is a carrier of the planetary gear set, and the second rotary element is a sun gear of the planetary gear set, while the third rotary element is a ring gear of the planetary gear set. In this arrangement, the axial dimension of the differential mechanism can be reduced, and is simply constituted by one planetary gear device of single-pinion type.

Preferably, an overall speed ratio of the vehicular drive system is defined by a speed ratio of the continuously-variable transmission portion and a speed ratio of the automatic transmission portion. In this arrangement, the vehicle drive force can be obtained over a relatively wide range of the overall speed ratio, by utilizing the speed ratio of the automatic transmission portion, so that the efficiency of the continuously-variable shifting control of the continuously-variable transmission portion is further improved. Where the second electric motor is connected to the power transmitting member, with the automatic transmission portion being operated as a speed-reducing transmission having a speed ratio larger than 1, the output torque of the second electric motor may be smaller than the output torque of the output shaft of the transmission portion, so that the second electric motor can be made compact in size. The continuously-variable transmission portion placed in the continuously-variable shifting state and the automatic transmission portion cooperate to constitute a continuously-variable transmission, and the continuously-variable transmission portion placed in the non-continuously-variable shifting state and the automatic transmission portion cooperate to constitute a step-variable transmission.

Preferably, an overall speed ratio of the vehicular drive system is defined by a speed ratio of-the differential portion and a speed ratio of the automatic transmission portion. In this arrangement, the vehicle drive force can be obtained over a relatively wide range of the overall speed ratio, by utilizing the speed ratio of the transmission portion. Where the transmission portion is operated as a speed-reducing transmission having a speed ratio larger than 1, the output torque of the second electric motor may be smaller than the output torque of the output shaft of the automatic transmission portion, so that the second electric motor can be made compact in size. The differential portion placed in the continuously-variable shifting state and the automatic transmission portion cooperate to constitute a continuously-variable transmission, and the differential portion placed in the non-continuously-variable shifting state and the automatic transmission portion cooperate to constitute a step-variable transmission.

The automatic transmission portion is a step-variable automatic transmission. In this arrangement, the overall speed ratio of the drive system is changed in steps when the automatic transmission portion is shifted. The change of the overall speed ratio in steps is more rapid than when the overall speed ratio is continuously changed. Accordingly, the drive system functions as a continuously variable transmission capable of smoothly changing the vehicle drive torque, and also capable of changing the speed ratio in steps for rapidly obtaining the vehicle drive torque.

DETAILED DESCRIPTION OF THE INVENTION

The embodiments of this invention will be described in detail by reference to the drawings.

Embodiment 1

Figures 1, 2:
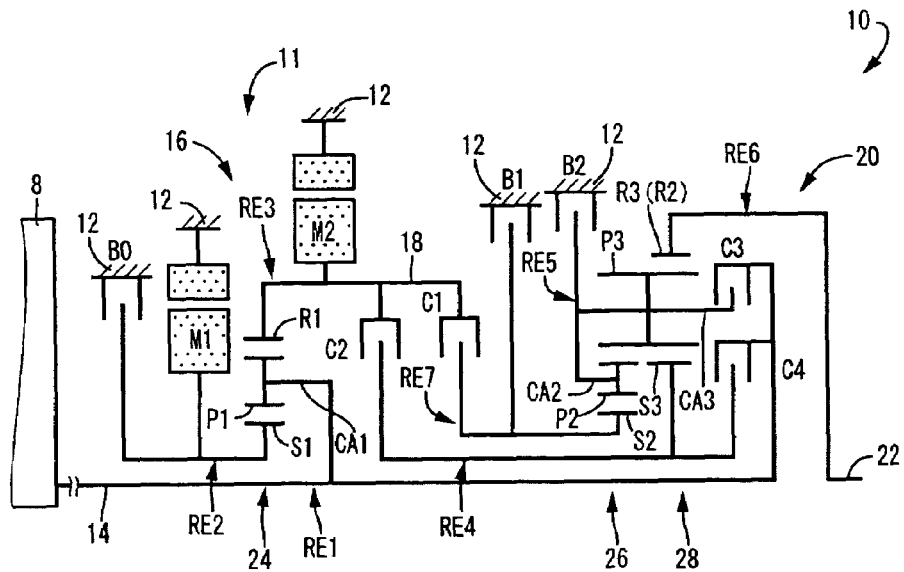
FIG. 1 is a schematic view showing an arrangement of a drive system of a hybrid vehicle as an embodiment of the present invention.
FIG. 2 is a table indicating shifting actions of the hybrid vehicle drive system of FIG. 1, where the drive system is operated in a step-variable shifting state, in relation to different combinations of operating states of hydraulically operated frictional coupling devices to effect the respective shifting actions.
Figure 7:
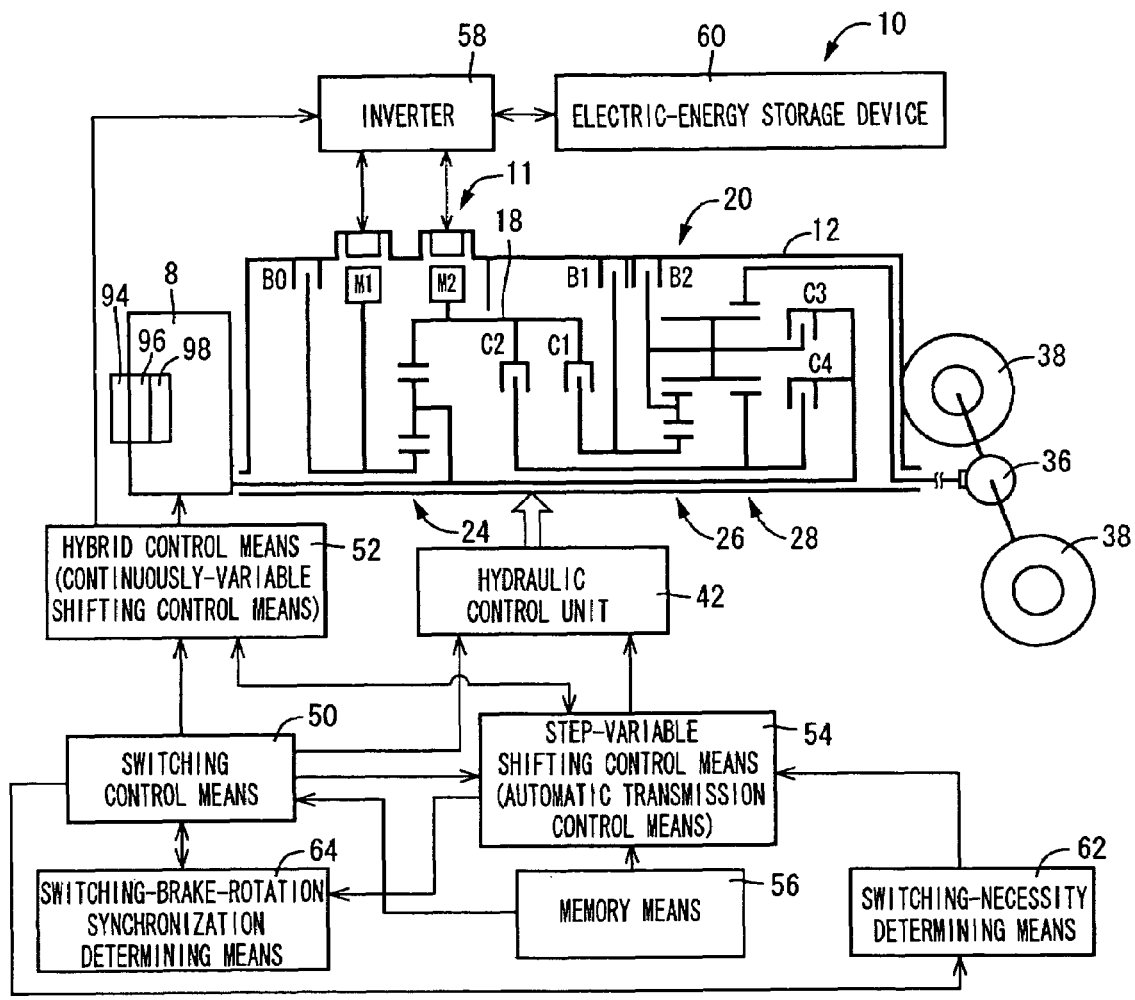
FIG. 7 is a functional block diagram illustrating major control functions of the electronic control device of FIG. 6.

Referring to the schematic view of FIG. 1, there is shown a transmission mechanism 10 constituting a part of a drive system for a hybrid vehicle, which drive system is controlled by a control apparatus according to one embodiment of this invention. In FIG. 1, the transmission mechanism 10 includes: an input rotary member in the form of an input shaft 14; a continuously-variable transmission portion in the form of a differential portion 11 connected to the input shaft 14 either directly, or indirectly via a pulsation absorbing damper (vibration damping device) not shown; a step-variable or multiple-step transmission portion in the form of an automatic transmission portion 20 disposed between the differential portion 11 and drive wheels 38 of the vehicle, and connected in series via a power transmitting member 18 (power transmitting shaft) as an output rotary member of the differential portion 11, to the differential portion 11 and the drive wheels 38; and an output rotary member in the form of an output shaft 22 connected to the automatic transmission portion 20. The input shaft 14, differential portion 11, automatic transmission portion 20 and output shaft 22 are coaxially disposed on a common axis in a transmission casing 12 (hereinafter referred to as "casing 12") functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 through a differential gear device 36 (final speed reduction gear) and a pair of drive axles, as shown in FIG. 7. The engine 8 may be a gasoline engine or diesel engine and functions as a vehicle drive power source directly connected to the input shaft 14 or indirectly via a pulsation absorbing damper.

In the present transmission mechanism 10, the engine 8 and the differential portion 11 are directly connected to each other. This direct connection means that the engine 8 and the differential portion 11 are connected to each other, without a fluid-operated power transmitting device such as a torque converter or a fluid coupling being disposed therebetween, but may be connected to each other through the pulsation absorbing damper as described above. It is noted that a lower half of the transmission mechanism 10, which is constructed symmetrically with respect to its axis, is omitted in FIG. 1. This is also true to the other embodiments of the invention described below.

The differential portion 11 is provided with: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is disposed to be rotatable integrally with the output shaft 22. The second electric motor M2 may be disposed at any portion of the power transmitting path between the power transmitting member 18 and the drive wheels 38. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as major components, a first planetary gear set 24 of a single pinion type having a gear ratio ρ1 of about 0.590, for example, and a switching brake B0. The first planetary gear set 24 has rotary elements consisting of a first sun gear S1; first planetary gears P1; a first carrier CA1 supporting the first planetary gears P1 such that each of the first planetary gears P1 is rotatable about its axis and about the axis of the first sun gear S1; and a first ring gear R1 meshing with the first sun gear S1 through the first planetary gears P1. Where the numbers of teeth of the first sun gear S1 and the first ring gear R1 are represented by ZS1 and ZR1, respectively, the above-indicated gear ratio ρ1 is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the casing 12. When the switching brake B0 is released, the power distributing mechanism 16 is placed in a differential state in which three elements of the first planetary gear set 24 consisting of the first sun gear S1, first carrier CA1 and first ring gear R1 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the differential portion 11 (power distributing mechanism 16) is placed in the continuously-variable shifting state (electrically established CVT state), in which the rotational speed of the power transmitting member 18 is continuously variable, irrespective of the rotational speed of the engine 8, namely, placed in the differential state in which a speed ratio $\gamma 0$ (rotational speed of the input shaft 14/rotational speed of the power transmitting member 18) of the power distributing mechanism 16 is continuously changed from a minimum value $\gamma 0min$ to a maximum value $\gamma 0max$, that is, in the continuously-variable shifting state in which the power distributing mechanism 16 functions as an electrically controlled continuously variable transmission the speed ratio $\gamma 0$ of which is continuously variable from the minimum value $\gamma 0min$ to the maximum value $\gamma 0max$.

When the switching brake B0 is engaged while the power distributing mechanism 16 is placed in the continuously-variable shifting state, the power distributing mechanism 16 is brought into a non-differential state in which the differential function is not available. Described in detail, when the switching brake B0 is engaged, the first sun gear S1 is fixed to the casing 12, so that the power distributing mechanism 16 is placed in the connected state, i.e., locked state in which the first sun gear S1 is not rotatable, namely, placed in a non-differential state in which the differential function is not available, so that the differential portion 11 is also placed in the non-differential state. Since the rotational speed of the first ring gear R1 is made higher than that of the first carrier CA1, the power distributing mechanism 16 functions as a speed-increasing mechanism, and the differential-portion 11 is placed in the fixed-speed-ratio shifting state or step-variable shifting state in which differential portion 11 (power distributing mechanism 16) functions as a speed-increasing transmission having a fixed speed ratio $\gamma 0$ smaller than 1, for example, about 0.63.

Thus, the switching brake B0 functions as a differential-state switching device operable to selectively switch the differential portion 11 (power distributing mechanism 16) between the non-locked state (non-connected state) and the non-differential state, namely, locked state (connected state), that is, between the continuously-variable shifting state in which the differential portion 11 (power distributing mechanism 16) is operable as an electrically controlled continuously variable transmission the speed ratio of which is continuously variable, and the locked state in which the differential portion 11 is not operable as the electrically controlled continuously variable transmission capable of performing a continuously-variable shifting operation, and in which the speed ratio of the differential portion 11 is held fixed, namely, the fixed-speed-ratio shifting state (non-differential state) in which the differential portion 11 is operable as a transmission having a single gear position with one speed ratio, namely, the fixed-speed-ratio shifting state in which the differential portion 11 is operated as a transmission having a single gear position with one speed ratio $\gamma$ that is lower than 1. It is noted that, for placing the differential portion 11 in the non-connected state, the switching control B0 does not necessarily have to be completely released, but may be placed in a partial engaged state (slip state).

The automatic transmission portion 20 includes a double-pinion type second planetary gear set 26 and a single-pinion type third planetary gear set 28, and functions as a step-variable automatic transmission. The second planetary gear set 26 has: a second sun gear S2; a pair of second planetary gears P2; a pair of third planetary gears P3 each of which meshes with a corresponding one of the second planetary gears P2; a second carrier CA2 supporting the second and third planetary gears P2, P3 such that each of the second and third planetary gears P2, P3 is rotatable about its axis and about the axis of the second sun gear S2; and a second ring gear R2 meshing with the second sun gear S2 through the second and third planetary gears P2, P3. For example, the second planetary gear set 26 has a gear ratio ρ2 of about 0.435. The third planetary gear set 28 has: a third sun gear S3; third planetary gears P3 which are provided by members common to the third planetary gears P3 of the second planetary gear set 26; a third carrier CA3 supporting the third planetary gears P3 such that each of the third planetary gears P3 is rotatable about its axis and about the axis of the third sun gear S3; and a third ring gear R3 meshing with the third sun gear S3 through the third planetary gears P3. For example, the third planetary gear set 28 has a gear ratio ρ3 of about 0.335. The second ring gear R2 meshing with the third planetary gears P3 is provided by a common member that provides also the third ring gear R3. The second and third carriers CA2, CA3 are provided by a common member. Where the numbers of teeth of the second sun gear S2, second ring gear R2, third sun gear S3 and third ring gear R3 are represented by ZS2, ZR2, ZS3 and ZR3, respectively, the above-indicated gear ratios ρ2 and ρ3 are represented by ZS2/ZR2 and ZS3/ZR3, respectively.

In the automatic transmission portion 20, the third sun gear S3 is selectively connected to the power transmitting member 18 through a second clutch C2, and is selectively connected to the input shaft 14 (i.e., engine 8) through a fourth clutch C4. The second and third carriers CA2, CA3 are selectively connected to the input shaft 14 (i.e., engine 8) through a third clutch C3, and are selectively connected to the casing 12 through a second brake B2. The second ring gear R2 and the third ring gear R3 are integrally connected to the output shaft 22. The second sun gear S2 is selectively connected to the power transmitting member 18 through a first clutch C1, and is selectively connected to the casing 12 through a first brake B1. Thus, the automatic transmission portion 20 is arranged to receive the output of the engine 8 through an input path from the power transmitting member 18 via the differential portion 11 and through another input path without via the differential portion 11.

The above-described first clutch C1, second clutch C2, third clutch C3, fourth clutch C4, switching brake B0, first brake B1 and second brake B2 (hereinafter collectively referred to as "clutches C" and "brakes B", unless otherwise specified) are hydraulically operated frictional coupling devices used in a conventional vehicular automatic transmission. Each of these hydraulically-operated frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C1-C4 and brakes B0-B2 is selectively engaged for connecting two members between which each clutch or brake is interposed.

In the transmission mechanism 10 constructed as described above, the power distributing mechanism 16 is provided with the switching brake B0 which is engaged to place the differential portion 11 in the continuously-variable shifting state in which the differential portion 11 is operable as a continuously variable transmission, or in the step-variable shifting state (fixed-speed-ratio shifting state) in which the differential portion 11 is operable as a step-variable transmission having a fixed speed ratio or ratios. In the present transmission mechanism 10, therefore, the differential portion 11 placed in the fixed-speed-ratio shifting state by the engaging action of the switching brake B0 cooperates with the automatic transmission portion 20 to constitute a step-variable transmission, while the differential portion 11 placed in the continuously-variable shifting state with the switching brake B0 being held in the released state cooperates with the automatic transmission portion 20 to constitute an electrically controlled continuously variable transmission device. In other words, the transmission mechanism 10 is placed in its step-variable shifting state by engaging the switching brake B0, and in its continuously-variable shifting state by releasing the switching brake B0. Similarly, the differential portion 11 is selectively placed in one of its step-variable and continuously-variable shifting states.

Described in detail, when the transmission mechanism 10 functions as the step-variable transmission with the differential portion 11 placed in its non-continuously-variable state with the switching brake B0 held in the engaged state, one of a first gear position (first speed position) through an eighth gear position (eighth speed position), a reverse gear position (rear drive position) and a neutral position is selectively established by engaging actions of a corresponding combination of the two frictional coupling devices selected from the above-described first clutch C1, second clutch C2, third clutch C3, fourth clutch C4, first brake B1 and second brake B2, as indicated in the table of FIG. 2. The two frictional coupling devices may consist of a frictional coupling device to be released, and a frictional coupling device to be engaged. The above-indicated positions have respective speed ratios γT (=input shaft rotational speed $N_{IN}$/output shaft rotational speed $N_{OUT}$) which change as geometric series. The speed ratios γT are overall speed ratios of the transmission mechanism 10 determined by a speed ratio γ0 of the differential portion 11 and a speed ratio γ of the automatic transmission portion 20.

Where the differential portion 11 is held in the non-continuously-variable shifting state, for example, the first gear position having the highest speed ratio γ1 of about 4.071, for example, is established by engaging actions of the fourth clutch C4, switching brake B0 and first brake B1, and the second gear position having the speed ratio γ2 of about 2.560, for example, which is lower than the speed ratio γ1, is established by engaging actions of the second clutch C2, switching brake B0 and first brake B1, as indicated in FIG. 2. Further, the third gear position having the speed ratio γ3 of about 1.770, for example, which is lower than the speed ratio γ2, is established by engaging actions of the third clutch C3, switching brake B0 and first brake B1, and the fourth gear position having the speed ratio γ4 of about 1.246, for example, which is lower than the speed ratio γ3, is established by engaging actions of the second clutch C2, third clutch C3 and switching brake B0. The fifth gear position having the speed ratio γ5 of about 1.000, for example, which is lower than the speed ratio γ4, is established by engaging actions of the third clutch C3, fourth clutch C4 and switching brake B0, and the sixth gear position having the speed ratio γ6 of about 0.796, for example, which is lower than the speed ratio γ5, is established by engaging actions of the first clutch C1, third clutch C3 and switching brake B0. The seventh gear position having the speed ratio γ7 of about 0.692, for example, which is lower than the speed ratio γ6, is established by engaging actions of the first clutch C1, fourth clutch C4 and switching brake B0, and the eighth gear position having the speed ratio γ8 of about 0.629, for example, which is lower than the speed ratio γ7, is established by engaging actions of the first clutch C1, second clutch C2 and switching brake B0. Further, the reverse gear position having the speed ratio γR of about 2.989, for example, which is intermediate between the speed ratios γ1 and γ2, is established by engaging actions of the fourth clutch C4, switching brake B0 and second brake B2. The neutral position N is established by engaging only the switching brake B0.

Figure 3:
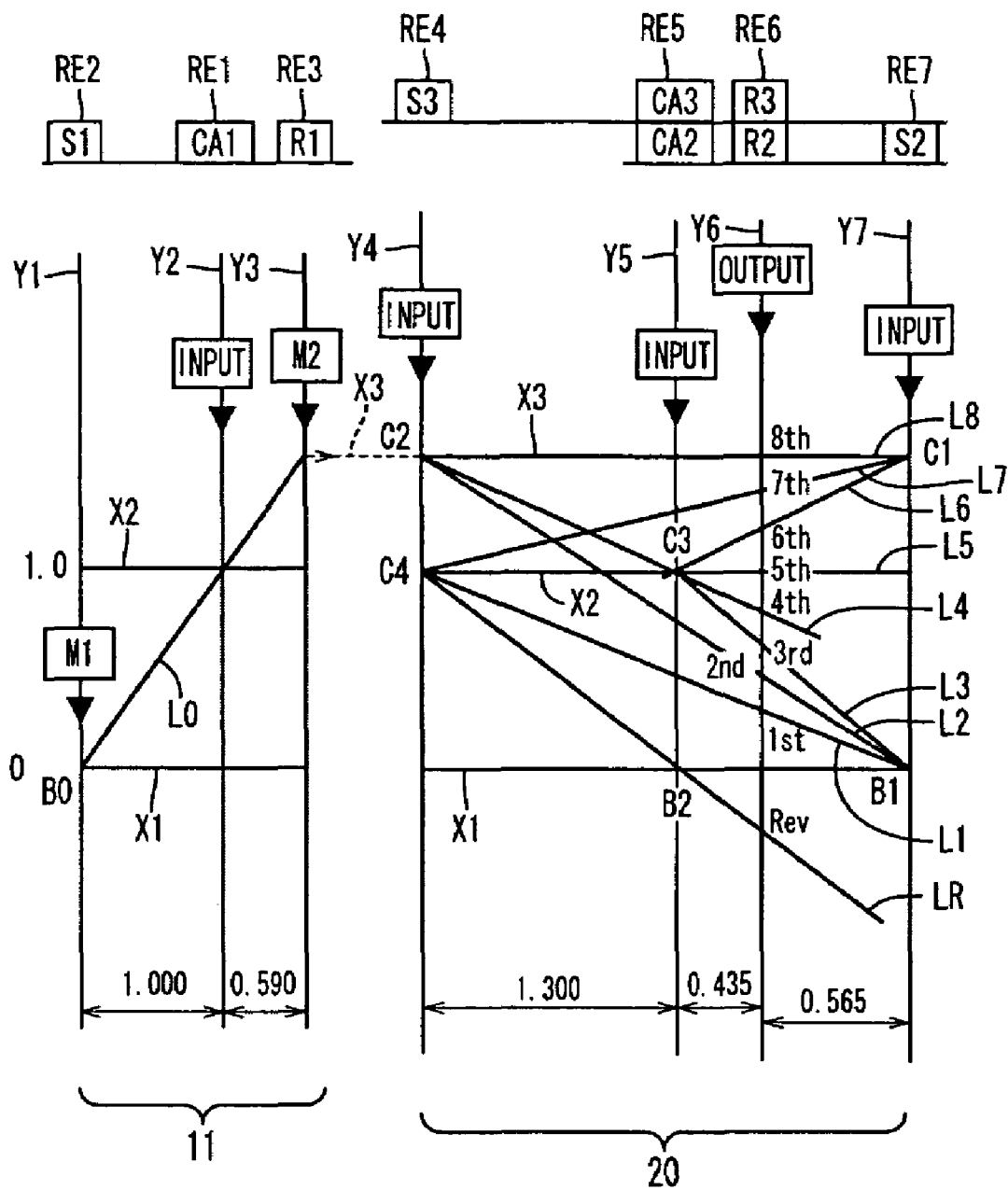
FIG. 3 is a collinear chart indicating relative rotational speeds of the hybrid vehicle drive system of FIG. 1 operated in the step-variable shifting state, in different gear positions of the drive system.

The collinear chart of FIG. 3 indicates, by straight lines, a relationship among the rotational speeds of the rotary elements in each of the gear positions of the transmission mechanism 10, which is constituted by the differential portion 11 functioning as the continuously-variable transmission portion or first transmission portion, and the automatic transmission portion 20 functioning as the step-variable transmission portion or second transmission portion, where the transmission mechanism 10 is placed in its step-variable shifting state by engaging the switching brake B0. The collinear chart of FIG. 3 is a rectangular two-dimensional coordinate system in which the gear ratios ρ of the planetary gear sets 24, 26, 28 are taken along the horizontal axis, while the relative rotational speeds of the rotary elements are taken along the vertical axis. A lower one of three horizontal lines, that is, the horizontal line X1 indicates the rotational speed of 0, while an upper one of the three horizontal lines, that is, the horizontal line X2 indicates the rotational speed of 1.0, that is, an operating speed $N_E$ of the engine 8 connected to the input shaft 14. The horizontal line X3 indicates the rotational speed of the power transmitting member 18.

Three vertical lines Y1, Y2 and Y3 corresponding to the power distributing mechanism 16 of the differential portion 11 respectively represent the relative rotational speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, four vertical lines Y4, Y5, Y6 and Y7 corresponding to the automatic transmission portion 20 respectively represent the relative rotational speeds of a fourth rotary element (fourth element) RE4 in the form of the third sun gear S3, a fifth rotary element (fifth element) RE5 in the form of the second and third carriers CA2, CA3 integrally fixed to each other, a sixth rotary element (sixth element) RE6 in the form of the second and third ring gears R2, R3 integrally fixed to each other, and a seventh rotary element (seventh element) RE7 in the form of the second sun gear S2. The distances between the adjacent ones of the vertical lines are determined by the gear ratios ρ2 and ρ3 of the second and third planetary gear sets 26, 28. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the second and third planetary gear set 26, 28 corresponds to "1", while the distance between the carrier and ring gear of each planetary gear set 26, 28 corresponds to the gear ratio ρ.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is connected to the input shaft 14 (engine 8), and the second rotary element RE2 (first sun gear S1) is connected to the first electric motor M1 and selectively connected to the casing 12 through the switching brake B0, while the third rotary element RE3 (first ring gear R1) is connected to the power transmitting member 18 and the second electric motor M2, so that a rotary motion of the input shaft 14 is transmitted (input) to the automatic transmission portion 20 through the power transmitting member 18. A relationship between the rotational speeds of the first sun gear S1 and the first ring gear R1 is represented by an inclined straight line L0 which passes a point of intersection between the lines Y2 and X2.

As indicated in FIG. 3, in each of the gear positions of the transmission mechanism 10 during the step-variable shifting state of the transmission mechanism 10, the rotational speed of the first sun gear S1 is held at zero by the engaging action of the switching brake B0, while the rotational speed of the first carrier CA1 is equal to the engine rotational speed $N_E$. The relative rotational speed of the first ring gear R1 (relative rotational speed of the power transmitting member 18) is represented by a point of intersection between the vertical line Y3 and the straight line L0 which passes the point of intersection between the lines X1, Y1 and the point of intersection between the lines X2, Y2. The relative rotational speed of the first ring gear R1, which is inputted to the automatic transmission portion 20, is made higher than the engine rotational speed $N_E$. Thus, as a result of the engagement of the switching brake B0, the power distributing mechanism 16 functions as the speed-increasing mechanism.

In the automatic transmission portion 20, the fourth rotary element RE4 (third sun gear S3) is selectively connected to the power transmitting member 18 through the second clutch C2, and is selectively connected to the input shaft 14 (engine 8) through the fourth clutch C4. The fifth rotary element RE5 (second and third carriers CA2, CA3) is selectively connected to the input shaft 14 (engine 8) through the third clutch C3, and is selectively connected to the casing 12 through the second brake B2. The sixth rotary element RE6 (second and third ring gears R2, R3) is integrally connected to the output shaft 22. The seventh rotary element RE7 (second sun gear S2) is selectively connected to the power transmitting member 18 through the first clutch C1, and is selectively connected to the casing 12 through the first brake B1.

During the step-variable shifting state of the transmission mechanism 10 with the engagement of the switching brake B0, when the fourth clutch C4 and the first brake B1 are engaged, the automatic transmission portion 20 is placed in the first (1st) gear position. The rotational speed of the output shaft 22 in the first gear position is represented by a point of intersection between an inclined straight line L1 which passes a point of intersection between the vertical line Y4 indicative of the rotational speed of the fourth rotary element RE4 and the horizontal line X2 and a point of intersection between the vertical line Y7 indicative of the rotational speed of the seventh rotary element RE7 and the horizontal line X1, and the vertical line Y6 indicative of the rotational speed of the sixth rotary element RE6 connected to the output shaft 22, as indicated in FIG. 3. Similarly, the rotational speed of the output shaft 22 in the second (2nd) gear position established by the engaging actions of the second clutch C2 and first brake B1 is represented by a point of intersection between an inclined straight line L2 determined by those engaging actions and the vertical line Y6 indicative of the rotational speed of the sixth rotary element RE6 connected to the output shaft 22. The rotational speed of the output shaft 22 in the third (3rd) gear position established by the engaging actions of the third clutch C3 and first brake B1 is represented by a point of intersection between an inclined straight line L3 determined by those engaging actions and the vertical line Y6 indicative of the rotational speed of the sixth rotary element RE6 connected to the output shaft 22. The rotational speed of the output shaft 22 in the fourth (4th) gear position established by the engaging actions of the second and third clutches C2, C3 is represented by a point of intersection between an inclined straight line L4 determined by those engaging actions and the vertical line Y6 indicative of the rotational speed of the sixth rotary element RE6 connected to the output shaft 22. The rotational speed of the output shaft 22 in the fifth (5th) gear position established by the engaging actions of the third and fourth clutches C3, C4 is represented by a point of intersection between a horizontal line L5 determined by those engaging actions and the vertical line Y6 indicative of the rotational speed of the sixth rotary element RE6 fixed to the output shaft 22. The rotational speed of the output shaft 22 in the sixth (6th) gear position established by the engaging actions of the first and third clutches C1, C3 is represented by a point of intersection between an inclined straight line L6 determined by those engaging actions and the vertical line Y6 indicative of the rotational speed of the sixth rotary element RE6 connected to the output shaft 22. The rotational speed of the output shaft 22 in the seventh (7th) gear position established by the engaging actions of the first and fourth clutches C1, C4 is represented by a point of intersection between an inclined straight line L7 determined by those engaging actions and the vertical line Y6 indicative of the rotational speed of the sixth rotary element RE6 connected to the output shaft 22. The rotational speed of the output shaft 22 in the eighth (8th) gear position established by the engaging actions of the first and second clutches C1, C2 is represented by a point of intersection between a horizontal line L8 determined by those engaging actions and the vertical line Y6 indicative of the rotational speed of the sixth rotary element RE6 fixed to the output shaft 22. Further, the rotational speed of the output shaft 22 in the reverse (Rev) gear position established by the engaging actions of the fourth clutch C4 and the second brake B2 is represented by a point of intersection between an inclined straight line LR determined by those engaging actions and the vertical line Y6 indicative of the rotational speed of the sixth rotary element RE6 connected to the output shaft 22.

Where the transmission mechanism 10 functions as the continuously-variable transmission with the differential portion 11 placed in its continuously-variable shifting state, on the other hand, the brake B0 is released, so that the differential portion 11 functions as the continuously variable transmission, while the automatic transmission portion 20 connected in series to the differential portion 11 functions as the step-variable transmission, whereby the speed of the rotary motion transmitted to the automatic transmission portion 20 placed in a selected gear position M, i.e., the rotational speed of the power transmitting member 18 is continuously changed, so that the speed ratio of the drive system when the automatic transmission portion 20 is placed in the selected gear position M is continuously variable over a predetermined range. Accordingly, the overall speed ratio γT of the transmission mechanism 10 is continuously variable.

In this instance, for permitting the transmission mechanism 10 to function as the continuously-variable transmission, at least one of the rotary elements of the automatic transmission portion 20 needs to receive an output of the power transmitting member 18, the rotational speed of which is changeable irrespective to the rotation of the engine 8, during the continuously-variable shifting state of the differential portion 11. Described in another point of view, where any one of the rotary elements of the automatic transmission portion 20 does not receive the output of the power transmitting member 18, namely, where the hydraulically operated frictional coupling devices (first and second clutches C1, C2) which are to receive the output of the power transmitting member 18 are not engaged, the transmission mechanism 10 does not function as the continuously-variable transmission even if the differential portion 11 is placed in the continuously-variable shifting state. That is, since the automatic transmission portion 20 is arranged to receive the output of the engine 8 through the input path from the power transmitting member 18 via the differential portion 11 and through the input path without via the differential portion 11, the gear position has to be established in the automatic transmission portion 20 by the engagement of the hydraulically operated frictional coupling devices which are to receive the output of the power transmitting member 18, for enabling the transmission mechanism 10 to function as the continuously-variable transmission during the continuously-variable shifting state of the differential portion 11.

Described specifically, as shown in FIGS. 2 and 3, when the automatic transmission portion 20 is placed in the second (2nd) gear position, fourth (4th) gear position or eight (8th) gear position, the output of the power transmitting member 18 is transmitted to the fourth rotary element RE4 by engagement of the second clutch C2 which receives the output of the power transmitting member 18. When the automatic transmission portion 20 is placed in the sixth (6th) gear position, seventh (7th) gear position or eight (8th) gear position, the output of the power transmitting member 18 is transmitted to the seventh rotary element RE7 by engagement of the second clutch C1 which receives the output of the power transmitting member 18. That is, each of the second (2nd) gear position, fourth (4th) gear position, sixth (6th) gear position, seventh (7th) gear position and eight (8th) gear position is the gear position that is established by the engagement of at least one of the first and second clutches C1, C2 that are arranged to receive the output of the power transmitting member 18. Therefore, in each of the second (2nd) gear position, fourth (4th) gear position, sixth (6th) gear position, seventh (7th) gear position and eight (8th) gear position, it is possible to obtain the speed ratio that is continuously variable as the rotational speed of the power transmitting member 18 is changed during the continuously-variable shifting state of the differential portion 11. Thus, the overall speed ratio (total speed ratio) γT of the transmission mechanism 10 is continuously variable.

However, each of the first (1st) gear position, third (3rd) gear position, fifth (5th) gear position and reverse (Rev) gear position is established in the automatic transmission portion 20 without the engagement of any one of the first and second clutches C1, C2, so that the rotary elements do not receive the output of the power transmitting member 18. Described in another point of view, when the automatic transmission portion 20 is placed in the first (1st) gear position, third (3rd) gear position, fifth (5th) gear position or reverse (Rev) gear position, the output of the engine 8 is directly received by the fourth rotary element RE4 and/or the fifth rotary element RE5 through the engagement of the third clutch C3 and/or the fourth clutch C4, and/or the rotation of the fifth rotary element RE5 or seventh rotary element RE7 is stopped by the engagement of the first brake B1 or second brake B2. That is, each of the first (1st) gear position, third (3rd) gear position, fifth (5th) gear position and reverse (Rev) gear position is the gear position that is established in the automatic transmission portion 20 by only the engagement of the hydraulically operated frictional coupling devices (third and fourth clutches C3, C4 and first and second brakes B1, B2) that are not influenced by change of the rotational speed of the power transmitting member 18. Therefore, in each of the first (1st) gear position, third (3rd) gear position, fifth (5th) gear position and reverse (Rev) gear position, the speed ratio is not changed even if the rotational speed of the power transmitting member 18 is changed with the differential portion 11 being placed in the continuously-variable shifting state.

Figures 4, 5:
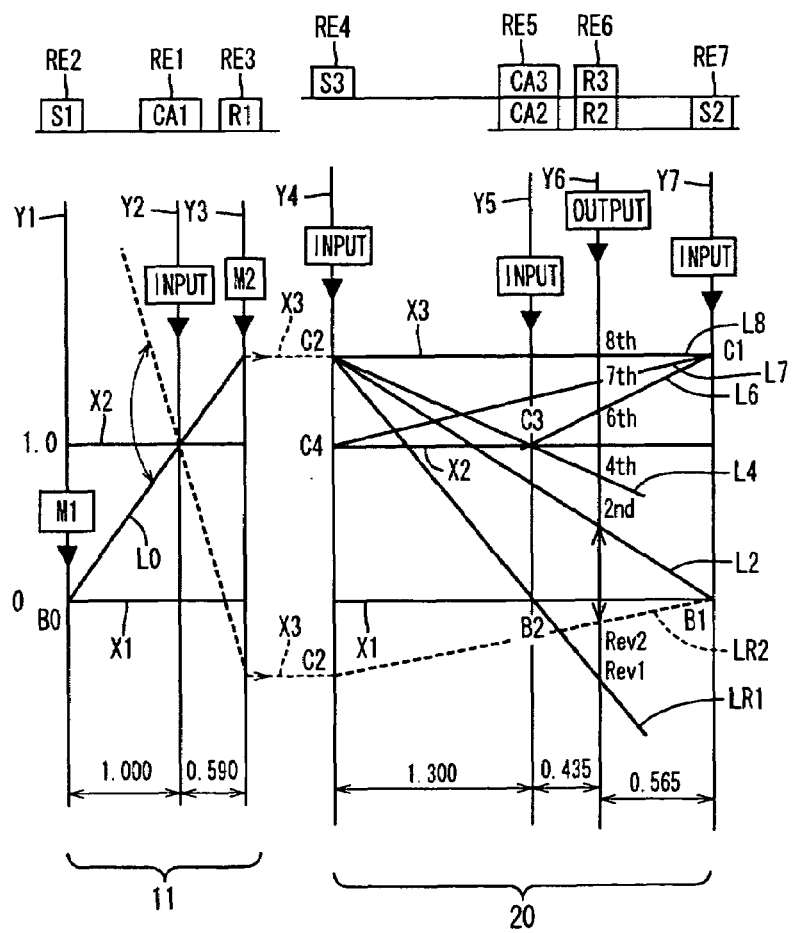
FIG. 4 is a table indicating shifting actions of the hybrid vehicle drive system of FIG. 1, where the drive system is operated in a continuously-variable shifting state, in relation to different combinations of operating states of the hydraulically operated frictional coupling devices to effect the respective shifting actions.
FIG. 5 is a collinear chart indicating relative rotational speeds of the hybrid vehicle drive system of FIG. 1 operated in the continuously-variable shifting state, in different gear positions of the drive system.

Thus, the transmission mechanism 10 can function as the continuously variable transmission while the differential portion 11 is held in the continuously-variable shifting state, as long as the second (2nd) gear position, fourth (4th) gear position, sixth (6th) gear position, seventh (7th) gear position or eight (8th) gear position is established in the automatic transmission portion 20.

Where the differential portion 11 is held in the continuously-variable shifting state, the switching brake B0 is always released, as indicated in FIG. 4. The second gear position (corresponding to the second gear position established during the non-continuously-variable shifting state of the differential portion 11) is established by engaging actions of the second clutch C2 and first brake B1. The fourth gear position (corresponding to the fourth gear position established during the non-continuously-variable shifting state of the differential portion 11) is established by engaging actions of the second and third clutches C2, C3. The sixth gear position (corresponding to the sixth gear position established during the non-continuously-variable shifting state of the differential portion 11) is established by engaging actions of the first and third clutches C1, C3. The seventh gear position (corresponding to the seventh gear position established during the non-continuously-variable shifting state of the differential portion 11) is established by engaging actions of the first and fourth clutches C1, C4. The eighth gear position (corresponding to the eighth gear position established during the non-continuously-variable shifting state of the differential portion 11) is established by engaging actions of the first and second clutches C1, C2. The first reverse gear position is established by engaging actions of the second clutch C2 and the second brake B2. The second reverse gear position is established by engaging actions of the second clutch C2 and the first brake B1. The neutral position N is established by releasing all of the frictional coupling devices including the clutches C1-C4 and the brakes B1, B2.

FIG. 5, which corresponds to FIG. 3, is a collinear chart indicating relative rotational speeds while the transmission mechanism 10 functions as the continuously-variable transmission with the switching brake B0 being released. As shown in FIG. 5, while the differential portion 11 is held in the non-continuously-variable shifting state with the switching brake B0 being released, the rotational speed of the first sun gear S1 (that is represented by a point of intersection between the straight line L0 and the vertical line Y1) is controllable to be changed over a wide range, by controlling a reaction force of the first electric motor M1, so that the straight line L0 is pivotable about a point of intersection between the horizontal line X2 and the vertical line Y2 over a range indicated by an arrow by way of example. Therefore, the rotational speed of the power transmitting member 18 or the first ring gear R1, which is represented by a point of intersection between the straight line L0 and the vertical line Y3, is changeable over a range including portions higher and lower than the engine rotational speed $N_E$.

During the continuously-variable shifting state of the transmission mechanism 10, when the second clutch C2 and the first brake B1 are engaged, the automatic transmission portion 20 is placed in the second (2nd) gear position. The rotational speed of the output shaft 22 in the second gear position is represented by a point of intersection between an inclined straight line L2 which passes a point of intersection between the vertical line Y4 indicative of the rotational speed of the fourth rotary element RE4 and the horizontal line X3 and a point of intersection between the vertical line Y7 indicative of the rotational speed of the seventh rotary element RE7 and the horizontal line X1, and the vertical line Y6 indicative of the rotational speed of the sixth rotary element RE6 connected to the output shaft 22, as indicated in FIG. 5. Similarly, the rotational speed of the output shaft 22 in the fourth (4th) gear position established by the engaging actions of the second and third clutches C2, C3 is represented by a point of intersection between an inclined straight line L4 determined by those engaging actions and the vertical line Y6 indicative of the rotational speed of the sixth rotary element RE6 connected to the output shaft 22. The rotational speed of the output shaft 22 in the sixth (6th) gear position established by the engaging actions of the first and third clutches C1, C3 is represented by a point of intersection between an inclined straight line L6 determined by those engaging actions and the vertical line Y6 indicative of the rotational speed of the sixth rotary element RE6 connected to the output shaft 22. The rotational speed of the output shaft 22 in the seventh (7th) gear position established by the engaging actions of the first and fourth clutches C1, C4 is represented by a point of intersection between an inclined straight line L7 determined by those engaging actions and the vertical line Y6 indicative of the rotational speed of the sixth rotary element RE6 connected to the output shaft 22. The rotational speed of the output shaft 22 in the eighth (8th) gear position established by the engaging actions of the first and second clutches C1, C2 is represented by a point of intersection between a horizontal line L8 determined by those engaging actions and the vertical line Y6 indicative of the rotational speed of the sixth rotary element RE6 fixed to the output shaft 22. Further, the rotational speed of the output shaft 22 in the first reverse (Rev1) gear position established by the engaging actions of the second clutch C2 and the second brake B2 is represented by a point of intersection between an inclined straight line LR1 determined by those engaging actions and the vertical line Y6 indicative of the rotational speed of the sixth rotary element RE6 connected to the output shaft 22. The rotational speed of the output shaft 22 in the second reverse (Rev2) gear position, which is established by the engaging actions of the second clutch C2 and the first brake B1 like the second (2nd) gear position, is represented by a point of intersection between an inclined broken straight line LR2 determined by those engaging actions and the vertical line Y6 indicative of the rotational speed of the sixth rotary element RE6 connected to the output shaft 22.

When the straight line L0 is pivoted to a position indicated by solid line with the second clutch C2 and the first brake B1 being engaged, the rotational speed of the output shaft 22 corresponds to that of the second (2nd) gear position that is represented by the point of intersection between the straight line L2 and the vertical line Y6. When the straight line L0 is pivoted to a position indicated by broken line with the second clutch C2 and the first brake B1 being engaged, the rotational speed of the output shaft 22 corresponds to that of the second reverse (Rev2) gear position that is represented by the point of intersection between the broken straight line LR2 and the vertical line Y6. That is, while the second clutch C2 and the first brake B1 are engaged, the rotational speed of the output shaft 22 is continuously changeable between the point of intersection between the straight line L2 and the vertical line Y6 and the point of intersection between the broken straight line LR2 and the vertical line Y6, as a result of pivot movement of the straight line L0 between the positions indicated by the solid line and the broken line. In this instance, when the rotational speed of the output shaft 22 is a positive rotational speed as in the position of the straight line L0 indicated by the solid line, the second gear position as a forward drive position is established. When the rotational speed of the output shaft 22 is a negative rotational speed as in the position of the straight line L0 indicated by the broken line, the second reverse gear position as a reverse drive position is established.

In each of the fourth, sixth, seventh and eighth gear positions, too, the rotational speed of the output shaft 22 represented by the point of intersection between the corresponding straight line and the vertical line Y6 is continuously changeable by of the pivot movement of the straight line L0. Consequently, while the differential portion 11 functions as the continuously variable transmission, with the automatic transmission portion 20 connected in series to the differential portion 11 functioning as the step-variable transmission, the speed of the rotary motion transmitted to the automatic transmission portion 20 placed in each gear position, i.e., the rotational speed of the power transmitting member 18 is continuously changed, so that the speed ratio of the drive system when the automatic transmission portion 20 is placed in each gear position is continuously variable over a predetermined range. Accordingly, the overall speed ratio $\gamma T$ of the transmission mechanism 10 is continuously variable.

As is apparent from FIG. 5, when the second reverse (Rev2) gear position is established, the rotational speed of the power transmitting member 18, i.e., the rotational speed inputted to the automatic transmission portion 20 is a negative rotational speed which is opposite in direction to that in each forward drive position, i.e., each of the second, fourth, sixth, seventh and eighth gear positions. That is, when the second reverse gear position is established, the direction of the rotation of each rotary element of the automatic transmission portion 20 is made opposite to that when each forward drive position is established. This is, in general, considered to be not preferable from a design point of view. However, this arrangement provides an advantage that the second reverse gear position can be established simply by causing the power transmitting member 18 to be rotated in the reverse direction while maintaining the same combinations of operating states of the frictional coupling devices that establish the second gear position.

When the first reverse (Rev1) gear position is established, the rotational speed of the power transmitting member 18 is a positive rotational speed which is the same in direction as that in each forward drive position. That is, since the direction of the rotation of each rotary element of the automatic transmission portion 20 is the same as in each forward drive position, it is possible to avoid the arrangement that is not preferable from a design point of view.

Figure 6:
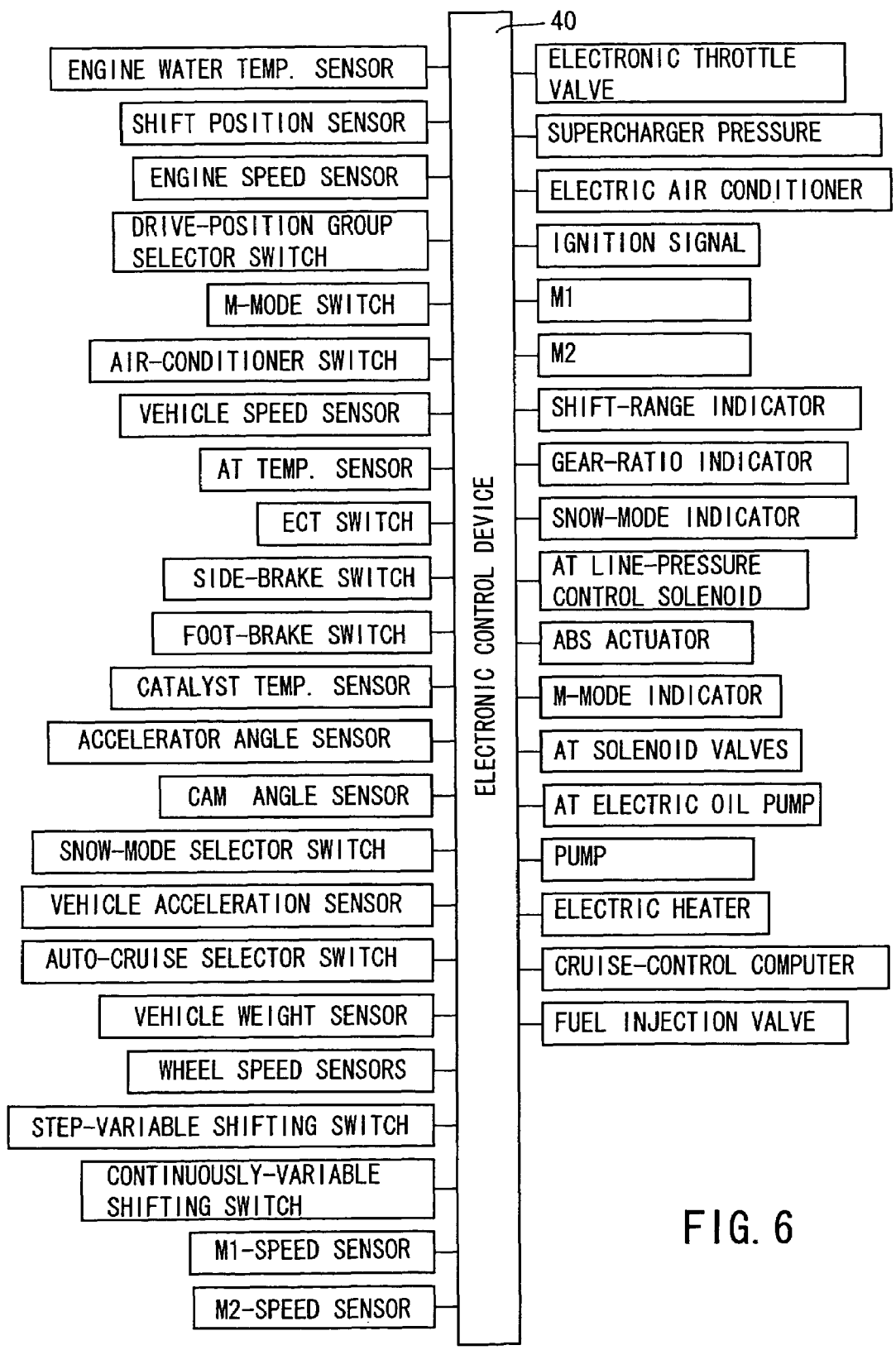
FIG. 6 is a view indicating input and output signals of an electronic control device according to one embodiment of this invention to control the drive system of FIG. 1.

FIG. 6 illustrates signals received by an electronic control device 40 provided to control the transmission mechanism 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the automatic transmission portion 20.

The electronic control device 40 is arranged to receive various sensors and switches shown in FIG. 6, various signals such as: a signal indicative of a temperature TEMP$_W$ of cooling water of the engine 8; a signal indicative of a selected operating position P$_{SH}$ of a shift lever; a signal indicative of the operating speed N$_E$ of the engine 8; a signal indicative of a value indicating a selected group of forward-drive positions of the transmission mechanism 10; a signal indicative of a M mode (motor drive mode); a signal indicative of an operated state of an air conditioner; a signal indicative of a vehicle speed V corresponding to the rotational speed N$_{OUT}$ of the output shaft 22; a signal indicative of a temperature of a working oil of the automatic transmission portion 20; a signal indicative of an operated state of a side brake; a signal indicative of an operated state of a foot brake; a signal indicative of a temperature of a catalyst; a signal indicative of an amount of operation (an angle of operation) A$_{CC}$ of an accelerator pedal corresponding to an amount of output requested by the vehicle operator; a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the differential portion 11 (power distributing mechanism 16) in the step-variable shifting state (locked state) in which the transmission mechanism 10 functions as a step-variable transmission; a signal indicative of a continuously-variable shifting switch provided to place the differential portion 11 in the continuously variable-shifting state (differential state) in which the transmission mechanism 10 functions as the continuously variable transmission; a signal indicative of a rotational speed N$_{M1}$ of the first electric motor M1 (hereinafter referred to as "first electric motor rotational speed N$_{M1}$); a signal indicative of a rotational speed N$_{M2}$ of the second electric motor M2 (hereinafter referred to as "second electric motor rotational speed N$_{M2}$); and a signal indicative of an amount of electric energy SOC stored in (a charging state of) an electric-energy storage device 60 (shown in FIG. 7).

The electronic control device 40 is further arranged to generate various signals such as a drive signal to drive a throttle actuator for controlling an angle of opening $\theta_{TH}$ of an electronic throttle valve 94, a signal to control an amount of supply of a fuel by a fuel injecting device 96 into the engine 8, a signal to be applied to an ignition device 98 to control the ignition timing of the engine 8, a signal to adjust a supercharger pressure of the engine 8, a signal to operate the electric air conditioner, signals to operate the electric motors M1 and M2, a signal to operate a shift-range indicator for indicating the selected operating or shift position, a signal to operate a gear-ratio indicator for indicating the gear ratio, a signal to operate a snow-mode indicator for indicating the selection of the snow drive mode, a signal to operate an ABS actuator for preventing slipping of the wheels during a braking operation, a signal to operate an M-mode indicator for indicating the selection of the M-mode, signals to operate solenoid-operated valves incorporated in a hydraulic control unit 42 (shown in FIG. 7) provided to control the hydraulic actuators of the hydraulically operated frictional coupling devices of the differential portion 11 and automatic transmission portion 20, a signal to operate an electric oil pump used as a hydraulic pressure source for the hydraulic control unit 42, a signal to drive an electric heater, and a signal to be applied to a cruise-control computer.

FIG. 7 is a functional block diagram for explaining major control functions of the electronic control device 40. A step-variable shifting control means (step-variable shifting control portion) 54 shown in FIG. 7 is arranged to determine whether a shifting action of the transmission mechanism 10 should take place, that is, to determine the gear position to which the automatic transmission portion 20 should be shifted. This determination is made on the basis of a condition of the vehicle in the form of the vehicle speed V and an output torque $T_{OUT}$ of the automatic transmission portion 20, and according to a shifting boundary line map (shifting control map or relation) which is stored in memory means (memory portion) 56 and which represents shift-up and shift-down boundary lines indicated by solid and one-dot chain lines in FIG. 8. The step-variable shifting control means 54 generates commands (shifting commands or hydraulic control command) to be applied to the hydraulic control unit 42, to selectively engage and release the two hydraulically operated frictional coupling devices (except the switching brake B0), for establishing the determined gear position of the automatic transmission portion 20 according to the tables of FIGS. 2 and 4. Described in detail, the step-variable shifting control means 54 commands the hydraulic control unit 42 to control the solenoid-operated valves incorporated in the hydraulic control unit 42, for activating the appropriate hydraulic actuators to concurrently engage one of the two frictional coupling device and release the other frictional coupling device, to effect the clutch-to-clutch shifting actions of the automatic transmission portion 20.

Specifically described, while the differential portion 11 is held in the continuously-variable shifting state, the step-variable shifting control means 54 is operated to change the speed ratio of the automatic transmission portion 20 by using only the gear positions established by the engagements of the hydraulically operated frictional coupling devices that are arranged to receive the output of the power transmitting member 18, namely, by using the second, fourth, sixth, seventh and eighth gear positions and the first and second reverse gear positions that are indicated in the table of FIG. 4.

That is, while the differential portion 11 is held in the continuously-variable shifting state, the step-variable shifting control means 54 changes the speed ratio of the automatic transmission portion 20 by using some of the gear positions established in the automatic transmission portion 20, namely, by using some or all of gear positions of the automatic transmission portion 20 which enable the transmission mechanism 10 as a whole to be placed in the continuously-variable shifting state.

On the other hand, while the differential portion 11 is held in the non-continuously-variable shifting state, the step-variable shifting control means 54 is operated to change the speed ratio of the automatic transmission portion 20 by using the gear positions established by the engagement of the hydraulically operated frictional coupling devices that are arranged to receive the output of the power transmitting member 18 and also the gear positions established by the engagement of the hydraulically operated frictional coupling devices that are arranged to receive the output of the engine 8, namely, by using the first through eighth gear positions and the reverse gear position that are indicated in the table of FIG. 2.

A hybrid control means (hybrid control portion) 52 functions as continuously-variable shifting control means and is arranged to control the engine 8 to be operated in an operating range of high efficiency, and control the first and second electric motors M1, M2 so as to optimize a proportion of drive forces generated by the engine 8 and the second electric motor M2, and the reaction force generated by the first electric motor M1 during its operation as the electric generator, for thereby controlling the speed ratio $\gamma 0$ of the differential portion 11 operating as the electrically controlled continuously variable transmission, while the transmission mechanism 10 is placed in the continuously-variable shifting state, that is, while the differential portion 11 is placed in the differential state. For instance, the hybrid control means 52 calculates a target (required) vehicle output at the present running speed V of the vehicle, on the basis of the operating amount $A_{CC}$ of the accelerator pedal 45 used as an operator's required vehicle output and the vehicle running speed V, and calculates a target total vehicle output on the basis of the calculated target vehicle output and a required amount of generation of an electric energy by the first electric motor M1. The hybrid control means 52 calculates a target output of the engine 8 to obtain the calculated target total vehicle output, while taking account of a power transmission loss, a load acting on various devices of the vehicle, an assisting torque generated by the second electric motor M2, etc. The hybrid control means 52 controls the speed $N_E$ and torque $T_E$ of the engine 8, so as to obtain the calculated target engine output, and the amount of generation of the electric energy by the first electric motor M1.

Figure 9:
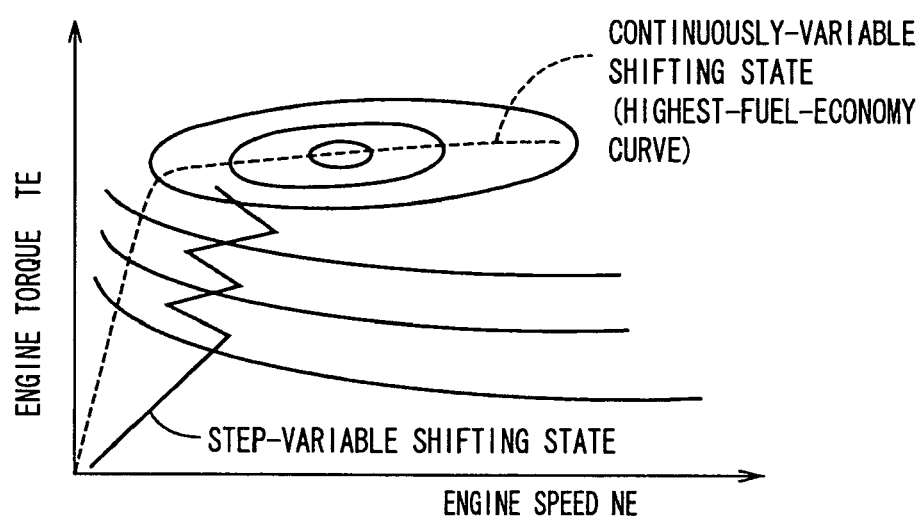
FIG. 9 is a view illustrating an example of a fuel consumption map defining a highest-fuel-economy curve of an engine 8, and explaining a difference between an operation of the engine in a continuously-variable shifting state (indicated by broken line) of the transmission mechanism and an operation of the engine in a step-variable shifting state (indicated by one-dot chain line) of the transmission mechanism.

The hybrid control means 52 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electrically controlled continuously-variable transmission, for optimum coordination of the engine rotational speed $N_E$ and vehicle speed V for efficient operation of the engine 8, and the rotational speed of the power transmitting member 18 determined by the selected gear position of the automatic transmission portion 20. That is, the hybrid control means 52 determines a target value of the overall speed ratio $\gamma T$ of the transmission mechanism 10, so that the engine 8 is operated according to a stored highest-fuel-economy curve (fuel-economy map or relation) stored in memory means and indicated by broken line in FIG. 9. The target value of the overall speed ratio $\gamma T$ of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine rotational speed $N_E$ and an axis of the engine torque $T_E$. The hybrid control means 52 controls the speed ratio $\gamma 0$ of the differential portion 11, so as to obtain the target value of the overall speed ratio $\gamma T$, so that the overall speed ratio $\gamma T$ can be controlled within a predetermined range, for example, between 13 and 0.5.

In the hybrid control, the hybrid control means 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the output shaft 22. Thus, the drive system is provided with an electric path through which an electric energy generated by conversion of a portion of a drive force of the engine 8 is converted into a mechanical energy.

The hybrid control means 52 includes engine output control means functioning to control the engine 8, so as to provide a required output, by controlling the throttle actuator to open and close the electronic throttle valve 94, and controlling an amount and time of fuel injection by the fuel injecting device 96 into the engine 8, and/or the timing of ignition of the igniter by the ignition device 98, alone or in combination. For instance, the hybrid control means 52 is basically arranged to control the throttle actuator on the basis of the operating amount $A_{CC}$ of the accelerator pedal and according to a predetermined stored relationship (not shown) between the operating amount $A_{CC}$ and the opening angle $\theta_{TH}$ of the electronic throttle valve 94 such that the opening angle $\theta_{TH}$ increases with an increase of the operating amount $A_{CC}$.

The hybrid control means 52 is capable of establishing a motor-drive mode to drive the vehicle by the electric motor, by utilizing the electric CVT function (differential function) of the differential portion 11, irrespective of whether the engine 8 is in the non-operated state or in the idling state. The motor-drive mode is generally established by the hybrid control means 52, when the output torque $T_{OUT}$ is in a comparatively low range in which the engine efficiency is comparatively low, namely, when the engine torque $T_E$ is in a comparatively low range, or when the vehicle speed V is in a comparatively low range, that is, when the vehicle load is comparatively low. Usually, therefore, the vehicle is started in the motor-drive mode, rather than in the engine-drive mode. However, where the required engine torque $T_E$ is increased due to a large depressing operation of the accelerator pedal upon starting of the vehicle, the vehicle may be started in the engine-drive mode.

For reducing a dragging of the engine 8 in its non-operated state and improving the fuel economy in the motor-drive mode, the hybrid control means 52 is arranged to hold the engine rotational speed $N_E$ at zero or substantially zero as needed, owing to the electric CVT function (differential function) of the differential portion 11, that is, by controlling the differential portion 11 to perform its electric CVT function (differential function), so that the first electric motor rotational speed 1 is controlled so as to be freely rotated to have a negative speed $N_{M1}$.

The hybrid control means 52 is further capable of performing a so-called "drive-force assisting" operation (torque assisting operation) to assist the engine 8, by supplying an electric energy from the first electric motor M1 or the electric-energy storage device 60 to the second electric motor M2, so that the second electric motor M2 is operated to transmit a drive torque to the drive wheels 38. Thus, in the present embodiment, the second electric motor M2 may be used in addition to the engine 8, in the engine-drive mode.

The hybrid control means 52 is arranged to hold the engine 8 in an operated state owing to the electric CVT function of the differential portion 11, irrespective of whether the vehicle is stationary or running at a relatively low speed. When the first electric motor M1 is required to be operated to charge the electric-energy storage device 60 while the vehicle is stationary, in order to charge the electric-energy storage device 60 where the electric energy amount SOC stored in the storage device 60 is reduced, the speed $N_E$ of the engine 8 which is operated to operate the first electric motor M1 at a relatively high speed can be kept high enough to permit the operation of the engine 8 by itself, owing to the differential function of the power distributing mechanism 16, even while the operating speed of the second electric motor M2 determined by the vehicle speed V is zero (substantially zero) when the vehicle is stationary.

The hybrid control means 52 is further arranged to hold the engine rotational speed $N_E$ substantially constant or at a desired value, by controlling the first electric motor rotational speed $N_{M1}$ and/or the second electric motor rotational speed $N_{M2}$ owing to the electric CVT function of the differential portion 11, irrespective of whether the vehicle is stationary or running. In other words, the hybrid control means 52 is capable of controlling the first electric motor rotational speed $N_{M1}$ and/or the second electric motor rotational speed $N_{M2}$ as desired while holding the engine rotational speed $N_E$ substantially constant or at a desired value. For example, as is apparent from the collinear chart of FIG. 3, to raise the engine rotational speed $N_E$ during running of the vehicle, the hybrid control means 52 raises the rotational speed $N_{M1}$ of the first electric motor M1 while holding the rotational speed $N_{M2}$ of the second electric motor M2 substantially constant, since the rotational speed $N_{M2}$ is determined by the vehicle speed V (speed of the drive wheels 38).

A switching control means (switching control portion) 50 is arranged to selectively switch the transmission mechanism 10 between the continuously-variable shifting state and the step-variable shifting state, that is, between the differential state and the locked state, by engaging and releasing the switching brake B0 on the basis of the vehicle condition. For example, the switching control means 50 is arranged to determine whether the shifting state of the transmission mechanism 10 (differential portion 11) should be changed, on the basis of the vehicle condition represented by the vehicle speed V and the required output torque $T_{OUT}$ and according to the switching boundary line map (switching control map or relation) stored in the memory means 56 and indicated by broken and two-dot chain lines in FIG. 8 by way of example, namely, whether the vehicle condition is in the continuously-variable shifting region for placing the transmission mechanism 10 in the continuously-variable shifting state, or in the step-variable shifting region for placing the transmission mechanism 10 in the step-variable shifting state. The switching control means 50 places the transmission mechanism 10 in the continuously-variable shifting state or step-variable shifting state, depending upon whether the vehicle condition is in the continuously-variable shifting region or in the step-variable shifting region.

Described in detail, when the switching control means 50 determines that the vehicle condition is in the step-variable shifting region for placing the transmission mechanism 10 in the step-variable shifting state, the switching control means 50 commands the hydraulic control unit 42 to engage the switching brake B0, for enabling the differential portion 11 to function as an auxiliary transmission having a fixed speed ratio γ0 of about 0.6, for example. At the same time, the switching control means 50 disables or inhibits the hybrid control means 52 from implementing a hybrid control or continuously-variable shifting control, and allows the step-variable shifting control means 54 to implement a predetermined step-variable shifting control in which the automatic transmission portion 20 is automatically shifted according to the shifting boundary line map stored in the memory means 56 and indicated in FIG. 8 by way of example. FIG. 2 indicates the combinations of the engaging actions of the hydraulically operated frictional coupling devices C1, C2, C3, C4, B1 and B2, which are stored in the memory means 56 and which are selectively used for automatic shifting of the automatic transmission portion 20. In the step-variable shifting state, the transmission mechanism 10 as a whole constituted by the differential portion 11 and the automatic transmission portion 20 functions as a so-called step-variable automatic transmission which is automatically shifted according to the table of FIG. 2. Thus, when the differential portion 11 is switched to the step-variable shifting state by the switching control means 50, the differential portion 11 is operated as the auxiliary transmission while the automatic transmission portion 20 connected in series to the differential portion 11 functions as a step-variable transmission, so that the transmission mechanism 10 as a whole functions as the so-called step-variable automatic transmission.

When the switching control means 50 has determined that the vehicle condition is in the continuously-variable shifting region for placing the transmission mechanism 10 in the continuously-variable shifting state, the switching control means 50 commands the hydraulic control unit 42 to release the switching brake B0, for placing the differential portion 11 in the continuously-variable shifting state. At the same time, the switching control means 50 allows the hybrid control means 52 to implement the hybrid control, and allows the step-variable shifting control means 54 to effect a predetermined shifting action that is to be effected during the continuously-variable shifting state of the transmission mechanism 10. In this instance, the variable-step shifting control means 54 causes the automatic transmission portion 20 to be automatically shifted according to the shifting boundary line map stored in the memory means 56 and indicated in FIG. 8 by way of example. The table of FIG. 4 stored in the memory means 56 indicates combinations of operating states of the hydraulically operated frictional coupling devices (i.e., C1, C2, C3, C4, B1, B2), which combinations to be selected to implement the automatic shifting control. That is, the transmission mechanism 10 as a whole functions as the so-called continuously-variable automatic transmission, and the automatic transmission portion 20 is automatically shifted according to the table of FIG. 4. Thus, the differential portion 11 switched to the continuously-variable shifting state under the control of the switching control means 50 functions as the continuously variable transmission while the automatic transmission portion 20 connected in series to the differential portion 11 functions as the step-variable transmission, so that the transmission mechanism 10 provides a sufficient vehicle drive force, such that the input rotational speed of the automatic transmission portion 20 placed in one of the second, fourth, sixth, seventh and eighth gear positions, namely, the rotational speed of the power transmitting member 18 is continuously changed, so that the speed ratio of the transmission mechanism 10 when the automatic transmission portion 20 is placed in one of those gear positions is continuously variable over a predetermined range. Accordingly, the speed ratio of the automatic transmission portion 20 is continuously variable across the adjacent gear positions, whereby the total speed ratio γT of the transmission mechanism 10 is continuously variable.

Figure 8:
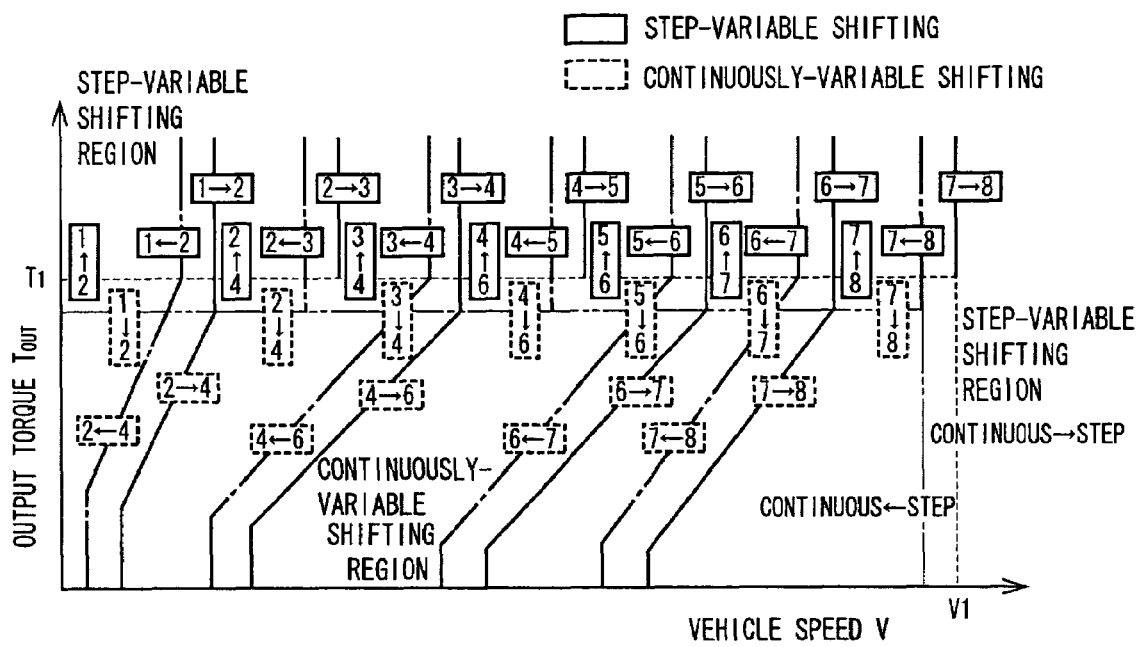
FIG. 8 is a view illustrating an example of a stored shifting boundary line map used for determining a shifting action of an automatic transmission portion, and an example of a stored switching boundary line map used for switching the shifting state of a transmission mechanism, in the same two-dimensional coordinate system defined by control parameters in the form of a running speed and an output torque of the vehicle, such that those maps are related to each other.

The maps of FIG. 8 will be described in detail. The shifting boundary line map (shifting control map or relation) shown in FIG. 8 by way of example and stored in the memory means 56 is used for determining whether the automatic transmission portion 20 should be shifted, and is defined in a two-dimensional coordinate system by control parameters consisting of the vehicle speed V and the drive-force-related value in the form of the required output torque $T_{OUT}$. In FIG. 8, the solid lines indicate the shift-up boundary lines, while the one-dot chain lines indicate the shift-down boundary lines. The shifting boundary line map indicated in the continuously-variable shifting region (surrounded by the broken lines) is a continuously-variable shifting boundary line map used for the shifting action of the automatic transmission portion 20 while the differential portion 11 is held in the continuously-variable shifting state. Meanwhile, the shifting boundary line map indicated in the step-variable shifting region (not surrounded by the broken lines) is a step-variable shifting boundary line map used for the shifting action of the automatic transmission portion 20 while the differential portion 11 is held in the step-variable shifting state.

The broken lines in FIG. 8 represent the upper vehicle-speed limit V1 and the upper output-torque limit T1 which are used for the switching control means 50 to determine whether the vehicle condition is in the step-variable shifting region or the continuously-variable shifting region. In other words, the broken lines represent a high-speed-running boundary line indicative of the upper vehicle-speed limit V1 above which it is determined that the hybrid vehicle is in a high-speed-running state, and a high-output-running boundary line indicative of the upper output-torque limit T1 of the output torque Tour of the automatic transmission portion 20 above which it is determined that the hybrid vehicle is in a high-output running state. The output torque $T_{OUT}$ is an example of the drive-force-related value which relates to the drive force of the hybrid vehicle. FIG. 8 also shows two-dot chain lines which are offset with respect to the broken lines, by a suitable amount of control hysteresis for determination as to whether the step-variable shifting state is changed to the continuously-variable shifting state or vice versa. Thus, the broken lines and two-dot chain lines of FIG. 8 constitute the stored switching boundary line map (switching control map or relation) used by the switching control means 50 to determine whether the vehicle condition is in the step-variable shifting region or the continuously-variable shifting region, depending upon whether the control parameters in the form of the vehicle speed V and the output torque $T_{OUT}$ are higher than the predetermined upper limit values V, T1. This switching boundary line map may be stored in the memory means 56, together with the shifting boundary line map. The switching boundary line map may use at least one of the upper vehicle-speed limit V1 and the upper output-torque limit T1, or at least one of the vehicle speed V and the output torque $T_{OUT}$, as at least one parameter.

The above-described shifting boundary line map, switching boundary line, and drive-power-source switching map may be replaced by stored equations for comparison of the actual vehicle speed V with the limit value V1 and comparison of the actual output torque $T_{OUT}$ with the limit value T1. In this case, the switching control means 50 switches the transmission mechanism 10 in the step-variable shifting state, when the actual vehicle speed V has exceeded the upper limit V1, or when the output torque $T_{OUT}$ of the automatic transmission portion 20 has exceeded the upper limit T1.

The switching control means 50 may be arranged to place the transmission mechanism 10 in the step-variable shifting state even when the vehicle condition is in the continuously-variable shifting region, upon detection of any functional failure or deterioration of the electric components such as the electric motors which are operable to operate the differential portion 11 as the electrically controlled continuously variable transmission. Those electric components include components such as the first electric motor M1, second electric motor M2, inverter 58, electric-energy storage device 60 and electric lines interconnecting those components, which are associated with the electric path through which an electric energy generated by the first electric motor M1 is converted into a mechanical energy. The functional deterioration of the components may be caused by their failure or a drop of their temperatures.

The drive-force-related value indicated above is a parameter corresponding to the drive force of the vehicle, which may be the output torque $T_{OUT}$ of the automatic transmission portion 20, the engine output torque $T_E$ or an acceleration value G of the vehicle, as well as a drive torque or drive force of drive wheels 38. The parameter may be: an actual value calculated on the basis of the operating amount $A_{CC}$ of the accelerator pedal 45 or the opening angle of the throttle valve (or intake air quantity, air/fuel ratio or amount of fuel injection) and the engine rotational speed $N_E$; or any one of estimated values of the required (target) engine torque $T_E$, required (target) output torque $T_{OUT}$ of the transmission potion 20 and required vehicle drive force, which are calculated on the basis of the operating amount $A_{CC}$ of the accelerator pedal 45 or the operating angle of the throttle valve. The above-described vehicle drive torque may be calculated on the basis of not only the output torque $T_{OUT}$, etc., but also the ratio of the differential gear device 36 and the radius of the drive wheels 38, or may be directly detected by a torque sensor or the like.

For instance, the upper vehicle-speed limit V1 is determined such that the transmission mechanism 10 is placed in the step-variable shifting state while the vehicle is in the high-speed running state. This determination is effective to reduce a possibility of deterioration of the fuel economy of the vehicle if the transmission mechanism 10 were placed in the continuously-variable shifting state while the vehicle is in the high-speed running state. On the other hand, the upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle.

Figure 10:
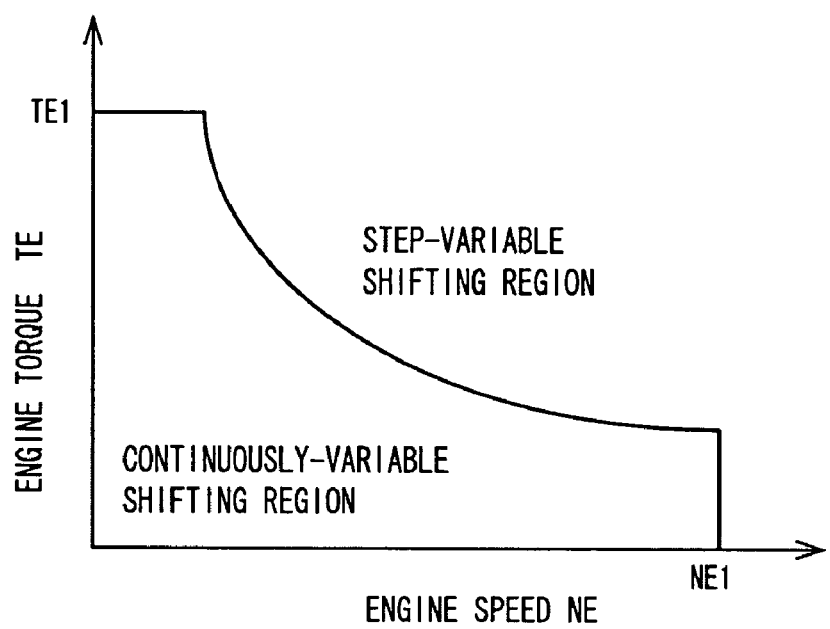
FIG. 10 is a view illustrating a stored relationship defining boundary lines between a continuously-variable shifting region and a step-variable shifting region, which relationship is used to map boundary line defining the continuously-variable and step-variable shifting regions which are indicated by broken lines in FIG. 8.

Referring to FIG. 10, there is shown a switching boundary line map (switching control map or relation) which is stored in the memory means 56 and which defines engine-output lines serving as boundary lines used by the switching control means 50 to determine whether the vehicle condition is in the step-variable or continuously-variable shifting region. These engine-output lines are defined by control parameters in the form of the engine rotational speed $N_E$ and the engine torque $T_E$. The switching control means 50 may use the switching boundary line map of FIG. 10 in place of the switching boundary line map of FIG. 8, to determine whether the vehicle condition is in the continuously-variable or step-variable shifting region, on the basis of the engine rotational speed $N_E$ and engine torque $T_E$. The switching boundary line map of FIG. 8 may be based on the switching boundary line map of FIG. 10. In other words, the broken lines in FIG. 8 may be determined on the basis of the relation (map) of FIG. 10, in the two-dimensional coordinate system defined by the control parameters in the for of the vehicle speed V and the output torque $T_{OUT}$.

The step-variable shifting region defined by the switching boundary line map of FIG. 8 is defined as a high-torque drive region in which the output torque $T_{OUT}$ is not lower than the predetermined upper limit T1, or a high-speed drive region in which the vehicle speed V is not lower than the predetermined upper limit V1. Accordingly, the step-variable shifting control is implemented when the torque of the engine 8 is comparatively high or when the vehicle speed V is comparatively high, while the continuously-variable shifting control is implemented when the torque of the engine 8 is comparatively low or when the vehicle speed V is comparatively low, that is, when the engine 8 is in a normal output state.

Similarly, the step-variable shifting region defined by the switching boundary line map of FIG. 10 is defined as a high-torque drive region in which the engine torque $T_E$ is not lower than the predetermined upper limit TE1, or a high-speed drive region in which the engine rotational speed $N_E$ is not lower than the predetermined upper limit NE1, or alternatively defined as a high-output drive region in which the output of the engine 8 calculated on the basis of the engine torque $N_T$ and engine rotational speed $N_E$ is not lower than a predetermined limit. Accordingly, the step-variable shifting control is implemented when the torque $T_E$, speed $N_E$ or output of the engine 8 is comparatively high, while the continuously-variable shifting control is implemented when the torque $T_E$, speed $N_E$ or output of the engine 8 is comparatively low, that is, when the engine 8 is in the normal output state. The boundary lines of the switching boundary switching map of FIG. 10 may be considered as high-speed threshold lines or high-engine-output threshold lines, which define upper limit of the vehicle speed V or engine output.

In the present embodiment described above, the transmission mechanism 10 is placed in the continuously-variable shifting state in a low-speed or medium-speed running state of the vehicle or in a low-output or medium-output running state of the vehicle, assuring a high degree of fuel economy of the vehicle. In a high-speed running of the vehicle at the vehicle speed V higher than the upper limit V1, the transmission mechanism 10 is placed in the step-variable shifting state in which the output of the engine 8 is transmitted to the drive wheels 38 primarily through the mechanical power transmitting path, so that the fuel economy is improved owing to reduction of a loss of conversion of the mechanical energy into the electric energy, which would take place when the differential portion 11 functions as the electrically controlled continuously variable transmission.

In a high-output running state of the vehicle with the output torque $T_{OUT}$ higher than the upper limit T1, too, the transmission mechanism 10 is placed in the step-variable shifting state. Therefore, the transmission mechanism 10 is placed in the continuously-variable shifting state only when the vehicle speed V is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required size of the first electric motor M1, and the required size of the drive system including the electric motor M1.

Namely, the upper limit TE1 is determined such that the first electric motor M1 can withstand the reaction torque when the engine output $T_E$ is not higher than the upper limit TE1, and the differential portion 11 is placed in the step-variable shifting state when the vehicle is in the high-output running state in which the engine torque $T_E$ is higher than the upper limit TE1. In the step-variable shifting state of the differential portion 11, therefore, the first electric motor M1 need not withstand the reaction torque with respect to the engine torque $T_E$ as in the continuously-variable shifting state of the differential portion 11, making it possible to reduce deterioration of durability of the first electric motor M1 while preventing an increase of its required size. In other words, the required maximum output of the first electric motor M1 in the present embodiment can be made smaller than its reaction torque capacity corresponding to the maximum value of the engine output $T_E$. That is, the required maximum output of the first electric motor M1 can be determined such that its reaction torque capacity is smaller than a value corresponding to the engine torque $T_E$ exceeding the upper limit TE1, so that the first electric motor M1 can be small-sized.

The maximum output of the first electric motor M1 is a nominal rating of this motor which is determined by experimentation in the environment in which the motor is operated.

The above-described upper limit of the engine torque $T_E$ is determined by experimentation such that the upper limit is a value which is equal to or lower than the maximum value of the engine torque $T_E$, and below which the first electric motor M1 can withstand the reaction torque, so that the deterioration of durability of the first electric motor M1 can be reduced.

Figure 11:
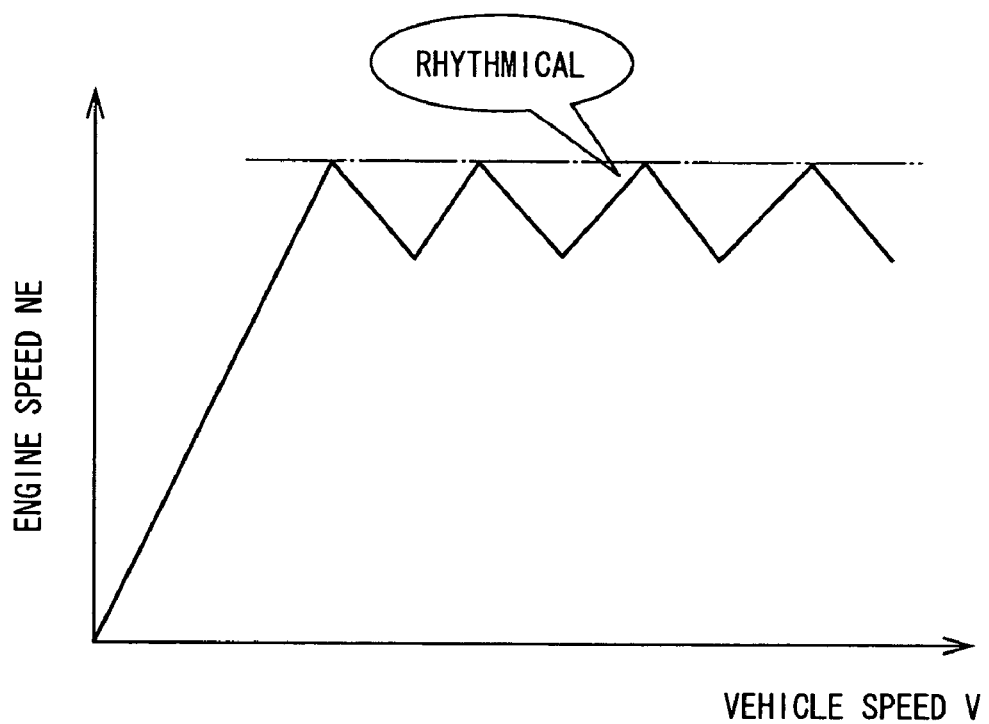
FIG. 11 is a view indicating an example of a change of the engine rotational speed as a result of a shift-up action of the step-variable transmission.

According to the other concept, the transmission mechanism 10 is placed in the step-variable shifting state (fixed-speed-ratio shifting state), rather than in the continuously-variable shifting state, in the high-output running state of the vehicle in which the vehicle operator has a stronger desire for improved drivability of the vehicle rather than improved fuel economy. In this case, the engine rotational speed $N_E$ is changed with a shift-up action of the automatic transmission portion 20, assuring a comfortable rhythmic change of the engine rotational speed $N_E$ as the automatic transmission portion 20 is shifted up, as indicated in FIG. 11.

Figure 12:
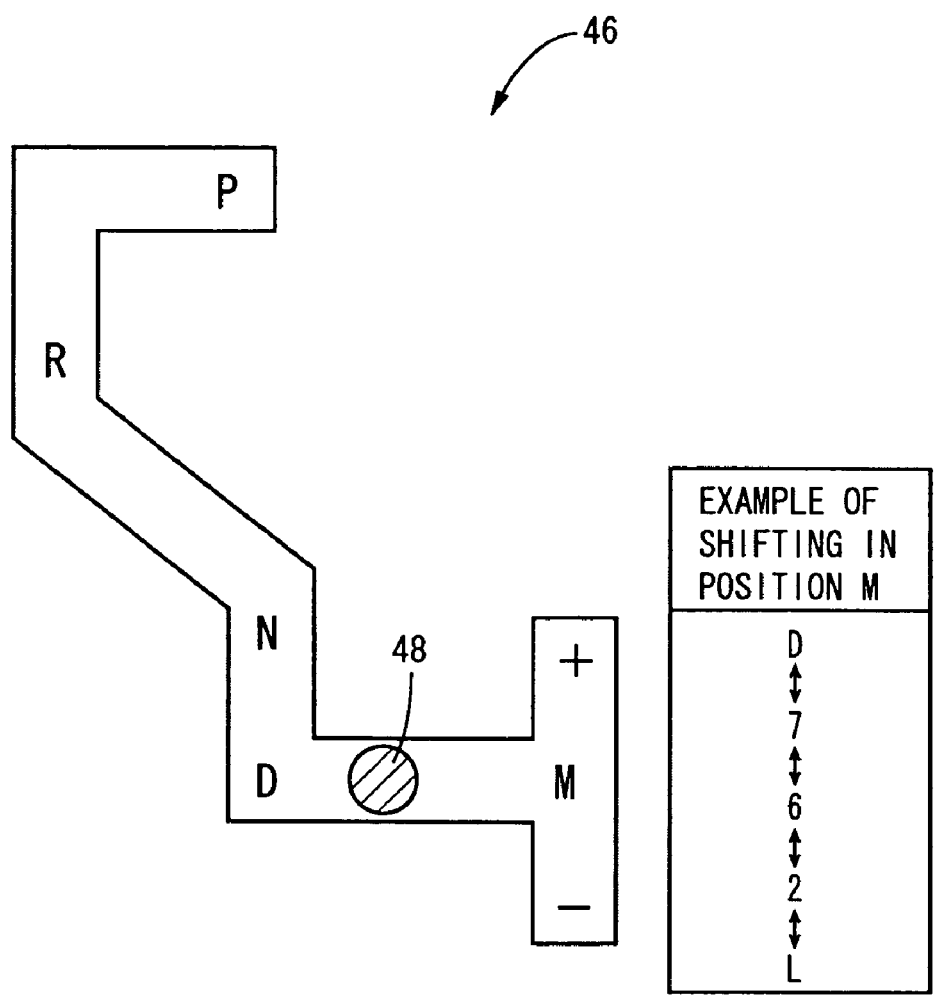
FIG. 12 is a view showing an example of a manually operated shifting device including a shift lever and operable to select one of a plurality of shift positions.

FIG. 12 shows an example of a manually operable shifting device in the form of a shifting device 46. The shifting device 46 includes the above-described shift lever 48, which is disposed laterally adjacent to an operator's seat, for example, and which is manually operated to select one of a plurality of positions consisting of a parking position P for placing the drive system 10 (namely, automatic transmission portion 20) in a neutral state in which a power transmitting path is disconnected with both of the first and second clutches C1, C2 placed in the released state (as shown in the table of FIG. 2), and at the same time the output shaft 22 of the automatic transmission portion 20 is in the locked state; a reverse-drive position R for driving the vehicle in the rearward direction; a neutral position N for placing the drive system 10 in the neutral state; an automatic forward-drive shifting position D; and a manual forward-drive shifting position M.

When the shift lever 48 is operated to a selected one of the shift positions, a manual valve incorporated in the hydraulic control unit 42 and operatively connected to the shift lever 48 is operated to establish the corresponding state of the hydraulic control unit 42. In the automatic forward-drive position D or the manual forward-drive position M, one of the first through fifth gear positions (1st through 5th) indicated in the table of FIG. 2 is established by electrically controlling the appropriate solenoid-operated valves incorporated in the hydraulic control unit 42.

The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power-cut-off state established by releasing both of the clutches C1 and C2, as shown in the table of FIG. 2. In the drive positions R, D, M, the power transmitting path in the automatic transmission portion 20 is in the power-transmitting state established by engaging at least one of the clutches C1 and C2, as also shown in the table of FIG. 2.

Described in detail, a manual operation of the shift lever 48 from the parking position P or neutral position N to the reverse-drive position R causes the second clutch C2 to be engaged for switching the power transmitting path in the automatic transmission portion 20 from the power-cut-off state to the power-transmitting state. A manual operation of the shift lever 48 from the neutral position N to the automatic forward-drive position D causes at least the first clutch C1 to be engaged for switching the power transmitting path in the automatic transmission portion 20 from the power-cut-off state to the power-transmitting state. The automatic forward-drive position D provides a highest-speed position, and positions "4" through "L" selectable in the manual forward-drive position M are engine-braking positions in which an engine brake is applied to the vehicle.

The manual forward-drive position M is located at the same position as the automatic forward-drive position D in the longitudinal direction of the vehicle, and is spaced from or adjacent to the automatic forward-drive position D in the lateral direction of the vehicle. The shift lever 48 is operated to the manual forward-drive position M, for manually selecting one of the above-indicated positions "D" through "L". Described in detail, the shift lever 48 is movable from the manual forward-drive position M to a shift-up position "+" and a shift-down position "−", which are spaced from each other in the longitudinal direction of the vehicle. Each time the shift lever 48 is moved to the shift-up position "+" or the shift-down position "−", the presently selected position is changed by one position. The five positions "D" through "L" have respective different lower limits of a range in which the overall speed ratio γT of the transmission mechanism 10 is automatically variable, that is, respective different lowest values of the overall speed ratio γT which corresponds to the highest output speed of the transmission mechanism 10. Namely, the five positions "D" through "L" select respective different numbers of the speed positions (gear positions) of the automatic transmission portion 20 which are automatically selectable, so that the lowest overall speed ratio γT available is determined by the selected number of the gear positions. The shift lever 48 is biased by biasing means such as a spring such that the shift lever 48 is automatically returned from the shift-up position "+" and shift-down position "−" back to the manual forward-drive position M. The shifting device 46 is provided with a shift-position sensor 49 operable to detect the presently selected position of the shift lever 48, so that signals indicative of the presently selected operating position of the shift lever 48 and the number of shifting operations of the shift lever 48 in the manual forward-shifting position M.

When the shift lever 48 is operated to the automatic forward-drive position D, the switching control means 50 effects an automatic switching control of the transmission mechanism 10 according to the stored switching boundary line map indicated in FIG. 7, and the hybrid control means 52 effects the continuously-variable shifting control of the power distributing mechanism 16, while the step-variable shifting control means 54 effects an automatic shifting control of the automatic transmission portion 20. When the transmission mechanism 10 is placed in the step-variable shifting state, for example, the shifting action of the transmission mechanism 10 is automatically controlled to select an appropriate one of the first through eighth gear positions indicated in FIG. 2. When the drive system is placed in the continuously-variable shifting state, the speed ratio of the power distributing mechanism 16 is continuously changed, while the shifting action of the automatic transmission portion 20 is automatically controlled to select an appropriate one of the second, fourth, sixth, seventh and eighth gear positions, so that the overall speed ratio γT of the transmission mechanism 10 is controlled so as to be continuously variable within the predetermined range. The automatic forward-drive position D is a position selected to establish an automatic shifting mode (automatic mode) in which the transmission mechanism 10 is automatically shifted.

When the shift lever 48 is operated to the manual forward-drive position M, on the other hand, the shifting action of the transmission mechanism 10 is automatically controlled by the switching control means 50, hybrid control means 52 and step-variable shifting control means 54, such that the overall speed ratio γT is variable within a predetermined range the lower limit of which is determined by the gear position having the lowest speed ratio, which gear position is determined by the manually selected one of the shift positions. When the transmission mechanism 10 is placed in the step-variable shifting state, for example, the shifting action of the transmission mechanism 10 is automatically controlled within the above-indicated predetermined range of the overall speed ratio γT. When the transmission mechanism 10 is placed in the continuously-variable shifting state, the speed ratio of the power distributing mechanism 16 is continuously changed, while the shifting action of the automatic transmission portion 20 is automatically controlled to select an appropriate one of the gear positions the number of which is determined by the manually selected one of the shift positions, so that the overall speed ratio γT of the transmission mechanism 10 is controlled so as to be continuously variable within the predetermined range. The manual forward-drive position M is a position selected to establish a manual shifting mode (manual mode) in which the selectable gear positions of the transmission mechanism 10 are manually selected.

In the present embodiment, the transmission mechanism 10 (differential portion 11 or power distributing mechanism 16) is switchable between the continuously-variable shifting state (differential state) and the non-continuously-variable shifting state (locked state, step-variable shifting state), and the switching control means 50 is arranged to select one of those two shifting states of the differential portion 11 on the basis of the vehicle condition, so that the differential portion 11 is placed in the selected one of the continuously-variable shifting state and the step-variable shifting state.

As indicated by the relationship of FIG. 8, during running of the vehicle with the transmission mechanism 10 held in the continuously-variable shifting state, when the output torque $T_{OUT}$ is made higher than the upper limit T1 by a depressing operation of the accelerator pedal, the transmission mechanism 10 is switched to the step-variable shifting state by the switching control means 50. In this instance upon switching of the transmission mechanism 10 to the step-variable shifting state, the switching brake B0 is engaged whereby the first electric motor rotational speed $N_{M1}$ is zeroed, in other words, the speed ratio γ0 of the differential portion 11 is made smaller than in the continuously-variable shifting state. Therefore, in this instance, there is a possibility that the engine rotational speed $N_E$ is temporarily reduced if there is no change in the rotational speed of the power transmitting member 18 that is bound by the running speed V of the vehicle. In such an event, the engine rotational speed $N_E$ could be reduced in spite of the depressing operation of the accelerator pedal, thereby possibly giving discomfort to the vehicle user.

Further, as indicated by the relationship of FIG. 8, during running of the vehicle with the transmission mechanism 10 held in the step-variable shifting state, when the output torque $T_{OUT}$ is made equal or lower than the upper limit T1 by a returning operation of the accelerator pedal, the transmission mechanism 10 is switched to the continuously-variable shifting state by the switching control means 50. In this instance upon switching of the transmission mechanism 10 to the continuously-variable shifting state, the switching brake B0 is released whereby the first electric motor M1 is rotatable owing to a reaction torque generated by the motor M1 in response to the engine torque, in other words, the speed ratio γ0 of the differential portion 11 is made larger than in the non-continuously-variable shifting state. Therefore, in this instance, there is a possibility that the engine rotational speed $N_E$ is temporarily increased if there is no change in the rotational speed of the power transmitting member 18 that is bound by the running speed V of the vehicle. In such an event, the engine rotational speed $N_E$ could be increased in spite of the returning operation of the accelerator pedal, thereby possibly giving discomfort to the vehicle user.

In view of the above-described facts, upon switching of the differential portion 11 between the continuously-variable shifting state and the non-continuously-variable shifting state, the speed ratio of the automatic transmission portion 20 is changed concurrently with the switching of the differential portion 11, so as to change the rotational speed of the power transmitting member 18 that is bound by the running speed V of the vehicle, for thereby changing the engine rotational speed $N_E$, such that the vehicle user is restrained from suffering from discomfort caused by the change of the engine rotational speed $N_E$ that is caused by the switching of the differential portion 11 between the continuously-variable shifting state and the non-continuously-variable shifting state. Described in another point of view, the shifting action of the automatic transmission portion 20 is effected concurrently with the switching of the differential portion 11 between the continuously-variable shifting state and the non-continuously-variable shifting state, for improving responsiveness of the change of the engine rotational speed during the switching of the differential portion 11 between the continuously-variable shifting state and the non-continuously-variable shifting state, without discomfort caused to the vehicle user by the switching of the differential portion 11.

Described specifically, switching-necessity determining means (switching-necessity determining portion) 62 is provided to determine whether it has been determined, on the basis of the vehicle condition, that the differential portion 11 needs to be switched by the switching control means 50 between the continuously-variable shifting state and the non-continuously-variable shifting state. For example, the switching-necessity determining means 62 determines whether it has been determined that the differential portion 11 needs to be switched by the switching control means 50 from the continuously-variable shifting state to the non-continuously-variable shifting state. Further, the switching-necessity determining means 62 determines whether it has been determined that the differential portion 11 needs to be switched by the switching control means 50 from the non-continuously-variable shifting state to the continuously-variable shifting state.

The step-variable shifting control means 54 functions as automatic transmission control means or an automatic transmission controller that is operable, when the switching-necessity determining means 62 determines that the differential portion 11 needs to be switched by the switching control means 50 between the continuously-variable shifting state and the non-continuously-variable shifting state, to determine the gear position that is to be established in the automatic transmission portion 20, and to effect a shifting action of the automatic transmission portion 20 for establishing the determined gear position in the automatic transmission portion 20. In this instance, the step-variable shifting control means 54 changes the speed ratio of the automatic transmission portion 20 concurrently with the switching of the differential portion 11 between the continuously-variable shifting state and the non-continuously-variable shifting state. More specifically described, the speed ratio of the automatic transmission portion 20 is changed during a time period from a point of time at which it is determined that the differential portion 11 needs to be switched, to a point of time at which the switching of the differential portion 11 is actually completed.

That is, the term "changing the speed ratio of the automatic transmission portion 20 concurrently with the switching of the differential portion 11 between the continuously-variable shifting state and the non-continuously-variable shifting state" is interpreted to mean "changing the speed ratio of the automatic transmission portion 20 during the above-described time period from the point of time of the determination of necessity of the switching of the differential portion 11 to the point of time of actual completion of the switching of the differential portion 11". It is noted that the term "changing the speed ratio of the automatic transmission portion 20 concurrently with the switching of the differential portion 11" should be interpreted to encompass also a case where the above-described time period does not overlap with the entirety of a time period from initiation of the shifting action of the transmission portion 20 to completion of the shifting action of the transmission portion 20 but overlaps with a part of that time period.

When the switching-necessity determining means 62 determines that the differential portion 11 needs to be switched by the switching control means 50 from the continuously-variable shifting state to the non-continuously-variable shifting state, the step-variable shifting control means 54 determines the gear position that is to be established in the automatic transmission portion 20 for causing the engine rotational speed $N_E$ to be increased during the switching of the differential portion 11, and then effects a shift-down action of the automatic transmission portion 20 for establishing the determined gear position in the automatic transmission portion 20. In this arrangement, owing to the increase of the engine rotational speed $N_E$ caused by the shift-down action of the automatic transmission portion 20, it is possible to reduce a possibility that, for example, when the differential portion 11 is placed in the non-continuously-variable shifting state by a depressing operation of the accelerator pedal, the engine rotational speed would be reduced in spite of the depressing operation of the accelerator pedal. That is, when the differential portion 11 is placed in the non-continuously-variable shifting state as a result of the depressing operation of the accelerator pedal, the shift-down action of the automatic transmission portion 20 is effected concurrently with the switching of the differential portion 11 from the continuously-variable shifting state to the non-continuously-variable shifting state, so that the engine rotational speed $N_E$ is increased. Therefore, the continuously-variable transmission portion can be switched from the continuously-variable shifting state to the non-continuously-variable shifting state, while restraining the vehicle user from suffering from discomfort.

When it is determined that the differential portion 11 needs to be switched by the switching control means 50 from the continuously-variable shifting state to the non-continuously-variable shifting state, the shift-down action of the automatic transmission portion 20 is effected by the step-variable shifting control means 54, concurrently with the switching of the differential portion 11. Switching-brake-rotation synchronization determining means (switching-brake-rotation synchronization determining portion) 64 is provided to determine that the rotational speed of the switching brake B0 has been equalized to a synchronization rotational speed as a result of the shift-down action, for example, by seeing if the rotational speed of the switching brake B0 has been equalized to a predetermined rotational speed that causes a determination that the first electric motor rotational speed $N_{M1}$ is zeroed. The switching control means 50 is operated, when it is determined by the switching-brake-rotation synchronization determining means 64 that the rotational speed of the switching brake B0 has been equalized to the synchronization rotational speed, to command the hydraulic control unit 42 to engage the switching brake B0. Thus, by causing the shift-down action of the automatic transmission portion 20 concurrently with the switching of the differential portion 11 from the continuously-variable shifting state to the non-continuously-variable shifting state, the difference of the rotational speed upon the engagement (locking) of the switching brake B0 is reduced whereby the reduction of the engine rotational speed caused by the switching is restrained. Consequently, the engine rotational speed is increased as a result of the shift-down action of the automatic transmission portion such that the engine rotational speed is made higher after the switching than before the switching, thereby making it possible to switch the differential portion to the non-differential state while restraining the vehicle user from suffering from discomfort. That is, upon the switching of the differential portion 11 to the non-continuously-variable shifting state, it is possible to restrain temporal reduction of the engine rotational speed $N_E$ due to the switching, and to increase the engine rotational speed $N_E$ as a result of the depression operation of the accelerator pedal, thereby enabling responsiveness of the change of the engine rotational speed to be improved during the switching.

When the switching-necessity determining means 62 determines that the differential portion 11 needs to be switched by the switching control means 50 from the non-continuously-variable shifting state to the continuously-variable shifting state, the step-variable shifting control means 54 determines the gear position that is to be established in the automatic transmission portion 20 for causing the engine rotational speed $N_E$ to be reduced during the switching of the differential portion 11, and then effects a shift-up action of the automatic transmission portion 20 for establishing the determined gear position in the automatic transmission portion 20. In this arrangement, owing to the reduction of the engine rotational speed $N_E$ caused by the shift-up action of the automatic transmission portion 20, it is possible to reduce a possibility that, for example, when the differential portion 11 is placed in the continuously-variable shifting state by a returning operation of the accelerator pedal, the engine rotational speed would be increased in spite of the returning operation of the accelerator pedal. That is, when the differential portion 11 is placed in the continuously-variable shifting state as a result of the returning operation of the accelerator pedal, the shift-up action of the automatic transmission portion 20 is effected concurrently with the switching of the differential portion 11 from the non-continuously-variable shifting state to the continuously-variable shifting state, so that the engine rotational speed $N_E$ is reduced. Therefore, the continuously-variable transmission portion can be switched from the non-continuously-variable shifting state to the continuously-variable shifting state, while restraining the vehicle user from suffering from discomfort.

When it is determined that the differential portion 11 needs to be switched by the switching control means 50 from the non-continuously-variable shifting state to the continuously-variable shifting state, the shift-up action of the automatic transmission portion 20 is effected by the step-variable shifting control means 54, concurrently with the switching of the differential portion 11. In this instance, the switching control means 50 commands the hydraulic control unit 42 to release the switching brake B0 in such a manner that maintains the reduction of the engine rotational speed $N_E$ caused by the shift-up action of the automatic transmission portion 20. Thus, upon the switching of the differential portion 11 to the continuously-variable shifting state, it is possible to restrain temporal increase of the engine rotational speed $N_E$ due to the switching, and to reduce the engine rotational speed $N_E$ as a result of the returning operation of the accelerator pedal, thereby enabling responsiveness of the change of the engine rotational speed to be improved during the switching.

It is noted that the gear position, which is to be established in the automatic transmission portion 20 upon determination of the switching of the differential portion 11 between the continuously-variable shifting state and the non-continuously-variable shifting state by the switching control means 50, may be predetermined and memorized, as shown in FIG. 8.

For example, while the differential portion 11 is held in the continuously-variable shifting state, the step-variable shifting control means 54 determines the gear position to which the automatic transmission portion 20 should be shifted. This determination is made on the basis of a condition of the vehicle, and according to the shifting boundary line map indicated in the continuously-variable shifting region surrounded by the broken lines in FIG. 8, for example, according to the continuously-variable shifting boundary line map that is predetermined such that the automatic transmission portion 20 is shifted to one of the second, fourth, sixth, seventh and eighth gear positions indicated in the table of FIG. 4. The step-variable shifting control means 54 generates commands (shifting commands or hydraulic control command) to be applied to the hydraulic control unit 42, to selectively engage and release the hydraulically operated frictional coupling devices involved for the shifting action of the automatic transmission portion 20, for establishing the determined gear position in the automatic transmission portion 20 according to the table of FIG. 4.

While the differential portion 11 is held in the non-continuously-variable shifting state, the step-variable shifting control means 54 determines the gear position to which the automatic transmission portion 20 should be shifted. In this case, the determination is made on the basis of a condition of the vehicle, and according to the shifting boundary line map indicated in the non-continuously-variable shifting region not surrounded by the broken lines in FIG. 8, for example, according to the continuously-variable shifting boundary line map that is predetermined such that the automatic transmission portion 20 is shifted to one of the first through eighth gear positions indicated in the table of FIG. 2. The step-variable shifting control means 54 generates commands to be applied to the hydraulic control unit 42, to selectively engage and release the hydraulically operated frictional coupling devices involved for the shifting action of the automatic transmission portion 20, for establishing the determined gear position in the automatic transmission portion 20 according to the table of FIG. 2.

When it is determined that the differential portion 11 needs to be switched by the switching control means 50 from the non-continuously-variable shifting state to the continuously-variable shifting state or from the continuously-variable shifting state to the non-continuously-variable shifting state, the step-variable shifting control means 54 determines the gear position that is to be established in the automatic transmission portion 20, on the basis of the vehicle condition, and according to the shifting boundary line map and the drive-power-source switching map of FIG. 8. Then, the step-variable shifting control means 54 generates commands to be applied to the hydraulic control unit 42, to selectively engage and release the hydraulically operated frictional coupling devices involved for the shifting action of the automatic transmission portion 20. For example, when it is determined that the differential portion 11 needs to be switched from the continuously-variable shifting state to the step-variable shifting state during running of the vehicle with the second gear position established in the automatic transmission portion 20, it is determined that a shift-down action of the automatic transmission portion 20 is required for establishing the first gear position in the automatic transmission portion 20. When it is determined that the differential portion 11 needs to be switched from the continuously-variable shifting state to the step-variable shifting state during running of the vehicle with the fourth gear position established in the automatic transmission portion 20, it is determined that a shift-down action of the automatic transmission portion 20 is required for establishing the second gear position in the automatic transmission portion 20. When it is determined that the differential portion 11 needs to be switched from the step-variable shifting state to the continuously-variable shifting state during running of the vehicle with the first gear position established in the automatic transmission portion 20, it is determined that a shift-up action of the automatic transmission portion 20, is required for establishing the second gear position in the automatic transmission portion 20. When it is determined that the differential portion 11 needs to be switched from the step-variable shifting state to the continuously-variable shifting state during running of the vehicle with the second gear position established in the automatic transmission portion 20, it is determined that a shift-up action of the automatic transmission portion 20 is required for establishing the fourth gear position in the automatic transmission portion 20.

Figure 13:
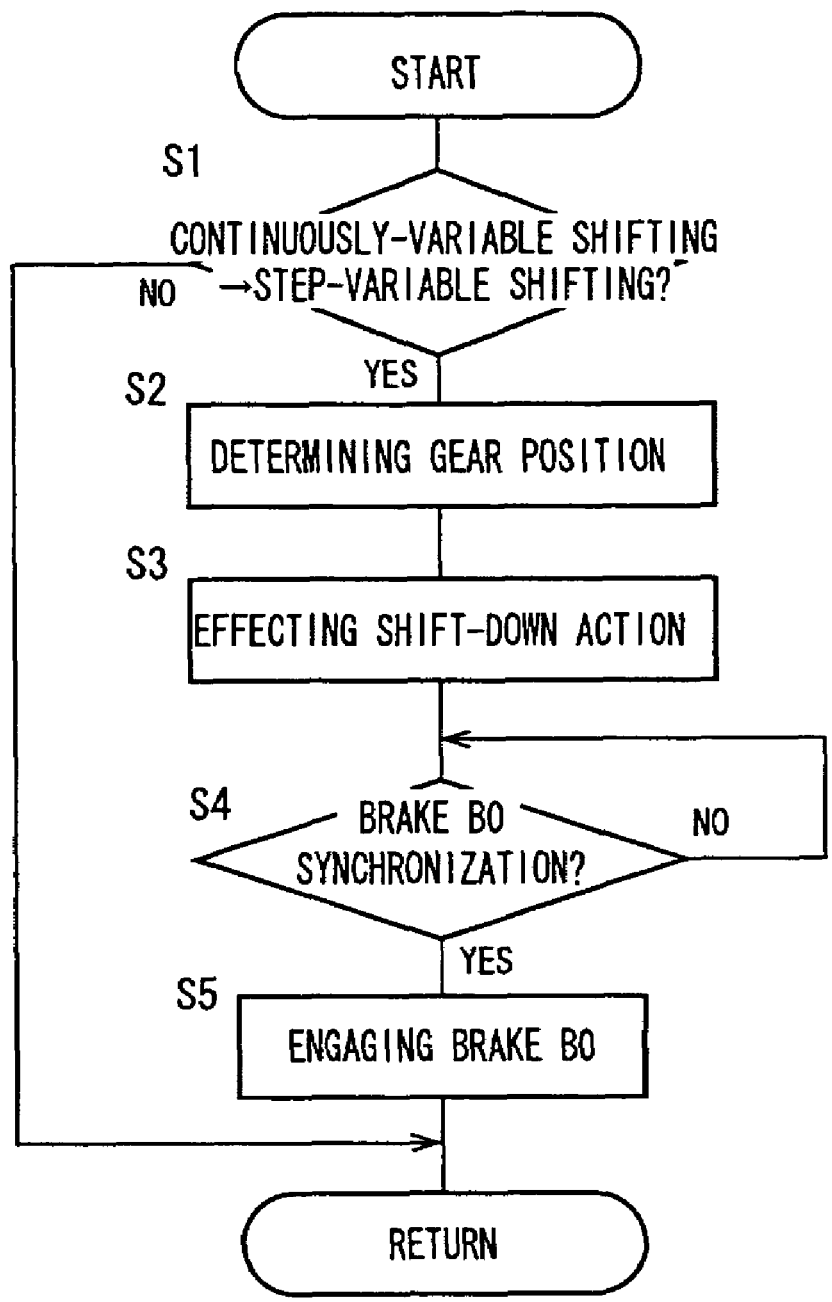
FIG. 13 is a flow chart illustrating a control operation of the electronic control device of FIG. 6, that is, a control operation performed when the transmission mechanism is switched from the continuously-variable shifting state to the step-variable shifting state.

FIG. 13 is a flow chart illustrating a major portion of a control operation of the electronic control device 40, namely, a control routine that is implemented when the transmission mechanism 10 is switched from the continuously-variable shifting state to the step-variable shifting state. This control routine is repeated executed with an extremely short cycle time of about several milliseconds to about several tens of milliseconds.

Figure 14:
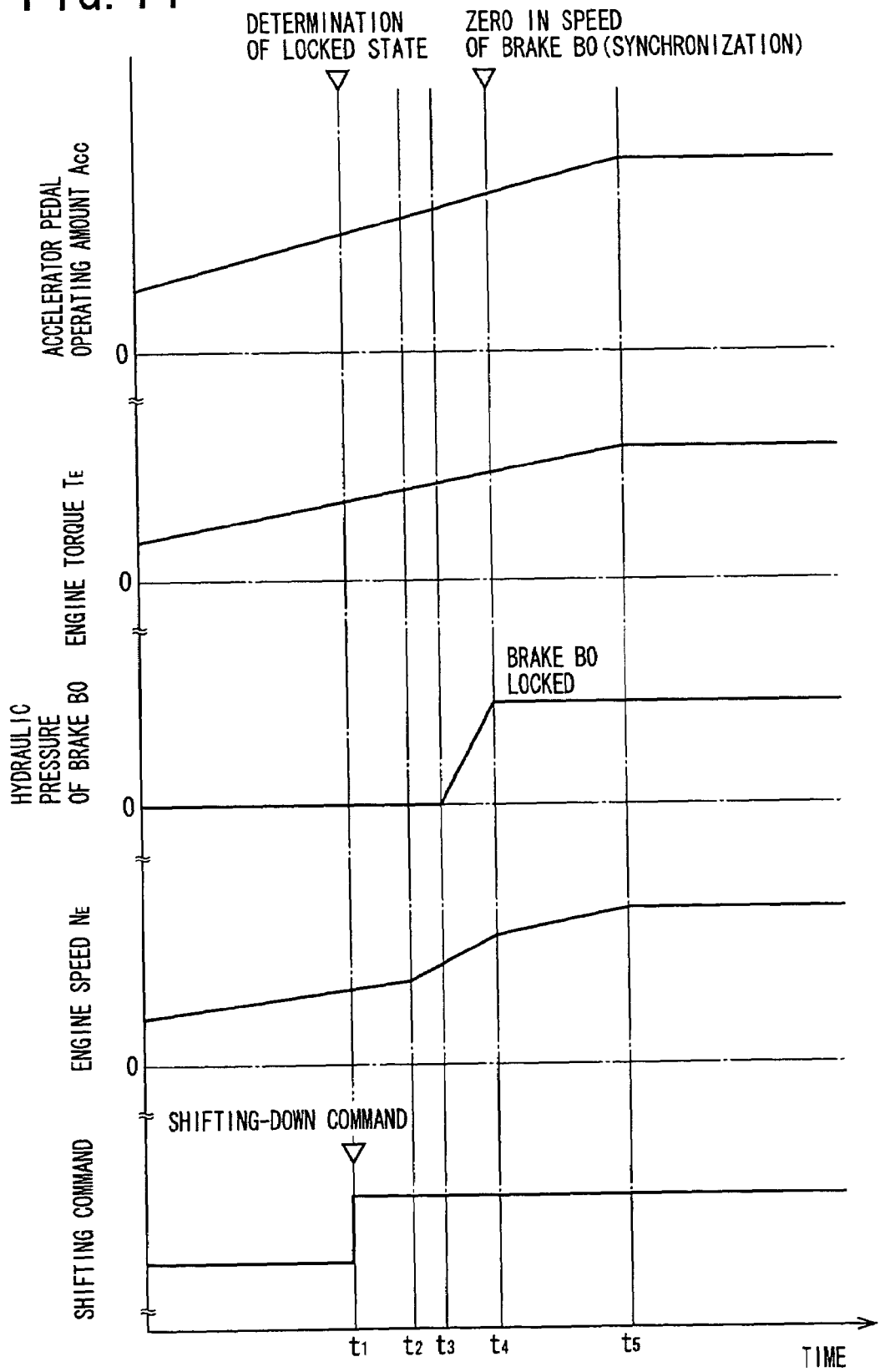
FIG. 14 is a time chart for explaining the control operation illustrated by the flow chart of FIG. 13 when the transmission mechanism is switched from the continuously-variable shifting state to the step-variable shifting state by a depressing operation of an accelerator pedal.

FIG. 14 is a time chart for explaining the control operation illustrated by the flow chart of FIG. 13 when the transmission mechanism 10 is switched from the continuously-variable shifting state to the step-variable shifting state as a result of a depressing operation of the accelerator pedal.

The control routine is initiated with step S1 ("step" being hereinafter omitted) corresponding to the switching-necessity determining means 62 or switching-necessity determining step, to determine whether it has been determined, on the basis of the vehicle condition, that the differential portion 11 needs to be switched by the switching control means 50 from the continuously-variable shifting state to the non-continuously-variable shifting state (step-variable shifting state).

In FIG. 14, a point $t_1$ of time is a point of time at which it is determined that the differential mechanism 10 (differential portion 11, power distributing mechanism 16) needs to be switched from the continuously-variable shifting state to the step-variable shifting state (locked state). This determination is made based on a fact that the required output torque $T_{OUT}$ exceeds the upper output-torque limit T1 by the depressing operation of the accelerator pedal during running of the vehicle with the differential mechanism 10 held in the continuously-variable shifting state.

If a negative decision is obtained in the S1, one cycle of execution of the present control routine is terminated. If an affirmative decision is obtained in the S1, the S1 is followed by S2 corresponding to the step-variable shifting control means 54 or step-variable shifting control step (automatic transmission control step), to determine the gear position which is to be established in the automatic transmission portion 20 for causing the engine rotational speed $N_E$ to be increased during the switching of the differential portion 11 from the continuously-variable shifting state to the step-variable shifting state, so that the engine rotational speed $N_E$ is made higher after the switching than before the switching. The determination of the gear position to be established in the automatic transmission portion 20 is made on the basis of the vehicle condition, and according to the shifting boundary line map and the drive-power-source switching map of FIG. 8.

The S2 is followed by S3 corresponding to the step-variable shifting control means 54 or step-variable shifting control step, to generate commands to be applied to the hydraulic control unit 42, to effect a shift-down action of the automatic transmission portion 20 for establishing the gear position that has been determined in the S2.

The point $t_1$ of time of FIG. 14 is also a point of time at which the lower gear position that is to be established in the automatic transmission portion 20 is determined, and the commands are applied to the hydraulic control unit 42 for effecting the shift-down action establishing the determined gear position. During a time period from the point of time $t_1$ to a point of time $t_5$ in FIG. 14, the engine rotational speed $N_E$ is increased as a result of the depressing operation of the accelerator pedal. Particularly, during a time period from a point of time $t_2$ to a point of time $t_4$, the engine rotational speed $N_E$ is increased not only by the depressing operation of the accelerator pedal but also by the shift-down action of the automatic transmission portion 20.

The S3 is followed by S4 corresponding to the switching-brake-rotation synchronization determining means 64 or switching-brake-rotation synchronization determining step, to determine that the rotational speed of the switching brake B0 has been equalized to a synchronization rotational speed as a result of the shift-down action that has been effected in the S3, for example, by seeing if the rotational speed of the switching brake B0 has been equalized to a predetermined rotational speed that causes a determination that the first electric motor rotational speed $N_{M1}$ is zeroed.

The S4 is repeatedly implemented while a negative decision is obtained in the S4. However, if an affirmative decision is obtained in the S4, the S4 is followed by S5 corresponding to the switching control means 50 or switching control step, to command the hydraulic control unit 42 to engage the switching brake B0.

At the point $t_3$ of time of FIG. 14, it is determined that the rotational speed of the switching brake B0 has been equalized to the synchronization rotational speed. At the point $t_4$ of time, the engagement (locking) of the switching brake B0 is completed. Thus, upon the switching of the differential portion 11 from the continuously-variable shifting state to the step-variable shifting state by the engagement (locking) of the switching brake B0 during the time period from the point of time $t_1$ to the point of time $t_4$, the shift-down action of the automatic transmission portion 20 is also effected. It is noted that the switching action of the differential portion 11 by the engagement of the switching brake B0 is made substantially during the time period from the point of time $t_3$ to the point of time $t_4$. It is therefore possible to narrowly interpret that the differential portion 11 is switched from the continuously-variable shifting state to the step-variable shifting state in this time period from the point of time $t_3$ to the point of time $t_4$. In such an interpretation, the shift-down action of the automatic transmission portion 20 is effected (at the point $t_1$ of time) prior to the switching of the differential portion 11.

As described above, in the present embodiment, the differential portion 11 is switched between the continuously-variable shifting state and the non-continuously-variable shifting state, by the switching brake B0. Accordingly, it is possible to obtain a drive system having both an advantage of an improvement of the fuel economy of a transmission the speed ratio of which is electrically variable, and an advantage of a high power transmitting efficiency of a gear type power transmitting device constructed for mechanical transmission of power.

When the differential portion 11 is placed in the continuously-variable shifting state in a normal output state of the engine during a low-speed or medium-speed running or a low-output or medium-output running of the vehicle, for example, the fuel economy of the vehicle is improved. When the differential portion 11 is placed in the non-continuously-variable shifting state during a high-speed running of the vehicle, the output of the engine 8 is transmitted to the drive wheels primarily through the mechanical power transmitting path, the fuel economy is improved owing to reduction of a loss of conversion of a mechanical energy into an electric energy, which would take place when the differential portion 11 is operated as the electrically controlled continuously variable transmission. Where the differential portion 11 is placed in the non-continuously-variable shifting state during a high-output running state of the vehicle, the differential portion 11 is operated as a transmission the speed ratio of which is electrically variable, only when the vehicle speed or output is relatively low or medium, so that the required amount of electric energy generated by the first electric motor M1, that is, the maximum amount of electric energy that must be transmitted from the first electric motor M1 can be reduced, making it possible to minimize the required sizes of the first electric motor M1 and the second electric motor M2 operated by the electric energy generated by the first electric motor M1, and the required size of the transmission mechanism 10 including those electric motors.

Further, when the differential portion 11 is switched between the continuously-variable shifting state and the non-continuously-variable shifting state, the speed ratio of the automatic transmission portion 20 is changed by the step-variable shifting control means 54, concurrently with the switching of the differential portion 11 between the continuously-variable shifting state and the non-continuously-variable shifting state. Since the engine rotational speed $N_E$ can be changed by changing the speed ratio of the automatic transmission portion 20, it is possible to restrain the vehicle user from suffering from discomfort caused by a change of the engine rotational speed $N_E$ that is caused by the switching of the differential portion 11 between the continuously-variable shifting state and the non-continuously-variable shifting state. Described in another point of view, since the engine rotational speed $N_E$ can be changed owing to the change of the speed ratio of the automatic transmission portion 20, it is possible to improve responsiveness of the change of the engine rotational speed $N_E$ during the switching of the differential portion 11 between the continuously-variable shifting state and the non-continuously-variable shifting state, without discomfort caused to the vehicle user by the switching of the differential portion 11.

Further, in the present embodiment, when the differential portion 11 is switched from the continuously-variable shifting state to the non-continuously-variable shifting state, the step-variable shifting control means 54 effects a shift-down action of the automatic transmission portion 20, such that the engine rotational speed $N_E$ is made higher after the switching of the differential portion 11 than before the switching of the differential portion 11. In this arrangement, owing to the increase of the engine rotational speed $N_E$ caused by the shift-down action of the automatic transmission portion 20, it is possible to reduce a possibility that, for example, when the differential portion 11 is placed in the non-continuously-variable shifting state during a high-output running state of the vehicle with a depressing operation effected on the accelerator pedal, the engine rotational speed $N_E$ would be reduced in spite of the depressing operation of the accelerator pedal, due to a fact that the engine rotational speed $N_E$ is bound by a running speed V of the vehicle. That is, when the differential portion 11 is placed in the non-continuously-variable shifting state as a result of the depressing operation of the accelerator pedal, the shift-down action of the automatic transmission portion 20 is effected concurrently with the switching of the differential portion 11 from the continuously-variable shifting state to the non-continuously-variable shifting state, thereby making it possible to restrain the change of the engine rotational speed $N_E$ due to the switching of the differential portion 11. Consequently, since the engine rotational speed $N_E$ is increased as a result of the shift-down action of the automatic transmission portion 20 during the switching of the differential portion 11, the differential portion 11 can be switched from the continuously-variable shifting state to the non-continuously-variable shifting state, while restraining the vehicle user from suffering from discomfort.

Further, in the present embodiment, while the differential portion 11 is held in the non-continuously-variable shifting state, the step-variable shifting control means 54 changes the speed ratio of the automatic transmission portion 20, by using the gear positions established by engagements of the hydraulically operated frictional coupling devices that are arranged to receive the output of the power transmitting member 18 and also the gear positions established by engagements of the hydraulically operated frictional coupling devices that are arranged to receive the output of the engine 8. In other words, while the differential portion 11 is held in the non-continuously-variable shifting state, the speed ratio of the automatic transmission portion 20 is changed by using also the gear positions that cannot be established in the automatic transmission portion 20 during the continuously-variable shifting state of the differential portion 11, namely, by using also the gear positions which are not established by engagements of the hydraulically operated frictional coupling devices arranged to receive the output of the power transmitting member 18 and which are established by engagements of the hydraulically operated frictional coupling devices arranged to receive the output of the engine 8, so that a larger number of gear positions can be established in the automatic transmission portion 20.

The power distributing mechanism 16 is constituted by the single-pinion-type first planetary gear set 24 having the three elements in the form of the first carrier CA1, the first sun gear S1 and the first ring gear R1. Thus, there are advantages that the power distributing mechanism 16 has a simple construction and a small axial length. Further, since the switching brake B0 is provided in the power distributing mechanism 16 so as to connect the first sun gear S1 to the transmission casing 12 therethrough, the transmission mechanism 10 (differential portion 11) can be easily controlled to be switched between the continuously-variable shifting state and the step-variable shifting state.

Further, with the switching brake B0 being engaged, the transmission mechanism 10 is placed in the non-differential state and is operable as a speed-increasing transmission whose speed ratio is lower than 1, so as to function as if it were a part of the automatic transmission portion 20.

Further, in the present embodiment, the power distributing mechanism 16 is simply constituted by the single planetary gear set, so that the axial length of the power distributing mechanism 16 is made small whereby the axial length of the entirety of the transmission mechanism 10 can be made small.

Further, while the differential portion 11 is held in the non-continuously-variable shifting state, a plurality of gear positions including the eight forward drive positions can be established by operations of the three planetary gear sets, four clutches C and three brakes B that are provided in the differential portion 11 and the automatic transmission portion 20, so that the axial length of the entirety of the transmission mechanism 10 can be made small.

Other embodiments of the present invention will be described. In the following description, the same reference sings as used in the above-described embodiment will be used to identify the corresponding elements which will not be described.

Embodiment 2

Figures 15, 16:
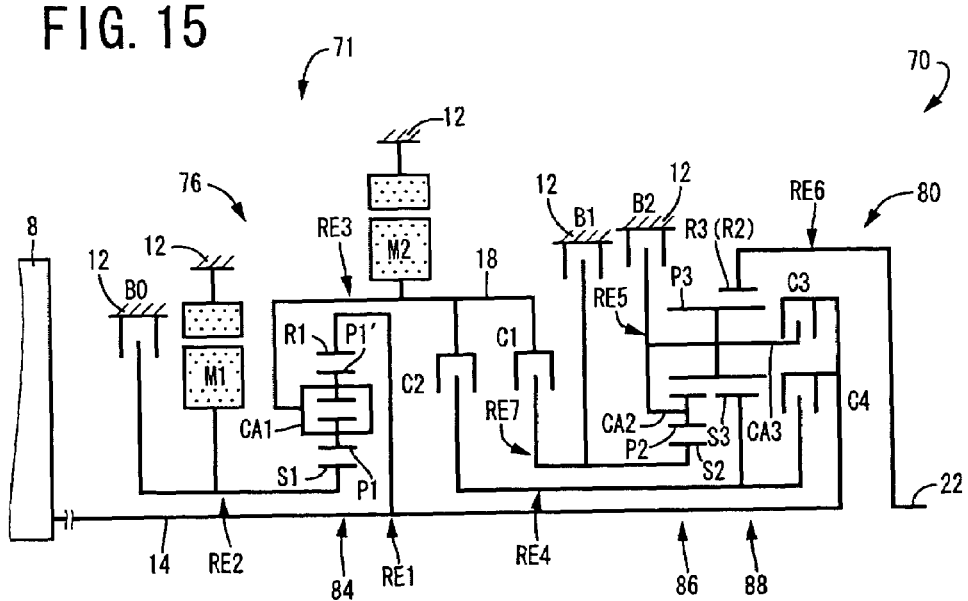
FIG. 15 is a schematic view corresponding to that of FIG. 1, and showing an arrangement of a drive system of a hybrid vehicle according to another embodiment of the invention.
FIG. 16 is a table corresponding to that of FIG. 2, and indicating shifting actions of the hybrid vehicle drive system of FIG. 15, where the drive system is operated in a step-variable shifting state, in relation to different combinations of operating states of hydraulically operated frictional coupling devices to effect the respective shifting actions.
Figure 17:
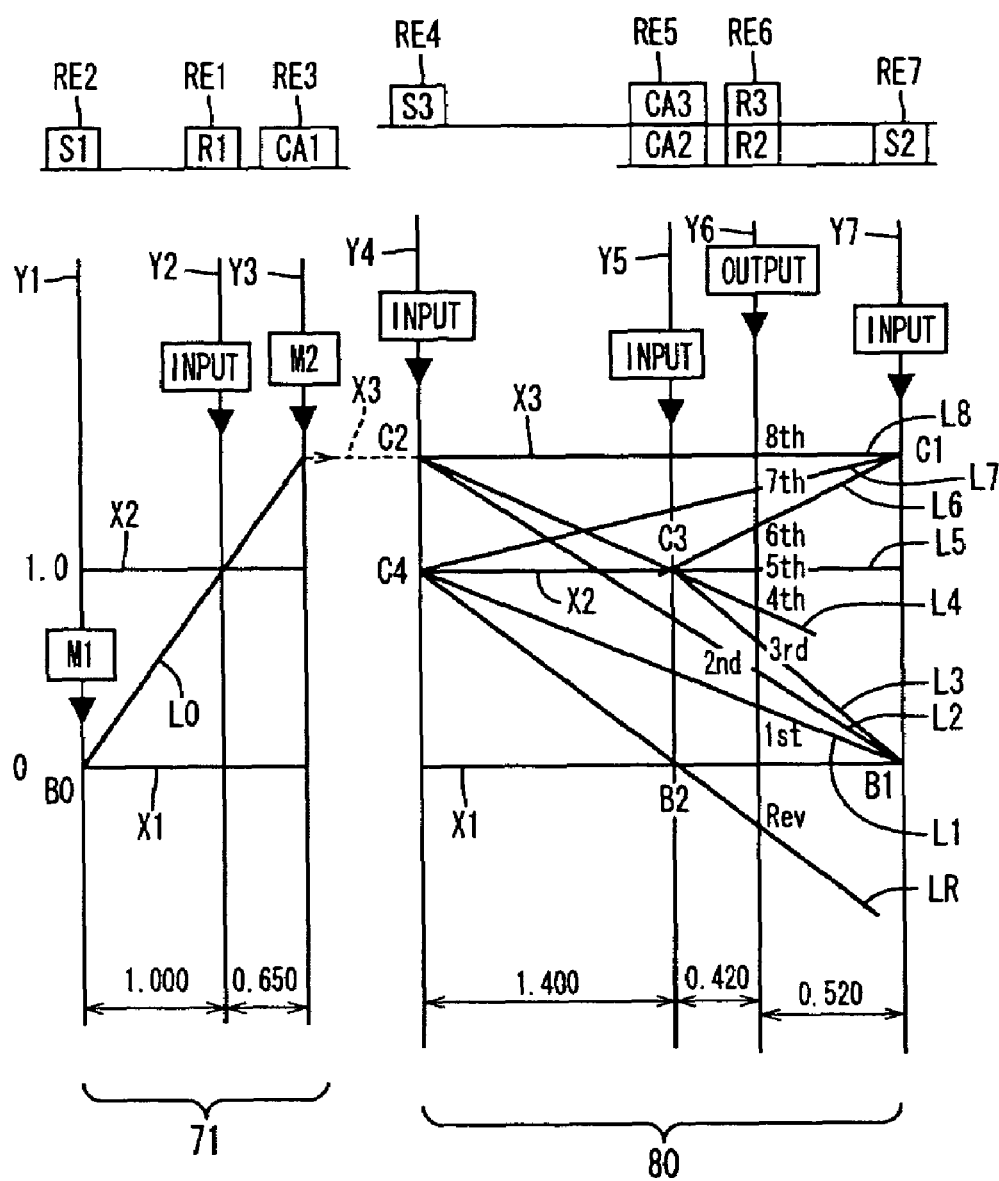
FIG. 17 is a collinear chart corresponding to that of FIG. 3, and indicating relative rotational speeds of the hybrid vehicle drive system of FIG. 15 operated in the step-variable shifting state, in different gear positions of the drive system.
Figures 18, 19:
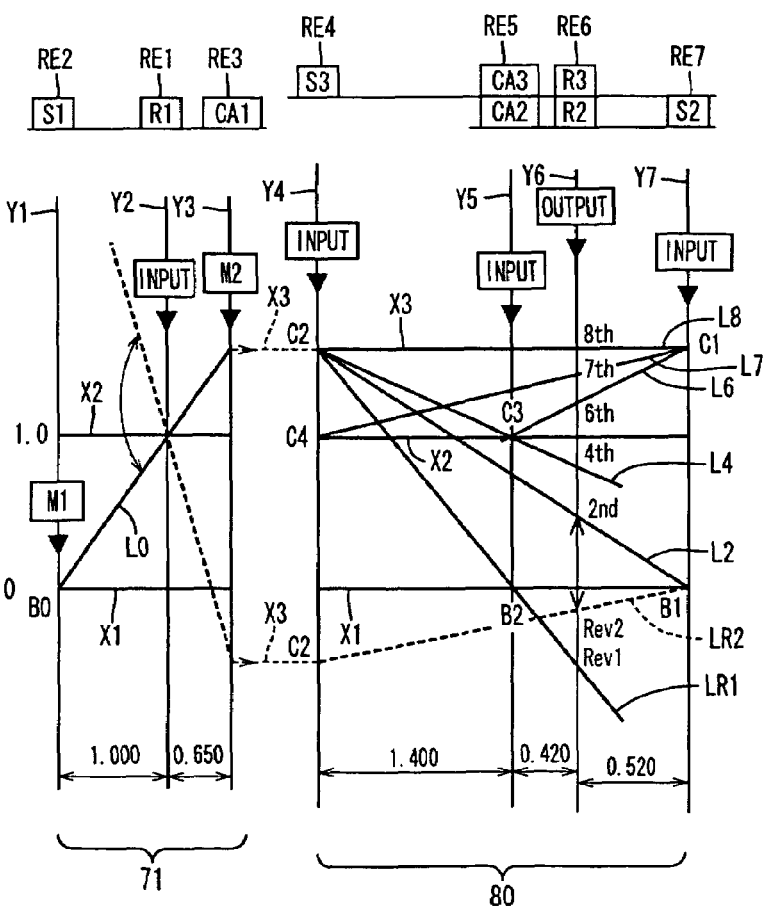
FIG. 18 is a table corresponding to that of FIG. 4, and indicating shifting actions of the hybrid vehicle drive system of FIG. 15, where the drive system is operated in a continuously-variable shifting state, in relation to different combinations of operating states of hydraulically operated frictional coupling devices to effect the respective shifting actions.
FIG. 19 is a collinear chart corresponding to that of FIG. 5, and indicating relative rotational speeds of the hybrid vehicle drive system of FIG. 15 operated in the continuously-variable shifting state, in different gear positions of the drive system.

FIG. 15, which corresponds to FIG. 1, is a schematic view for explaining a construction of a transmission mechanism 70 in another embodiment of this invention. FIG. 16, which corresponds to FIG. 2, is a table indicating a relationship between the gear positions of the transmission mechanism 70 and different combinations of engaged states of the hydraulically operated frictional coupling devices for respectively establishing those gear positions, while the transmission mechanism 70 is operated as a step-variable transmission. FIG. 17, which corresponds to FIG. 3, is a collinear chart for explaining relative rotational speeds of the elements in each gear position while the transmission mechanism 70 is operated as the step-variable transmission. FIG. 18, which corresponds to FIG. 4, is a table indicating a relationship between the gear positions of the transmission mechanism 70 and different combinations of engaged states of the hydraulically operated frictional coupling devices for respectively establishing those gear positions, while the transmission mechanism 70 is operated as a continuously-variable transmission. FIG. 19, which corresponds to FIG. 5, is a collinear chart for explaining relative rotational speeds of the elements in each gear position while the transmission mechanism 70 is operated as the continuously-variable transmission.

As in the above-described embodiment, the transmission mechanism 70 includes a differential portion 71 having the first electric motor M1, a power distributing mechanism 76 and the second electric motor M2. The transmission mechanism 70 further includes an automatic transmission portion 80 having eight forward drive positions. The automatic transmission portion 80 is disposed between the differential portion 71 and the output shaft 22, and is connected in series to the differential portion 71 and the output shaft 22 through the power transmitting member 18. Like the transmission mechanism 10, the transmission mechanism 70 is disposed between the engine 8 and the pair of drive wheels 38, so that the drive force is transmitted from the engine 8 to the pair of drive wheels 38 through the differential gear device 36 (final speed reduction gear) and the pair of drive axles which constitute parts of the power transmitting path.

The power distributing mechanism 76 is constituted principally by a double-pinion type first planetary gear set 84 having a gear ratio ρ1 of about 0.394, for example, and the switching brake B0. The first planetary gear set 84 has rotary elements in the form of: a first sun gear S1; a pair of first inner planetary gears P1; a pair of first outer planetary gears P1' each of which meshes with a corresponding one of the first inner planetary gears P1; a first carrier CA1 supporting the first inner and outer planetary gears P1, P1' such that each of the first inner and outer planetary gears P1, P1' is rotatable about its axis and about the axis of the first sun gear S1; and a first ring gear R1 meshing with the first sun gear S1 through the first inner and outer planetary gears P1, P1'.

In the power distributing mechanism 76, the first ring gear R1 is connected to the input shaft 14, that is, to the engine 8, and the first sun gear S1 is connected to the first electric motor M1, while the first carrier CA1 is connected to the power transmitting member 18. The switching brake B0 is disposed between the first sun gear S1 and the casing 12. When the switching brake B0 is released, the power distributing mechanism 76 is placed in the differential state in which the three elements of the first planetary gear set 84 consisting of the first sun gear S1, first carrier CA1 and first ring gear R1 are rotatable relative to each other, as the above-described power distributing mechanism 16, so that the differential portion 71 (power distributing mechanism 76) is placed in the continuously-variable shifting state as the power distributing mechanism 16, so as to function as an electrically controlled continuously variable transmission the speed ratio γ0 of which is continuously variable.

When the switching brake B0 is engaged while the power distributing mechanism 76 is placed in the continuously-variable shifting state, the power distributing mechanism 76 is brought into the non-differential state, as the above-described power distributing mechanism 16. Described in detail, when the switching brake B0 is engaged, the first sun gear S1 is fixed to the casing 12, so that the power distributing mechanism 76 is placed in the locked state (non-differential state) in which the first sun gear S1 is not rotatable, so that the differential portion 71 is also placed in the non-differential state. Since the rotational speed of the first carrier CA1 is made higher than that of the first ring gear R1, the power distributing mechanism 76 functions as a speed-increasing mechanism, and the differential portion 71 (power distributing mechanism 76) is placed in the fixed-speed-ratio shifting state or step-variable shifting state in which differential portion 71 functions as a speed-increasing transmission having a fixed speed ratio γ0 smaller than 1, for example, about 0.61.

Thus, in the present embodiment, too, the switching brake B0 functions as the differential-state switching device operable to selectively switch the differential portion 71 (power distributing mechanism 76) between the continuously-variable shifting state in which the differential portion 71 is operable as the electrically controlled continuously variable transmission the speed ratio of which is continuously variable, and the fixed-speed-ratio shifting state in which the differential portion 71 is operable as the transmission having a single gear position with one speed ratio γ that is lower than 1.

The automatic transmission portion 80 includes a double-pinion type second planetary gear set 86 having a gear ratio θ2 of about 0.477, and a single-pinion type third planetary gear set 88 having a gear ratio ρ3 of about 0.300. This automatic transmission portion 80 is different from the above-described automatic transmission portion 20, only with respect to the gear ratios ρ2, ρ3 of the second and third planetary gear sets. The automatic transmission portion 80 is the same as the automatic transmission portion 20, with respect to the other construction and the arrangement for connection thereof with the other elements such as the engine 8 and power transmitting member 18, the description of which is therefore omitted.

In the transmission mechanism 70 constructed as described above, as in the above-described embodiment, the power distributing mechanism 76 is provided with the switching brake B0 which is engaged to place the differential portion 71 in the continuously-variable shifting state in which the differential portion 71 is operable as the continuously variable transmission, or in the step-variable shifting state (fixed-speed-ratio shifting state) in which the differential portion 71 is operable as the step-variable transmission having a fixed speed ratio or ratios. In the present transmission mechanism 70, therefore, the differential portion 71 placed in the fixed-speed-ratio shifting state by the engaging action of the switching brake B0 cooperates with the automatic transmission portion 80 to constitute a step-variable transmission, while the differential portion 71 placed in the continuously-variable shifting state with the switching brake B0 being held in the released state cooperates with the automatic transmission portion 80 to constitute an electrically controlled continuously variable transmission device. In other words, the transmission mechanism 70 is placed in its step-variable shifting state by engaging the switching brake B0, and in its continuously-variable shifting state by releasing the switching brake B0. Similarly, the differential portion 71 is selectively placed in one of its step-variable and continuously-variable shifting states.

Described in detail, when the transmission mechanism 70 functions as the step-variable transmission with the differential portion 71 placed in its non-continuously-variable state with the switching brake B0 held in the engaged state, one of the first through eighth gear positions, the reverse gear position and the neutral position is selectively established by engaging actions of a corresponding combination of the frictional coupling devices selected from the above-described first clutch C1, second clutch C2, third clutch C3, fourth clutch C4, first brake B1 and second brake B2, as in the above-described embodiment. The above-indicated positions have respective speed ratios γ which change as geometric series.

Where the differential portion 71 is held in the non-continuously-variable shifting state, a selected one of the first through eighth gear positions, rear gear position and neutral position is established as indicated in the table of FIG. 16. The table of FIG. 16 is different from the table of FIG. 2 only with respect to the speed ratio (and also stepping ratio) of each gear position, and is the same as the table of FIG. 2 with respect to the combinations of the engaging actions of the hydraulically operated frictional coupling devices C1, C2, C3, C4, B1 and B2 in each gear position, the description of which is therefore omitted. By the engaging actions of the clutches C and brakes B as indicated in FIG. 16, the first gear position having the highest speed ratio γ1 of about 4.500, the second gear position having the speed ratio γ2 of about 2.727 which is lower than the speed ratio γ1, the third gear position having the speed ratio γ3 of 1.808 which is lower than the speed ratio γ2, the fourth gear position having the speed ratio γ4 of about 1.242 which is lower than the speed ratio γ3, the fifth gear position having the speed ratio γ5 of about 1.000 which is lower than the speed ratio γ4, the sixth gear position having the speed ratio γ6 of about 0.775 which is lower than the speed ratio γ5, the seventh gear position having the speed ratio γ7 of about 0.664 which is lower than the speed ratio γ6, and the eighth gear position having the speed ratio γ8 of about 0.606 which is lower than the speed ratio γ7 can be established. Further, the reverse gear position having the speed ratio γR of about 3.333, for example, which is intermediate between the speed ratios γ1 and γ2 can be established.

The collinear chart of FIG. 17 indicates, by straight lines, a relationship among the rotational speeds of the rotary elements in each of the gear positions of the transmission mechanism 70, which is constituted by the differential portion 71 functioning as the continuously-variable transmission portion or first transmission portion, and the automatic transmission portion 80 functioning as the step-variable transmission portion or second transmission portion, where the transmission mechanism 70 is placed in its step-variable shifting state by engaging the switching brake B0. The collinear chart of FIG. 17 is a rectangular two-dimensional coordinate system in which the gear ratios ρ of the planetary gear sets 84, 86, 88 are taken along the horizontal axis, while the relative rotational speeds of the rotary elements are taken along the vertical axis. A lower one of three horizontal lines, that is, the horizontal line X1 indicates the rotational speed of 0, while an upper one of the three horizontal lines, that is, the horizontal line X2 indicates the rotational speed of 1.0, that is, an operating speed $N_E$ of the engine 8 connected to the input shaft 14. The horizontal line X3 indicates the rotational speed of the power transmitting member 18.

Three vertical lines Y1, Y2 and Y3 corresponding to the power distributing mechanism 76 of the differential portion 71 respectively represent the relative rotational speeds of a second rotary element (second element) RE2 in the form of the first sun gear S1, a first rotary element (first element) RE1 in the form of the first ring gear R1, and a third rotary element (third element) RE3 in the form of the first carrier CA1. The distances between the adjacent ones of the vertical lines Y1, Y2 and Y3 are determined by the gear ratio γ1 of the first planetary gear set 24. Further, four vertical lines Y4, Y5, Y6 and Y7 corresponding to the automatic transmission portion 80 respectively represent the relative rotational speeds of a fourth rotary element (fourth element) RE4 in the form of the third sun gear S3, a fifth rotary element (fifth element) RE5 in the form of the second and third carriers CA2, CA3 integrally fixed to each other, a sixth rotary element (sixth element) RE6 in the form of the second and third ring gears R2, R3 integrally fixed to each other, and a seventh rotary element (seventh element) RE7 in the form of the second sun gear S2. The distances between the adjacent ones of the vertical lines are determined by the gear ratios ρ2 and ρ3 of the second and third planetary gear sets 86, 88.

Referring to the collinear chart of FIG. 17, the power distributing mechanism 76 (differential portion 71) of the transmission mechanism 70 is arranged such that the first rotary element RE1 (first ring gear R1) of the first planetary gear set 84 is connected to the input shaft 14 (engine 8), and the second rotary element RE2 (first sun gear S1) is connected to the first electric motor M1 and selectively connected to the casing 12 through the switching brake B0, while the third rotary element RE3 (first carrier CA1) is connected to the power transmitting member 18 and the second electric motor M2, so that a rotary motion of the input shaft 14 is transmitted (input) to the automatic transmission portion 80 through the power transmitting member 18. A relationship between the rotational speeds of the first sun gear S1 and the first carrier CA1 is represented by an inclined straight line L0 which passes a point of intersection between the lines Y2 and X2.

As indicated in FIG. 17, in each of the gear positions of the transmission mechanism 70 during the step-variable shifting state of the transmission mechanism 70, the rotational speed of the first sun gear S1 is held at zero by the engaging action of the switching brake B0, while the rotational speed of the first ring gear R1 is equal to the engine rotational speed $N_E$. The relative rotational speed of the first carrier CA1 (relative rotational speed of the power transmitting member 18) is represented by a point of intersection between the vertical line Y3 and the straight line L0 which passes the point of intersection between the lines X1, Y1 and the point of intersection between the lines X2, Y2. The relative rotational speed of the CA1, which is inputted to the automatic transmission portion 20, is made higher than the engine rotational speed $N_E$. Thus, as a result of the engagement of the switching brake B0, the power distributing mechanism 76 functions as the speed-increasing mechanism.

The automatic transmission portion 80 is the same as the above-described automatic transmission portion 20 of FIG. 3, with respect to arrangement for connections of the fourth through seventh rotary elements RE4-RE7 with the engine 8 and the power transmitting member 18, the description of which is therefore omitted.

During the step-variable shifting state of the transmission mechanism 80 with the engagement of the switching brake B0, the rotational speed of the output shaft 22 is changed, as shown in FIG. 17, depending upon a selected one of the gear positions that is established in the automatic transmission portion 80 by engagement of the clutches C and brakes B. The table of FIG. 17 is the same as the table of FIG. 3, with respect to the combinations of the engaging actions of the clutches C and brakes B in each gear position and the rotational speed of the output shaft 22 represented by the rotational speed (vertical line Y6) of the sixth rotary elements RE6, the description of which is therefore omitted.

Where the transmission mechanism 70 functions as the continuously-variable transmission with the differential portion 71 placed in its continuously-variable shifting state, on the other hand, the brake B0 is released, so that the differential portion 71 functions as the continuously variable transmission, while the automatic transmission portion 80 connected in series to the differential portion 71 functions as the step-variable transmission, whereby the speed of the rotary motion transmitted to the automatic transmission portion 80 placed in a selected gear position M, i.e., the rotational speed of the power transmitting member 18 is continuously changed, so that the speed ratio of the drive system when the automatic transmission portion 80 is placed in the selected gear position M is continuously variable over a predetermined range, as in the above-described embodiment. Accordingly, the overall speed ratio γT of the transmission mechanism 70, which is determined by the speed ratio γ0 of the differential portion 71 and the speed ratio γ of the automatic transmission portion 80, is continuously variable.

In this instance, for permitting the transmission mechanism 70 to function as the continuously-variable transmission, at least one of the rotary elements of the automatic transmission portion 70 needs to receive an output of the power transmitting member 18 the rotational speed of which is changeable irrespective to the rotation of the engine 8, during the continuously-variable shifting state of the differential portion 71.

Described specifically, as shown in FIGS. 16 and 17, when the automatic transmission portion 80 is placed in the second (2nd) gear position, fourth (4th) gear position or eight (8th) gear position, the output of the power transmitting member 18 is transmitted to the fourth rotary element RE4 by engagement of the second clutch C2 which receives the output of the power transmitting member 18. When the automatic transmission portion 80 is placed in the sixth (6th) gear position, seventh (7th) gear position or eight (8th) gear position, the output of the power transmitting member 18 is transmitted to the seventh rotary element RE7 by engagement of the second clutch C1 which receives the output of the power transmitting member 18. That is, each of the second (2nd) gear position, fourth (4th) gear position, sixth (6th) gear position, seventh (7th) gear position and eight (8th) gear position is the gear position that is established by the engagement of at least one of the first and second clutches C1, C2 that are arranged to receive the output of the power transmitting member 18.

Therefore, in each of the second (2nd) gear position, fourth (4th) gear position, sixth (6th) gear position, seventh (7th) gear position and eight (8th) gear position, it is possible to obtain the speed ratio that is continuously variable as the rotational speed of the power transmitting member 18 is changed during the continuously-variable shifting state of the differential portion 71. Thus, the overall speed ratio (total speed ratio) γT of the transmission mechanism 70 is continuously variable.

However, each of the first (1st) gear position, third (3rd) gear position, fifth (5th) gear position and reverse (Rev) gear position is established in the automatic transmission portion 80 without the engagement of any one of the first and second clutches C1, C2, so that the rotary elements do not receive the output of the power transmitting member 18. Described in another point of view, when the automatic transmission portion 80 is placed in the first (1st) gear position, third (3rd) gear position, fifth (5th) gear position or reverse (Rev) gear position, the output of the engine 8 is directly received by the fourth rotary element RE4 and/or the fifth rotary element RE5 through the engagement of the third clutch C3 and/or the fourth clutch C4, and/or the rotation of the fifth rotary element RE5 or seventh rotary element RE7 is stopped by the engagement of the first brake B1 or second brake B2. That is, each of the first (1st) gear position, third (3rd) gear position, fifth (5th) gear position and reverse (Rev) gear position is the gear position that is established in the automatic transmission portion 80 by only the engagement of the hydraulically operated frictional coupling devices (third and fourth clutches C3, C4 and first and second brakes B1, B2) that are not influenced by change of the rotational speed of the power transmitting member 18. Therefore, in each of the first (1st) gear position, third (3rd) gear position, fifth (5th) gear position and reverse (Rev) gear position, the speed ratio is not changed even if the rotational speed of the power transmitting member 18 is changed with the differential portion 71 being placed in the continuously-variable shifting state.

Thus, the transmission mechanism 70 can function as the continuously variable transmission while the differential portion 71 is held in the continuously-variable shifting state, as long as the second (2nd) gear position, fourth (4th) gear position, sixth (6th) gear position, seventh (7th) gear position or eight (8th) gear position is established in the automatic transmission portion 80.

Where the differential portion 11 is held in the continuously-variable shifting state, a selected one of the second gear position, fourth gear position, sixth gear position, seventh gear position, eighth gear position, first rear gear position, second rear gear position and neutral position is established as indicated in the table of FIG. 18. The table of FIG. 18 is the same as the table of FIG. 4, with respect to the combinations of the engaging actions of the clutches C and brakes B in each gear position, the description of which is therefore omitted.

FIG. 19, which corresponds to FIG. 17, is a collinear chart indicating relative rotational speeds while the transmission mechanism 70 functions as the continuously-variable transmission with the switching brake B0 being released. As shown in FIG. 19, while the differential portion 71 is held in the non-continuously-variable shifting state with the switching brake B0 being released, the rotational speed of the first sun gear S1 (that is represented by a point of intersection between the straight line L0 and the vertical line Y1) is controllable to be changed over a wide range, by controlling a reaction force of the first electric motor M1, so that the straight line L0 is pivotable about a point of intersection between the horizontal line X2 and the vertical line Y2 over a range indicated by an arrow by way of example. Therefore, the rotational speed of the first carrier CA1 or the power transmitting member 18, which is represented by a point of intersection between the straight line L0 and the vertical line Y3, is changeable over a range including portions higher and lower than the engine rotational speed $N_E$.

During the continuously-variable shifting state of the transmission mechanism 80, the rotational speed of the output shaft 22 is changed, as shown in FIG. 19, depending upon a selected one of the gear positions that is established in the automatic transmission portion 80 by engagement of the clutches C and brakes B. The table of FIG. 19 is the same as the table of FIG. 5, with respect to the combinations of the engaging actions of the clutches C and brakes B in each gear position and the rotational speed of the output shaft 22 represented by the rotational speed (vertical line Y6) of the sixth rotary elements RE6, the description of which is therefore omitted.

Like in the above-described embodiment, while the differential portion 71 functions as the continuously variable transmission, with the automatic transmission portion 80 connected in series to the differential portion 71 functioning as the step-variable transmission, the speed of the rotary motion transmitted to the automatic transmission portion 80 placed in each gear position, i.e., the rotational speed of the power transmitting member 18 is continuously changed, so that the speed ratio of the drive system when the automatic transmission portion 80 is placed in each gear position is continuously variable over a predetermined range. Accordingly, the overall speed ratio γT of the transmission mechanism 70 is continuously variable.

As is apparent from FIG. 19, when the second reverse (Rev2) gear position is established, the rotational speed of the power transmitting member 18, i.e., the rotational speed inputted to the automatic transmission portion 80 is a negative rotational speed which is opposite in direction to that in each forward drive position, i.e., each of the second, fourth, sixth, seventh and eighth gear positions. That is, when the second reverse gear position is established, the direction of the rotation of each rotary element of the automatic transmission portion 80 is made opposite to that when each forward drive position is established. This is, in general, considered to be not preferable from a design point of view. However, this arrangement provides an advantage that the second reverse gear position can be established simply by causing the power transmitting member 18 to be rotated in the reverse direction while maintaining the same combinations of operating states of the frictional coupling devices that establish the second gear position.

When the first reverse (Rev1) gear position is established, the rotational speed of the power transmitting member 18 is a positive rotational speed which is the same in direction as that in each forward drive position. That is, since the direction of the rotation of each rotary element of the automatic transmission portion 80 is the same as in each forward drive position, it is possible to avoid the arrangement that is not preferable from a design point of view.

In the present embodiment, too, the transmission mechanism 70 is constituted by the differential portion 71 functioning as the continuously-variable transmission portion or first transmission portion, and the automatic transmission portion 80 functioning as the step-variable transmission portion or second transmission portion. Therefore, in the present embodiment, it is possible to obtain the same advantages as in the above-described embodiment.

Figure 20:
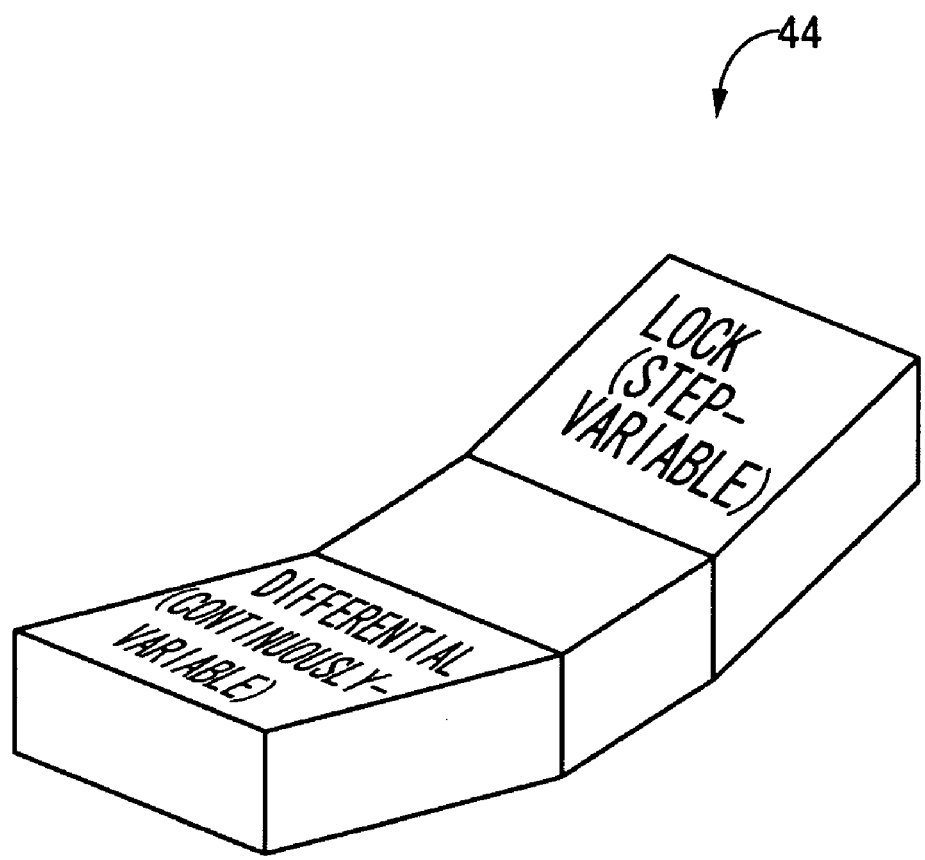
FIG. 20 is an example of a manually operable shifting-state selecting device in the form of a seesaw switch operated by a user to select the shifting state.

FIG. 20 shows an example of a seesaw switch 44 (hereinafter referred to as "switch 44") functioning as a shifting-state selecting device manually operable to select the differential state (non-locked state) or non-differential state (locked state) of the power distributing mechanism 16 (power distributing mechanism 76 in the present embodiment), that is, to select the continuously-variable shifting state or step-variable shifting state of the transmission mechanism 10 (transmission mechanism 70 in the present embodiment). This switch 44 permits the user to select the desired shifting state during running of the vehicle. The switch 44 has a continuously-variable-shifting running button labeled "STEP-VARIABLE" for running of the vehicle in the continuously-variable shifting state, and a step-variable-shifting running button labeled "CONTINUOUSLY-VARIABLE" for running of the vehicle in the step-variable shifting state, as shown in FIG. 20. When the continuously-variable-shifting running button is depressed by the user, the switch 44 is placed in a continuously-variable shifting position for selecting the continuously-variable shifting state in which the transmission mechanism 10 is operable as the electrically controlled continuously variable transmission. When the step-variable-shifting running button is depressed by the user, the switch 44 is placed in a step-variable shifting position for selecting in the step-variable shifting state in which the transmission mechanism 10 is operable as the step-variable transmission.

In the above-described embodiment, the shifting state of the transmission mechanism 10 is automatically switched on the basis of the vehicle condition and according to the switching boundary line map shown in FIG. 8 by way of example. However, the shifting state of the transmission mechanism 10 may be switched by a manual operation of the switch 44, in place of or in addition to the automatic switching operation. Namely, the switching control means 50 may be arranged to selectively place the transmission mechanism 10 in the continuously-variable shifting state or the step-variable shifting state, depending upon whether the switch 44 is placed in its continuously-variable shifting position or step-variable shifting position. For instance, the user manually operates the switch 44 to place the transmission mechanism 10 in the continuously-variable shifting state when the user likes the transmission mechanism 10 to operate as a continuously variable transmission or wants to improve the fuel economy of the engine, or alternatively in the step-variable shifting state when the user likes a rhythmical change of the engine rotational speed as a result of a shifting action of the step-variable transmission.

The switch 44 may have a neutral position in which none of the continuously-variable and step-variable shifting states are selected. In this case, the switch 44 may be placed in its neutral position when the user has not selected the desired shifting state or likes the transmission mechanism 10 to be automatically placed in one of the continuously-variable and step-variable shifting states.

While the preferred embodiments of this invention have been described in detail by reference to the accompanying drawings, it is to be understood that the present invention may be otherwise embodied.

For example, the above-described control operation illustrated by the flow chart of FIG. 13 is carried out, when the transmission mechanism 10 is switched from the continuously-variable shifting state to the step-variable shifting state, to effect a shift-down action of the automatic transmission portion 20 for restraining the vehicle user from suffering from discomfort caused upon the switching of the transmission mechanism 10 from the continuously-variable shifting state to the step-variable shifting state. If it is determined at the S1 that the differential portion 11 is to be switched from the step-variable shifting state to the continuously-variable shifting state, the S2 may be implemented to determine the gear position which is to be established in the automatic transmission portion 20 for causing the engine rotational speed $N_E$ to be reduced during the switching of the differential portion 11 from the step-variable shifting state to the continuously-variable shifting state, so that the engine rotational speed $N_E$ is made lower after the switching than before the switching. Then, the S3 may be implemented to generate commands to be applied to the hydraulic control unit 42, to effect a shift-up action of the automatic transmission portion 20 for-establishing the gear position that has been determined in the S2. In the S4 and S5, a command is applied to the hydraulic control unit 42 to release the switching brake B0 in such a manner that maintains the reduction of the engine rotational speed $N_E$ caused by the shift-up action of the automatic transmission portion 20.

Thus, when the differential portion 11 is switched from the non-continuously-variable shifting state to the continuously-variable shifting state, the step-variable shifting control means 54 effects a shift-up action of the automatic transmission portion 20, such that the engine rotational speed $N_E$ is made lower after the switching of the differential portion 11 than before the switching of the differential portion 11. In this arrangement, owing to the reduction of the engine rotational speed $N_E$ caused by the shift-up action of the automatic transmission portion 20, it is possible to reduce a possibility that the vehicle user would suffer from discomfort caused by the increase of the engine rotational speed $N_E$ in spite of the returning operation of the accelerator pedal. That is, when the differential portion 11 is placed in the continuously-variable shifting state as a result of the returning operation of the accelerator pedal, since the engine rotational speed $N_E$ is reduced as a result of the shift-up action of the automatic transmission portion 20, the differential portion 11 can be switched from the non-continuously-variable shifting state to the continuously-variable shifting state, while restraining the vehicle user from suffering from discomfort.

In the above-described embodiments, the differential portion 11, 71 is arranged to be switchable between the continuously-variable shifting state and the non-continuously-variable shifting state by operation of the switching brake B0 as the differential-state switching device. However, the differential portion may be arranged to be switchable between the continuously-variable shifting state and the non-continuously-variable shifting state by operation of other differential-state switching device. For example, a switching clutch may be provided to connect any two of the three elements of the power distributing mechanism 16, 76 (first planetary gear set 24, 84), so that the power distributing mechanism can be placed in the locked state (in which the three elements are integrally rotatable) by engagement of the switching clutch, whereby the differential portion 11 can be placed in the non-continuously-variable shifting state. The present invention is applicable to this arrangement as long as there is a possibility that, when the differential portion is switched between the continuously-variable shifting state and the non-continuously-variable shifting state by operation of the switching clutch, the engine rotational speed $N_E$ would be changed which could cause discomfort to the vehicle user. For example, where there is a possibility of reduction of the engine rotational speed upon switching of the differential portion to the non-continuously-variable shifting state by the engagement (locking) of the switching clutch, a shift-down action of the automatic transmission portion 20, 80 is effected concurrently with the switching of the differential portion.

In the above-described embodiments, the transmission mechanism 10, 70 is switchable between the continuously-variable shifting state and the step-variable shifting states by placing the differential portion 11, 71 (power distributing mechanism 16, 76) selectively in one of the differential state in which the differential portion is operable as the electrically controlled continuously variable transmission, and the non-differential state (locked state) in which the differential portion 11, 71 is not operable as the electrically controlled continuously variable transmission. However, the differential portion 11, 71 placed in the differential state can be operable as the step-variable transmission the speed ratio of which is variable in steps rather than continuously. In other words, the differential and non-differential states of the differential portion 11, 71 do not respectively correspond to the continuously-variable and step-variable shifting states of the transmission mechanism 10, 70, and therefore the differential portion 11, 71 need not be switchable between the continuously-variable and step-variable shifting states. The present invention is applicable to any transmission mechanism wherein the transmission mechanism 10, 70 (differential portion 11, 71, power distributing mechanism 16, 76) is switchable between the differential and non-differential states.

Further, in the transmission mechanism 10, 70 of the above-described embodiments, when the first and second clutches C1, C2 are engaged during the continuously-variable shifting state, the rotational speed of the power transmission member 18 is a positive rotational speed whereby the eighth gear position is established. However, like the relationship between the second gear position and the second reverse gear position, a reverse gear position may be established by arranging the power transmitting member 18 to be rotated in the reverse direction while maintaining the same combination of operating states of the frictional coupling devices that establish the eighth gear position.

Further, in the transmission mechanism 10, 70 of the above-described embodiments, when the fourth clutch C4, switching brake B0 and second brake B2 are engaged during the step-variable shifting state, the reverse gear position is established. However, it is also possible to establish another reverse gear position in place of or in addition to the above-described reverse gear position, by engaging the second clutch C2, switching brake B0 and second brake B2.

While the engine 8 is directly fixed to the input shaft 14 in the above-described embodiments, the engine 8 may be operatively connected to the input shaft 14 through any suitable member such as gears and a belt, and need not be disposed coaxially with the input shaft 14.

In the above-described embodiments, the first electric motor M1 and the second electric motor M2 are disposed coaxially with the input shaft 14, and are fixed to the first sun gear S1 and the power transmitting member 18, respectively. However, this arrangement is not essential. For example, the first and second electric motors M1, M2 may be operatively connected to the first sun gear S1 and the power transmitting member 18, respectively, through gears, belts, speed-reducing transmission or the like. Further, while the second electric motor M2 is connected to the power transmitting member 18 in the above-described embodiments, the second electric motor M2 may be connected to the output shaft 22 or a rotary member provided in the automatic transmission portion 20, 80. Such an arrangement in which the second electric motor M2 is connected to the power transmitting member 18 or output shaft 22 through the gears, belts, speed-reducing transmission or the like, is interpreted to be included in the arrangement in which the second electric motor M2 is disposed in the power transmitting path between the power transmitting member and the drive wheel.

While the switching brake B0 is engaged to establish the neutral position N in the transmission mechanism 10, 70 in the above-described embodiments, the switching brake B0 need not be engaged to establish the neutral position.

The hydraulically operated frictional coupling devices such as the switching brake B0 in the above-described embodiments may be replaced by a coupling device of a magnetic-power type, an electromagnetic type or a mechanical type, such as a powder clutch (magnetic powder clutch), an electromagnetic clutch and a meshing type dog clutch.

In the above-described embodiments, the automatic transmission portion 20, 80 is disposed in the power transmitting path between the drive wheels 38, and the power transmitting member 18 which is the output member of the differential portion 11 or power distributing mechanism 16. However, the automatic transmission portion 20, 80 may be replaced by any other type of power transmitting device such as: a continuously variable transmission (CVT) which is a kind of an automatic transmission; and an automatic transmission which is a permanent-mesh parallel-two-axes type transmission well known as a manual transmission and which is automatically shifted by select cylinders and shift cylinders. Where the continuously variable transmission (CVT) is provided, the transmission mechanism as a whole is placed in the step-variable shifting state when the power distributing mechanism 16, 76 is placed in the fixed-speed-ratio shifting state. The step-variable shifting state is defined as a state in which power is transmitted primarily through a mechanical power transmitting path, without power transmission through an electric path. The continuously variable transmission may be arranged to establish a plurality of predetermined fixed speed ratios corresponding to those of the gear positions of a step-variable transmission, according to stored data indicative of the predetermined speed ratios.

While the automatic transmission portion 20, 80 in the above-described embodiments is connected in series to the differential portion 11, 71 through the power transmitting member 18, the automatic transmission portion 20, 80 may be mounted on and disposed coaxially with a counter shaft which is parallel to the input shaft 14. In this case, the differential portion 11, 71 and the automatic transmission portion 20, 80 are operatively connected to each other through a suitable power transmitting device or a set of two power transmitting members such as a pair of counter gears, and a combination of a sprocket wheel and a chain.

The power distributing mechanism 16, 76 provided as a differential mechanism in the above-described embodiments may be replaced by a differential gear device including a pinion rotated by the engine, and a pair of bevel gears which mesh with the pinion and which are respectively operatively connected to the first electric motor M1 and the second electric motor M2.

While the power distributing mechanism 16, 76 in the above-described embodiments is constituted by one planetary gear set, it may be constituted by two or more planetary gear sets so that the power distributing mechanism 16, 76 is operable as a transmission having three or more gear positions in the non-differential state (fixed-speed-ratio shifting state). Further, each planetary gear set does not necessarily have to be of single-pinion type, but may be of double-pinion type.

In the above-described embodiments, the manually operable shifting device 46 is provided with the shift lever 48 manually operable to select one of a plurality of operating positions. However, the shift lever 48 may be replaced by pushbutton switches, a slide-type or any other type of switch manually operable to select a desired one of a plurality of operating positions, or by devices not operated by hand, such as a device operated in response to a voice of the vehicle operator or operated by foot, to select one of a plurality of operating positions. Although the shift lever 48 has the manual forward-drive position M for selecting the number of the forward-drive gear positions available for automatic shifting of the automatic transmission portion 20, 80, the shift lever 48 placed in the manual forward-drive position M may be used to manually shift up or down the automatic transmission portion 20, 80, within the range from the first gear position through the eighth gear position, by operating the shift lever 48 from the position M to the shift-up position "+" or shift-down position "−".

While the switch 44 is of a seesaw type switch in the above-described embodiments, the seesaw switch 44 may be replaced by a single pushbutton switch, two pushbutton switches that are selectively pressed into operated positions, a lever type switch, a slide-type switch or any other type of switch or switching device that is operable to select a desired one of the continuously-variable shifting state (differential state) and the step-variable shifting state (non-differential state). The seesaw switch 44 may or may not have a neutral position. Where the seesaw switch 44 does not have the neutral position, an additional switch may be provided to enable and disable the seesaw switch 44. The function of this additional switch corresponds to the neutral position of the seesaw switch 44. The seesaw switch 44 may be replaced by a switching device operable by a voice generated by the vehicle operator or a foot of the vehicle operator, rather than by hand, to select one of the continuously-variable shifting state (differential state) and the step-variable shifting state (non-differential state).

It is to be understood that the embodiments of the invention have been described for illustrative purpose only, and that the present invention may be embodied with various changes and modifications which may occur to those skilled in the art.

What is claimed is:

1. A control apparatus for a vehicular drive system including: (i) a first transmission portion operable as an electrically controlled continuously variable transmission and having (i-1) a differential mechanism operable to distribute an output of an engine to a first electric motor and a power transmitting member, and (i-2) a second electric motor disposed in a power transmitting path between the power transmitting member and a drive wheel of a vehicle; and (ii) a second transmission portion constituting a part of the power transmitting path, said control apparatus comprising:
   a differential-state switching device provided in the differential mechanism and operable to selectively place the first transmission portion in a continuously-variable shifting state in which the first transmission portion can be operated as the electrically controlled continuously variable transmission, and in a non-continuously-variable shifting state in which the first transmission portion is not operated as the electrically controlled continuously variable transmission; and
   a transmission controller operable to change a speed ratio of the second transmission portion, concurrently with switching of the first transmission portion between the continuously-variable shifting state and the non-continuously-variable shifting state.

2. The control apparatus according to claim 1, wherein said transmission controller causes a shift-down action of the second transmission portion when the first transmission portion is switched from the continuously-variable shifting state to the non-continuously-variable shifting state, such that a rotational speed of the engine is made higher after the switching of the first transmission portion than before the switching of the first transmission portion.

3. The control apparatus according to claim 1,
   wherein the differential mechanism includes a planetary gear set having a sun gear, a carrier and a ring gear,
   wherein the differential mechanism constitutes a first rotary element, a second rotary element and a third rotary element, each of which is provided by at least one of the sun gear, carrier and ring gear,
   wherein the first rotary element is rotatable at a rotational speed that is intermediate between rotational speeds of the respective second and third rotary elements,
   wherein the first rotary element is connected to the engine,
   wherein the second rotary element is connected to the first electric motor,
   wherein the third rotary element is connected to the power transmitting member,
   wherein the first transmission portion is placed in the non-continuously-variable shifting state so as to be operable as a speed-increasing transmission whose speed ratio is lower than 1, when said differential-state switching device places the second rotary element in an unrotatable state,
   and wherein the output of the engine is receivable by the second transmission portion through an input path from the power transmitting member via the first transmission portion and through another input path without via the first transmission portion.

4. The control apparatus according to claim 1, wherein a switching between the continuously-variable shifting state and the non-continuously-variable shifting state is performed based on a magnitude of a required output.

5. The control apparatus according to claim 1,
   wherein a switching between the continuously-variable shifting state and the non-continuously-variable shifting state is performed based on a magnitude of a vehicle speed.

6. The control apparatus according to claim 1, wherein a switching between the continuously-variable shifting state and the non-continuously-variable shifting state is performed based on a magnitude of an engine torque.

7. The control apparatus according to claim 1, wherein a switching between the continuously-variable shifting state and the non-continuously-variable shifting state is performed based on a magnitude of an engine rotational speed.

8. The control apparatus according to claim 1, wherein a speed ratio of the continuously-variable transmission portion upon the non-continuously-variable shifting state is a speed ratio fixed at a speed-increasing side.

9. A control apparatus for a vehicular drive system including: (i) a differential portion having (i-1) a differential mechanism operable to distribute an output of an engine to a first electric motor and a power transmitting member, and (i-2) a second electric motor disposed in a power transmitting path between the power transmitting member and a drive wheel of a vehicle; and (ii) an automatic transmission portion constituting a part of the power transmitting path, said control apparatus comprising:
   a differential-state switching device provided in the differential mechanism and operable to selectively place the differential portion in a differential state in which the differential portion provides a differential function, and in a non-differential state in which the differential portion does not provide the differential function; and
   a transmission controller operable, to change a speed ratio of the automatic transmission portion, concurrently with switching of the differential portion between the differential state and the non-differential state.

10. The control apparatus according to claim 9, wherein said transmission controller causes a shift-down action of the automatic transmission portion when the differential portion is switched from the differential state to the non-differential state, such that a rotational speed of the engine is made higher after the switching of the differential portion than before the switching of the differential portion.

11. The control apparatus according to claim 9,
   wherein the differential mechanism includes a planetary gear set having a sun gear, a carrier and a ring gear,
   wherein the differential mechanism constitutes a first rotary element, a second rotary element and a third rotary element, each of which is provided by at least one of the sun gear, carrier and ring gear,
   wherein the first rotary element is rotatable at a rotational speed that is intermediate between rotational speeds of the respective second and third rotary elements,
   wherein the first rotary element is connected to the engine, wherein the second rotary element is connected to the first electric motor, wherein the third rotary element is connected to the power transmitting member, wherein the differential portion is placed in the non-differential state so as to be operable as a speed-increasing transmission whose speed ratio is lower than 1, when said differential-state switching device places the second rotary element in an unrotatable state, and wherein the output of the engine is receivable by the automatic transmission portion through an input path from the power transmitting member via the differential portion and through another input path without via the differential portion.

12. The control apparatus according to claim 9, wherein a switching between the differential state and the non-differential state is performed based on a magnitude of a required output.

13. The control apparatus according to claim 9, wherein a switching between the differential state and the non-differential state is performed based on a magnitude of a vehicle speed.

14. The control apparatus according to claim 9, wherein a switching between the differential state and the non-differential state is performed based on a magnitude of an engine torque.

15. The control apparatus according to claim 9, wherein a switching between the differential state and the non-differential state is performed based on a magnitude of an engine rotational speed.

16. The control apparatus according to claim 9,
wherein a speed ratio of the differential portion upon the non-differential state is a speed ratio fixed at a speed-increasing side.

17. A vehicle comprising:
a vehicular drive system including: (i) a first transmission portion operable as an electrically controlled continuously variable transmission and having (i-1) a differential mechanism operable to distribute an output of an engine to a first electric motor and a power transmitting member, and (i-2) a second electric motor disposed in a power transmitting path between said power transmitting member and a drive wheel of a vehicle; and (ii) a second transmission portion constituting a part of said power transmitting path;
a differential-state switching device provided in said differential mechanism and operable to selectively place said first transmission portion in a continuously-variable shifting state in which said first transmission portion can be operated as said electrically controlled continuously variable transmission, and in a non-continuously-variable shifting state in which said first transmission portion is not operated as said electrically controlled continuously variable transmission; and
a transmission controller operable to change a speed ratio of said second transmission portion, concurrently with switching of said first transmission portion between said continuously-variable shifting state and said non-continuously-variable shifting state.

18. The vehicle according to claim 17, wherein said transmission controller causes a shift-down action of said the second transmission portion when said first transmission portion is switched from said continuously-variable shifting state to said non-continuously-variable shifting state, such that a rotational speed of said engine is made higher after the switching of said first transmission portion than before the switching of said first transmission portion.

19. The vehicle according to claim 17,
wherein said differential mechanism includes a planetary gear set having a sun gear, a carrier and a ring gear,
wherein said differential mechanism constitutes a first rotary element, a second rotary element and a third rotary element, each of which is provided by at least one of said sun gear, carrier and ring gear,
wherein said first rotary element is rotatable at a rotational speed that is intermediate between rotational speeds of the respective second and third rotary elements,
wherein said first rotary element is connected to said engine,
wherein said second rotary element is connected to said first electric motor,
wherein said third rotary element is connected to said power transmitting member,
wherein said first transmission portion is placed in said non-continuously-variable shifting state so as to be operable as a speed-increasing transmission having a speed ratio lower than 1, when said differential-state switching device places said second rotary element in an unrotatable state,
and wherein the output of said engine is receivable by said second transmission portion through an input path from said power transmitting member via said first transmission portion and through another input path without via said first transmission portion.

20. A vehicle comprising:
a vehicular drive system including: (i) a differential portion having (i-1) a differential mechanism operable to distribute an output of an engine to a first electric motor and a power transmitting member, and (i-2) a second electric motor disposed in a power transmitting path between said power transmitting member and a drive wheel of a vehicle; and (ii) an automatic transmission portion constituting a part of said power transmitting path;
a differential-state switching device provided in said differential mechanism and operable to selectively place said differential portion in a differential state in which said differential portion provides a differential function, and in a non-differential state in which said differential portion does not provide said differential function; and
a transmission controller operable to change a speed ratio of said automatic transmission portion, concurrently with the switching of said differential portion between said differential state and said non-differential state.

21. The vehicle according to claim 20, wherein said transmission controller causes a shift-down action of said automatic transmission portion when said differential portion is switched from said differential state to said non-differential state, such that a rotational speed of said engine is made higher after the switching of said differential portion than before the switching of said differential portion.

22. The vehicle according to claim 20,
wherein said differential mechanism includes a planetary gear set having a sun gear, a carrier and a ring gear,
wherein said differential mechanism constitutes a first rotary element, a second rotary element and a third rotary element, each of which is provided by at least one of said sun gear, carrier and ring gear,
wherein said first rotary element is rotatable at a rotational speed that is intermediate between rotational speeds of the respective second and third rotary elements,
wherein said first rotary element is connected to said engine,
wherein said second rotary element is connected to said first electric motor, wherein said third rotary element is connected to said power transmitting member, wherein said differential portion is placed in said non-differential state so as to be operable as a speed-increasing transmission having a speed ratio lower than 1, when said differential-state switching device places said second rotary element in an unrotatable state, and wherein the output of said engine is receivable by said automatic transmission portion through an input path from said power transmitting member via said differential portion and through another input path without via said differential portion.

23. A method of controlling a vehicular drive system including: (i) a first transmission portion operable as an electrically controlled continuously variable transmission and having (i-1) a differential mechanism operable to distribute an output of an engine to a first electric motor and a power transmitting member, and (i-2) a second electric motor disposed in a power transmitting path between the power transmitting member and a drive wheel of a vehicle; (ii) a second transmission portion constituting a part of the power transmitting path; and (iii) a differential-state switching device provided in the differential mechanism and operable to selectively place the first transmission portion in a continuously-variable shifting state in which the first transmission portion can be operated as the electrically controlled continuously variable transmission, and in a non-continuously-variable shifting state in which the first transmission portion is not operated as the electrically controlled continuously variable transmission, said method comprising:

a transmission control step implemented to change a speed ratio of the second transmission portion, concurrently with switching of the first transmission portion between the continuously-variable shifting state and the non-continuously-variable shifting state.

24. The method according to claim 23, wherein said transmission control step is implemented to cause a shift-down action of the second transmission portion when the first transmission portion is switched from the continuously-variable shifting state to the non-continuously-variable shifting state, such that a rotational speed of the engine is made higher after the switching of the first transmission portion than before the switching of the first transmission portion.

25. The method according to claim 23, wherein the differential mechanism includes a planetary gear set having a sun gear, a carrier and a ring gear, wherein the differential mechanism constitutes a first rotary element, a second rotary element and a third rotary element, each of which is provided by at least one of the sun gear, carrier and ring gear, wherein the first rotary element is rotatable at a rotational speed that is intermediate between rotational speeds of the respective second and third rotary elements, wherein the first rotary element is connected to the engine, wherein the second rotary element is connected to the first electric motor, wherein the third rotary element is connected to the power transmitting member, wherein the first transmission portion is placed in the non-continuously-variable shifting state so as to be operable as a speed-increasing transmission whose speed ratio is lower than 1, when said differential-state switching device places the second rotary element in an unrotatable state, and wherein the output of the engine is receivable by the second transmission portion through an input path from the power transmitting member via the first transmission portion and through another input path without via the first transmission portion.

26. A method of controlling a vehicular drive system including: (i) a differential portion having (i-1) a differential mechanism operable to distribute an output of an engine to a first electric motor and a power transmitting member, and (i-2) a second electric motor disposed in a power transmitting path between the power transmitting member and a drive wheel of a vehicle; (ii) an automatic transmission portion constituting a part of the power transmitting path; and (iii) a differential-state switching device provided in the differential mechanism and operable to selectively place the differential portion in a differential state in which the differential portion provides a differential function, and in a non-differential state in which the differential portion does not provide the differential function, said method comprising:

a transmission control step implemented to change a speed ratio of the automatic transmission portion, concurrently with switching of the differential portion between the differential state and the non-differential state.

27. The method apparatus according to claim 26, wherein said transmission control step is implemented to cause a shift-down action of the automatic transmission portion when the differential portion is switched from the differential state to the non-differential state, such that a rotational speed of the engine is made higher after the switching of the differential portion than before the switching of the differential portion.

28. The method according to claim 26, wherein the differential mechanism includes a planetary gear set having a sun gear, a carrier and a ring gear, wherein the differential mechanism constitutes a first rotary element, a second rotary element and a third rotary element, each of which is provided by at least one of the sun gear, carrier and ring gear, wherein the first rotary element is rotatable at a rotational speed that is intermediate between rotational speeds of the respective second and third rotary elements, wherein the first rotary element is connected to the engine, wherein the second rotary element is connected to the first electric motor, wherein the third rotary element is connected to the power transmitting member, wherein the differential portion is placed in the non-differential state so as to be operable as a speed-increasing transmission whose speed ratio is lower than 1, when said differential-state switching device places the second rotary element in an unrotatable state, and wherein the output of the engine is receivable by the automatic transmission portion through an input path from the power transmitting member via the differential portion and through another input path without via the differential portion.

* * * * *